US009518221B2

(12) United States Patent
Kawamura

(10) Patent No.: US 9,518,221 B2
(45) Date of Patent: Dec. 13, 2016

(54) NEMATIC LIQUID CRYSTAL COMPOSITION AND LIQUID CRYSTAL DISPLAY DEVICE USING THE SAME

(71) Applicant: DIC Corporation, Tokyo (JP)

(72) Inventor: Joji Kawamura, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/435,318

(22) PCT Filed: Jul. 22, 2013

(86) PCT No.: PCT/JP2013/069806
§ 371 (c)(1),
(2) Date: Apr. 13, 2015

(87) PCT Pub. No.: WO2015/011763
PCT Pub. Date: Jan. 29, 2015

(65) Prior Publication Data
US 2015/0252262 A1 Sep. 10, 2015

(51) Int. Cl.
*C09K 19/44* (2006.01)
*C09K 19/30* (2006.01)
*C09K 19/20* (2006.01)
*C09K 19/06* (2006.01)
C09K 19/04 (2006.01)
C09K 19/12 (2006.01)

(52) U.S. Cl.
CPC ......... *C09K 19/3068* (2013.01); *C09K 19/065* (2013.01); *C09K 19/3066* (2013.01); *C09K 19/44* (2013.01); C09K 2019/0459 (2013.01); C09K 2019/0466 (2013.01); C09K 2019/123 (2013.01); C09K 2019/124 (2013.01); C09K 2019/3004 (2013.01); C09K 2019/3019 (2013.01); C09K 2019/3025 (2013.01); C09K 2019/3071 (2013.01); C09K 2019/3077 (2013.01); C09K 2019/3078 (2013.01)

(58) Field of Classification Search
CPC ................ C09K 19/44; C09K 19/3066; C09K 2019/0459; C09K 2019/0466; C09K 2019/123; C09K 2019/3004; C09K 2019/301; C09K 2019/3025
See application file for complete search history.

(56) References Cited
U.S. PATENT DOCUMENTS

| | | | | |
|---|---|---|---|---|
| 8,075,960 | B2 * | 12/2011 | Fujita | C09K 19/20 252/299.63 |
| 8,980,384 | B2 * | 3/2015 | Kawamura | C09K 19/20 252/299.61 |
| 9,200,202 | B2 * | 12/2015 | Kawamura | C09K 19/062 |
| 2008/0029736 | A1 | 2/2008 | Saito | |
| 2008/0029737 | A1 | 2/2008 | Saito | |
| 2009/0256114 | A1 | 10/2009 | Yamashita et al. | |
| 2010/0051865 | A1 | 3/2010 | Yoshino et al. | |
| 2010/0294992 | A1 | 11/2010 | Fujita et al. | |
| 2010/0302498 | A1 | 12/2010 | Saito | |

(Continued)

FOREIGN PATENT DOCUMENTS

| | | |
|---|---|---|
| JP | 2008-037918 A | 2/2008 |
| JP | 2008-038018 A | 2/2008 |

(Continued)

OTHER PUBLICATIONS

International Search Report dated Sep. 17, 2013, issued in corresponding application No. PCT/JP2013/069806.

*Primary Examiner* — Shean C Wu
(74) *Attorney, Agent, or Firm* — Westerman, Hattori, Daniels & Adrian, LLP

(57) ABSTRACT

The inventor of the present invention has investigated various liquid crystal compounds and various chemical substances and found that the object can be achieved by using a combination of particular liquid crystal compounds, thereby making the present invention.
In other words, provided are a liquid crystal composition having positive dielectric anisotropy, comprising compounds represented by formula (26.2) and formula (2.5) and one or more compounds represented by general formula (IV), an active matrix driving-liquid crystal display device using the liquid crystal composition, and a liquid crystal display using the active matrix-driving liquid crystal display device:

[Chem. 1]

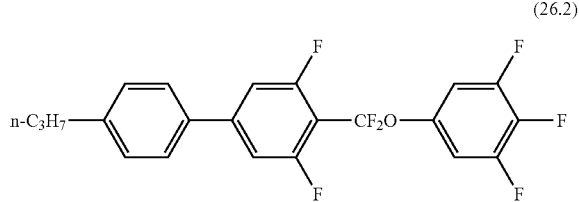

(26.2)

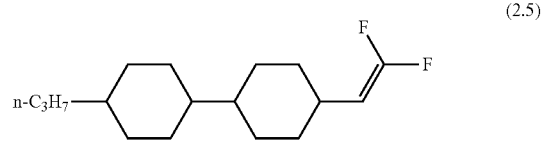

(2.5)

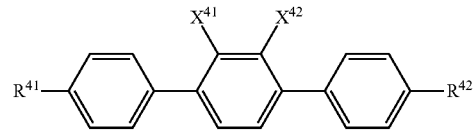

(IV)

(In the formula, $R^{41}$ and $R^{42}$ each independently represent an alkyl group having 1 to 5 carbon atoms or an alkenyl group having 4 or 5 carbon atoms and $X^{41}$ and $X^{42}$ each independently represent a hydrogen atom or a fluorine atom.)

5 Claims, 1 Drawing Sheet

(56) References Cited

U.S. PATENT DOCUMENTS

| | | |
|---|---|---|
| 2011/0051023 A1 | 3/2011 | Fujita et al. |
| 2012/0044453 A1 | 2/2012 | Miyairi et al. |

FOREIGN PATENT DOCUMENTS

| | | |
|---|---|---|
| JP | 2009-270102 A | 11/2009 |
| JP | 2010-053211 A | 3/2010 |
| JP | 2010-270178 A | 12/2010 |
| JP | 2010-275390 A | 12/2010 |
| JP | 2011-052120 A | 3/2011 |
| WO | 2010/131614 A1 | 11/2010 |

\* cited by examiner

NEMATIC LIQUID CRYSTAL COMPOSITION AND LIQUID CRYSTAL DISPLAY DEVICE USING THE SAME

TECHNICAL FIELD

The present invention relates to a nematic liquid crystal composition having a positive dielectric anisotropy ($\Delta\epsilon$) useful as a liquid crystal display material, and to a liquid crystal display device using such a composition.

BACKGROUND ART

Liquid crystal display devices are increasingly used in watches, calculators, various measurement instruments, automobile panels, word processors, electronic organizers, printers, computers, televisions, clocks, advertising boards, etc. Representative examples of the liquid crystal display mode include twisted nematic (TN) mode, super twisted nematic (STN) mode, and vertical alignment mode or in-plane-switching (IPS) mode that uses thin film transistors (TFTs). Liquid crystal compositions used in such liquid crystal display devices are required to be stable against external stimuli such as water, air, heat, and light, be in a liquid crystal phase in a temperature range as wide as possible around room temperature, have low viscosity, and operate at low drive voltage. A liquid crystal composition is constituted by several to several dozens of compounds in order to optimize dielectric anisotropy ($\Delta\epsilon$) and/or refractive index anisotropy ($\Delta n$) and the like for each individual display device.

A vertical alignment (VA) mode display uses a liquid crystal composition having negative $\Delta\epsilon$ whereas a horizontal alignment mode display, such as TN, STN, or in-plane-switching (IPS) mode display, uses a liquid crystal composition having positive $\Delta\epsilon$. Also reported is a drive mode by which a liquid crystal composition having positive $\Delta\epsilon$ is aligned vertically in the absence of applied voltage and driven by applying a horizontal electric field to perform display. The demand for liquid crystal compositions having positive $\Delta\epsilon$ is increasing. Meanwhile, low-voltage driving, high-speed response, and a wide operation temperature range are desirable in all drive modes. In other words, $\Delta\epsilon$ is required to be positive and have a large absolute value, the viscosity ($\eta$) is required to be small, and the nematic phase-isotropic liquid phase transition temperature (Tni) is required to be high. There is also a need to adjust the $\Delta n$ of the liquid crystal composition in accordance with a cell gap so that the setting of $\Delta n \times d$, which is the product of $\Delta n$ and a cell gap (d), is met. Furthermore, high-speed response is important in using a liquid crystal display device in a television or the like. Thus, a liquid crystal composition having a low rotational viscosity ($\gamma 1$) is required for this use.

An example of a high-response-speed-oriented liquid crystal composition has been disclosed which contains a liquid crystal compound having positive $\Delta\epsilon$ represented by formula (A-1) or (A-2) used in combination with a liquid crystal compound (B) having neutral $\Delta\epsilon$. It is well known in the field of liquid crystal compositions that the feature of these liquid crystal compositions is that the liquid crystal compound having positive $\Delta\epsilon$ has a —CF$_2$O— structure and that the liquid crystal compound having neutral $\Delta\epsilon$ has an alkenyl group (PTL 1 to PTL 4).

[Chem. 1]

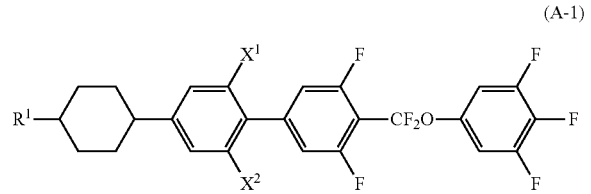

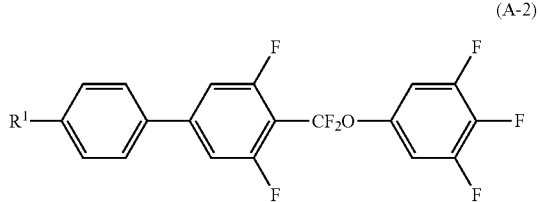

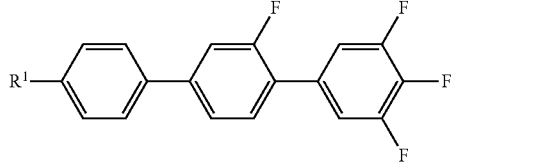

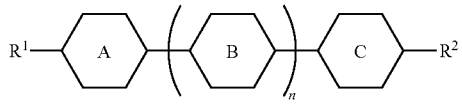

Expansion of applications of liquid crystal display devices has caused great changes in the way these devices are manufactured and used. In order to meet these changes, optimization of characteristics other than basic physical property values previously considered has become necessary. Namely, VA and IPS mode liquid crystal display devices that use liquid crystal compositions have become widespread, and supersize display devices 50 or greater have become commercially viable and used. With the increase in substrate size, the mainstream injection method for injecting a liquid crystal composition into a substrate has shifted from a vacuum injection method to a one-drop-fill method (ODF); however, this leads to a problem of degradation of display quality caused by drop marks that occur at the time the liquid crystal composition is dropped onto the substrate. Moreover, in a liquid crystal display device production process that employs the ODF method, optimum amounts of liquid crystals need to be dropped in accordance with the size of the liquid crystal display device. Once the injection amount increases from the optimum value, the previously designed balance between the refractive index of the liquid crystal display device and the driving electric field is lost and display defects such as generation of nonuniformity and contrast failures result. In particular, the optimum liquid crystal injection amount for small-size liquid crystal display devices frequently used in latest smart phones is small and it is difficult to control the deviation from the optimum value within a particular range. Accordingly, in order to keep the yield of liquid crystal display devices high, for example, a liquid crystal composition is required to be less susceptible to impacts and rapid pressure changes inside the dropping machine during dropping of liquid crystals and to have properties that allow liquid crystals to be dropped stably over a long period of time.

As described above, a liquid crystal composition for use in an active matrix-driving liquid crystal display device driven by TFTs and the like is required to maintain those properties and performance, such as high-speed response, required by liquid crystal display devices, exhibit high resistivity, high voltage holding ratio, and stability under external stimuli such as light and heat which have been previously considered important, and be developed by considering the liquid crystal display device production method.

CITATION LIST

Patent Literature

PTL 1: Japanese Unexamined Patent Application Publication No. 2008-037918
PTL 2: Japanese Unexamined Patent Application Publication No. 2008-038018
PTL 3: Japanese Unexamined Patent Application Publication No. 2010-275390
PTL 4: Japanese Unexamined Patent Application Publication No. 2011-052120

SUMMARY OF INVENTION

Technical Problem

An object of the present invention is to provide a liquid crystal composition having positive $\Delta \in$, is in a liquid crystal phase in a wide temperature range, has low viscosity, good low-temperature solubility, and high resistivity and voltage holding ratio, and is stable under heat and/or light. Another object is to provide, in high yield, a liquid crystal display device of an IPS-mode, TN-mode, or the like that uses the liquid crystal composition and has high display quality, with which display failures such as ghosting and drop marks are suppressed.

Solution to Problem

The inventors of the present invention has investigated various liquid crystal compounds and various chemical substances and found that the object can be achieved by using a combination of particular liquid crystal compounds, thereby making the present invention.

In other words, provided is a liquid crystal composition having positive dielectric anisotropy, comprising compounds represented by formula (26.2) and formula (2.5):

[Chem. 2]

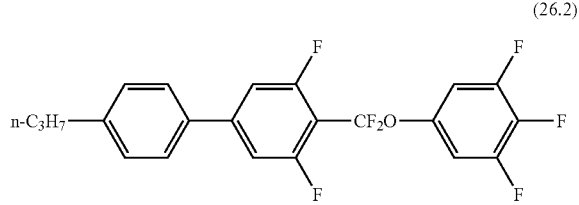

(26.2)

[Chem. 3]

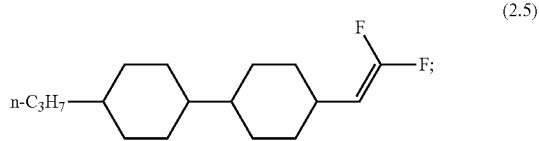

(2.5)

and
one or more compounds represented by general formula (IV):

[Chem. 4]

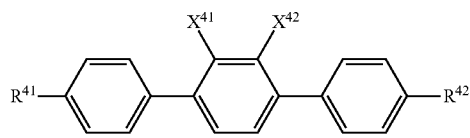

(IV)

(In the formula, $R^{41}$ and $R^{42}$ each independently represent an alkyl group having 1 to 5 carbon atoms or an alkenyl group having 4 or 5 carbon atoms and $X^{41}$ and $X^{42}$ each independently represent a hydrogen atom or a fluorine atom.) Also provided are an active matrix-driving liquid crystal display device using the liquid crystal composition and a liquid crystal display using the active matrix-driving liquid crystal display device.

Advantageous Effects of Invention

A liquid crystal composition having positive dielectric anisotropy according to the present invention achieves significantly low viscosity and good low-temperature solubility, undergoes very little changes in resistivity and voltage holding ratio against heat and/or light. Thus, the product has high utility and liquid crystal display devices such as those of IPS mode and FFS mode can achieve high-speed response. Moreover, since the composition stably maintains properties in the liquid crystal display device production process, display failures caused by the process are suppressed and high-yield production is realized. Thus, the composition is highly useful.

DESCRIPTION OF EMBODIMENTS

Figure 1:
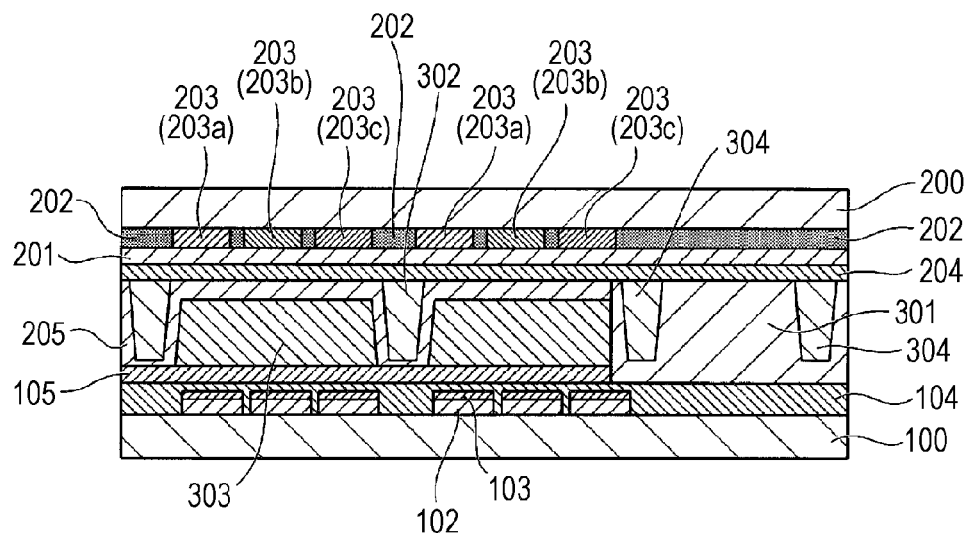
FIG. 1 is a cross-sectional view of a liquid crystal display device according to the present invention. A substrate that includes 100 to 105 is referred to as a "backplane" and a substrate that includes 200 to 205 is referred to as a "frontplane".
Figure 2:
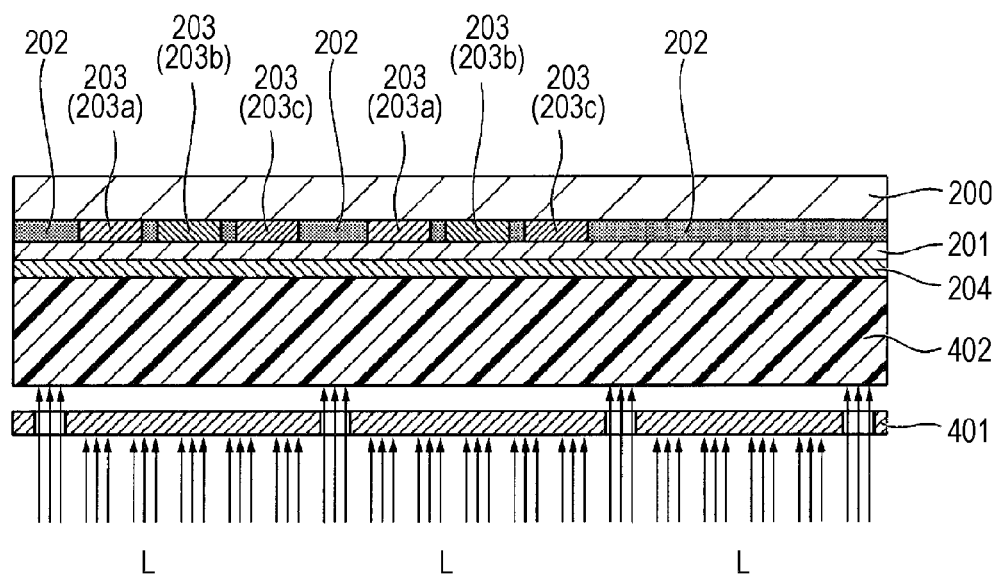
FIG. 2 is a diagram of an exposure step that uses, as a photomask pattern, a pattern for forming columnar spacers on a black matrix.

A liquid crystal composition according to the invention of the subject application contains a compound represented by formula (26.2).

[Chem. 5]

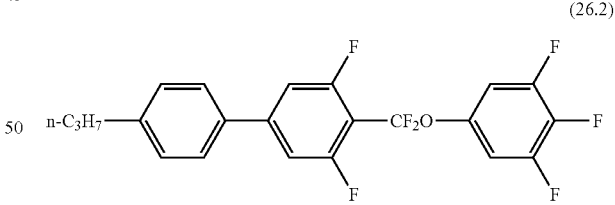

(26.2)

The content of the compound represented by formula (26.2) relative to the total amount of the liquid crystal composition of the present invention is preferably 2% by mass or more, more preferably 4% by mass or more, yet more preferably 10% by mass or more, more preferably 14% by mass or more, still more preferably 16% by mass or more, and most preferably 21% by mass or more considering low-temperature solubility, transition temperature, electrical reliability, birefringence, etc. The maximum content is preferably 40% by mass or less, more preferably 35% by mass or less, yet more preferably 30% by mass or less, and most preferably 25% by mass or less considering low-temperature solubility, transition temperature, electrical reliability, etc.

The liquid crystal composition according to the invention of the subject application also includes a compound represented by formula (2.5).

[Chem. 6]

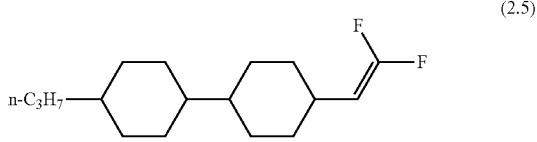

(2.5)

The content of the compound represented by formula (2.5) is preferably adjusted in accordance with desired properties such as low-temperature solubility, transition temperature, electrical reliability, and birefringence. The content of this compound relative to the total amount of the liquid crystal composition of the present invention is preferably 11% by mass or more, more preferably 15% by mass, yet more preferably 23% by mass, still more preferably 26% by mass or more, and most preferably 28% by mass or more. The liquid crystal composition according to the invention of the subject application also contains a compound selected from the group of compounds represented by general formula (IV).

[Chem. 7]

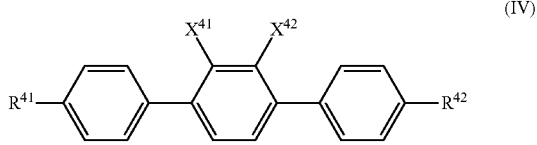

(IV)

(In the formula, $R^{41}$ and $R^{42}$ each independently represent an alkyl group having 1 to 5 carbon atoms or an alkenyl group having 2 to 5 carbon atoms, and $X^{41}$ and $X^{42}$ each independently represent a hydrogen atom or a fluorine atom.)

The number of compounds that can be used in combination is not particularly limited and a suitable combination of compounds is used in accordance with desired properties such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, and six or more in another embodiment of the present invention.

The compound represented by general formula (IV) is preferably a compound selected from the group of compounds represented by general formula (IV-1), for example.

[Chem. 8]

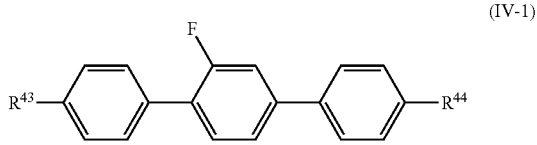

(IV-1)

(In the formula, $R^{43}$ and $R^{44}$ each independently represent an alkyl group having 1 to 5 carbon atoms.)

The content of the compound represented by general formula (IV-1) must be appropriately adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 1% in one embodiment, 2% in another embodiment of the present invention, 4% in another embodiment of the present invention, 6% in another embodiment of the present invention, 8% in another embodiment of the present invention, 10% in another embodiment of the present invention, 12% in another embodiment of the present invention, 15% in another embodiment of the present invention, 18% in another embodiment of the present invention, and 21% in another embodiment of the present invention.

The upper limit of the preferable content relative to the total amount of the liquid crystal composition of the present invention is, for example, 40% in one embodiment of the present invention, 30% in another embodiment of the present invention, 25% in another embodiment of the present invention, 20% in another embodiment of the present invention, 15% in another embodiment of the present invention, 10% in another embodiment of the present invention, 5% in another embodiment of the present invention, and 4% in another embodiment of the present invention.

The compound represented by general formula (IV-1) is preferably any of compounds represented by formula (18.1) to formula (18.9), for example.

[Chem. 9]

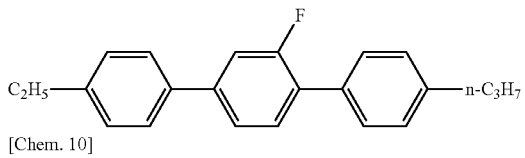

(18.1)

[Chem. 10]

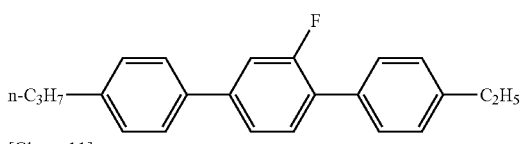

(18.2)

[Chem. 11]

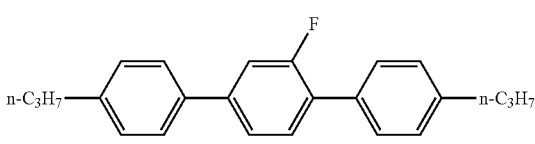

(18.3)

[Chem. 12]

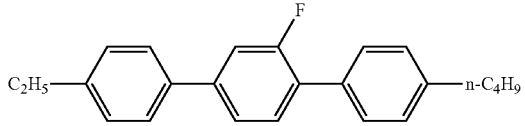

(18.4)

[Chem. 13]

(18.5)

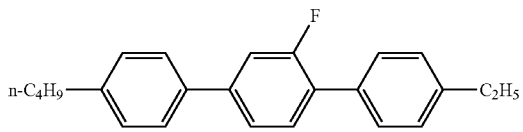

[Chem. 14]

(18.6)

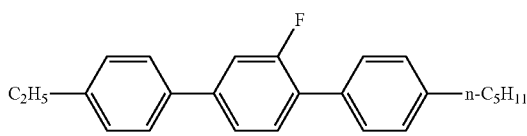

[Chem. 15]

(18.7)

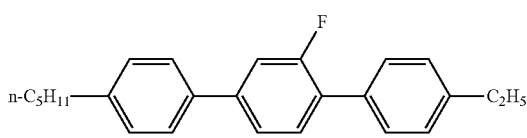

[Chem. 16]

(18.8)

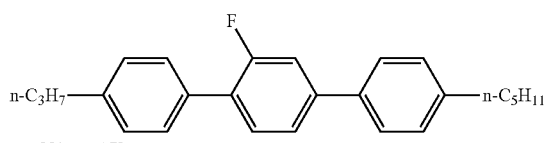

[Chem. 17]

(18.9)

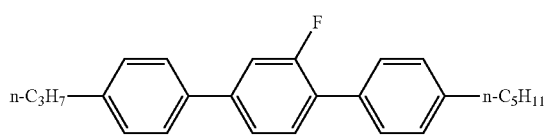

The number of compounds that can be used in combination is not particularly limited. Of these compounds, preferably 1 to 3 and more preferably 1 to 4 compounds are contained. Since a wide molecular weight distribution of selected compounds is effective for solubility, for example, one selected from compounds represented by formula (18.1) or (18.2), one selected from compounds represented by formula (18.4) or (18.5), one compound selected from compounds represented by formula (18.6) or (18.7), and one compound selected from compounds represented by formula (18.8) or (18.9) are preferably used in combination. In particular, compounds represented by formula (18.1), formula (18.3), formula (18.4), formula (18.6), and formula (18.9) are preferably contained.

The compound represented by general formula (IV) is preferably a compound selected from the group of compounds represented by general formula (IV-2), for example.

[Chem. 18]

(IV-2)

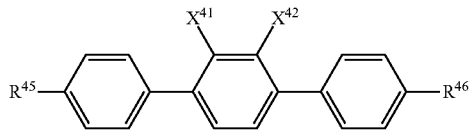

(In the formula, $R^{45}$ and $R^{46}$ each independently represent an alkyl group having 1 to 5 carbon atoms or an alkenyl group having 2 to 5 carbon atoms, at least one of $R^{45}$ and $R^{46}$ represents an alkenyl group having 2 to 5 carbon atoms, and $X^{41}$ and $X^{42}$ each independently represent a hydrogen atom or a fluorine atom.)

The number of compounds that can be used in combination is not particularly limited and an appropriate combination is used in accordance with desired properties such as low-temperature solubility, transition temperature, electrical reliability, and birefringence.

The content of the compound represented by general formula (IV-2) needs to be adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 0.5%, more preferably 1%, more preferably 2%, more preferably 3%, more preferably 5%, more preferably 7%, more preferably 9%, more preferably 12%, yet more preferably 15%, and most preferably 20%. The upper limit of the preferable content relative to the total amount of the liquid crystal composition of the present invention is, for example, preferably 40%, more preferably 30%, more preferably 25%, more preferably 20%, more preferably 15%, more preferably 10%, yet more preferably 5%, and most preferably 4%.

The compound represented by general formula (IV-2) is, for example, preferably any of compounds represented by formula (19.1) to formula (19.8) and more preferably a compound represented by formula (19.2).

[Chem. 19]

(19.1)

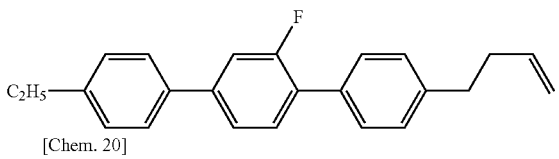

[Chem. 20]

(19.2)

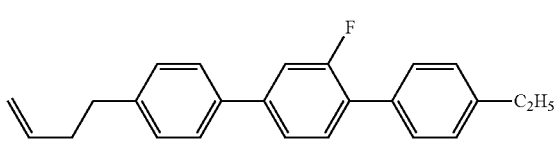

[Chem. 21]

(19.3)

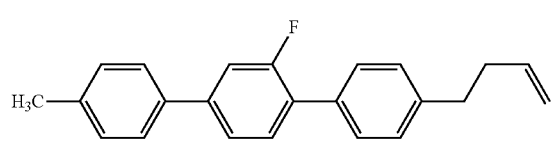

-continued

[Chem. 22]

(19.4)

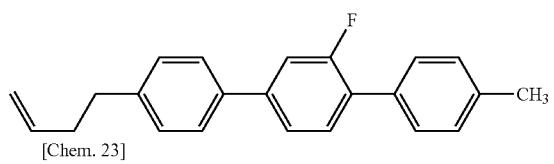

[Chem. 23]

(19.5)

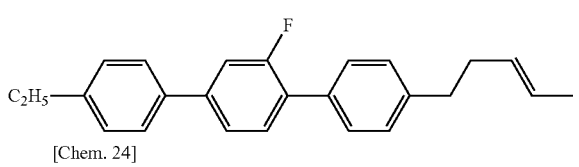

[Chem. 24]

(19.6)

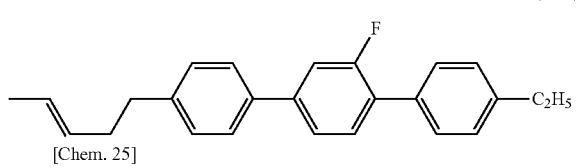

[Chem. 25]

(19.7)

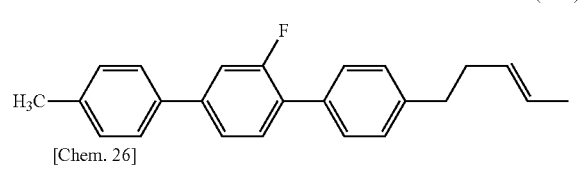

[Chem. 26]

(19.8)

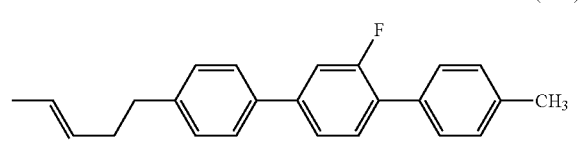

A wide molecular weight distribution of compounds selected as the components of the liquid crystal composition is effective for solubility. Thus, for example, one selected from compounds represented by formula (19.1) or (19.2), one selected from compounds represented by formula (19.3) or (19.4), one selected from compounds represented by formula (19.5) or formula (19.6), and one selected from compounds represented by formula (19.7) and (19.8) are used in an appropriate combination.

The liquid crystal composition of the present invention may contain one or more compounds represented by general formula (L).

[Chem. 27]

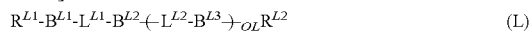
$$R^{L1}\text{-}B^{L1}\text{-}L^{L1}\text{-}B^{L2}\text{-}(L^{L2}\text{-}B^{L3})_{OL}R^{L2} \qquad (L)$$

(In the formula, $R^{L1}$ and $R^{L2}$ each independently represent an alkyl group having 1 to 8 carbon atoms where one —$CH_2$— or two or more non-adjacent —$CH_2$— in the alkyl group may each independently be substituted with —CH=CH—, —C≡C—, —O—, —CO—, —COO—, or —OCO—, OL represents 0, 1, 2, or 3, $B^{L1}$, $B^{L2}$, and $B^{L3}$ each independently represent a group selected from the group consisting of (a) a 1,4-cyclohexylene group (one —$CH_2$— or two or more non-adjacent —$CH_2$— in this group may each be substituted with —O—) and (b) a 1,4-phenylene group (one —CH= or two or more non-adjacent —CH= in this group may each be substituted with —N=.)

where the group (a) and group (b) may each independently be substituted with a cyano group, a fluorine atom, or a chlorine atom, $L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, when OL represents 2 or 3 and a plurality of $L^{L2}$ are present, they may be the same or different; when OL represents 2 or 3 and a plurality of $B^{L3}$ are present, they may be the same or different; however, compounds represented by formula (2.5) and general formula (IV) are excluded.)

The number of compounds that can be used in combination is not particularly limited and a suitable combination of compounds is used in accordance with desired properties such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, six in another embodiment of the present invention, seven in another embodiment of the present invention, eight in another embodiment of the present invention, nine in another embodiment of the present invention, and ten or more in another embodiment of the present invention.

In the liquid crystal composition of the present invention, the content of the compound represented by general formula (L) needs to be appropriately adjusted according to the desired properties, such as low-temperature solubility, transition temperature, electrical reliability, birefringence, process compatibility, drop marks, ghosting, and dielectric anisotropy.

The lower limit of the preferable content relative to the total amount of the liquid crystal composition of the present invention is, for example, 1% in one embodiment of the present invention, 10% in another embodiment of the present invention, 20% in another embodiment of the present invention, 30% in another embodiment of the present invention, 40% in another embodiment of the present invention, 50% in another embodiment of the present invention, 55% in another embodiment of the present invention, 60% in another embodiment of the present invention, 65% in another embodiment of the present invention, 70% in another embodiment of the present invention, 75% in another embodiment of the present invention, and 80% in another embodiment of the present invention.

The upper limit of the preferable content relative to the total amount of the liquid crystal composition of the present invention is, for example, 95% in one embodiment of the present invention, 85% in another embodiment of the present invention, 75% in another embodiment of the present invention, 65% in another embodiment of the present invention, 55% in another embodiment of the present invention, 45% in another embodiment of the present invention, 35% in another embodiment of the present invention, and 25% in another embodiment of the present invention.

In order to keep the viscosity of the liquid crystal composition of the present invention to a low level and the response speed to a high level, the lower limit and the upper limit described above are preferably high. In order to keep Tni of the liquid crystal composition of the present invention to a high level and temperature stability to a satisfactory level, the lower limit and the upper limit described above are preferably high. In order to increase the dielectric anisotropy to keep the drive voltage low, the lower limit and the upper limit described above are preferably low.

The compound represented by general formula (L) is preferably a compound selected from the group of compounds represented by general formula (I), for example.

[Chem. 28]

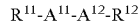
$$R^{11}\text{-}A^{11}\text{-}A^{12}\text{-}R^{12} \quad (I)$$

(In the formula, $R^{11}$ and $R^{12}$ each independently represent an alkyl or alkoxy group having 1 to 5 carbon atoms or an alkenyl group having 2 to 5 carbon atoms, $A^{11}$ and $A^{12}$ each independently represent a 1,4-cyclohexylene group, a 1,4-phenylene group, 2-fluoro-1,4-phenylene group, or a 3-fluoro-1,4-phenylene group.)

The number of compounds that can be used in combination is not particularly limited and a suitable combination of compounds is used in accordance with desired properties such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, and six or more in another embodiment of the present invention.

In the liquid crystal composition of the present invention, the content of the compound represented by general formula (I) needs to be adjusted according to the desired properties, such as low-temperature solubility, transition temperature, electrical reliability, birefringence, process compatibility, drop marks, ghosting, and dielectric anisotropy.

The lower limit of the preferable content relative to the total amount of the liquid crystal composition of the present invention is, for example, 3% in one embodiment of the present invention, 15% in another embodiment of the present invention, 18% in another embodiment of the present invention, 20% in another embodiment of the present invention, 29% in another embodiment of the present invention, 35% in another embodiment of the present invention, 42% in another embodiment of the present invention, 47% in another embodiment of the present invention, 53% in another embodiment of the present invention, 56% in another embodiment of the present invention, 60% in another embodiment of the present invention, and 65% in another embodiment of the present invention.

The upper limit of the preferable content relative to the total amount of the liquid crystal composition of the present invention is, for example, 75% in one embodiment of the present invention, 65% in another embodiment of the present invention, 55% in another embodiment of the present invention, 50% in another embodiment of the present invention, 45% in another embodiment of the present invention, 40% in another embodiment of the present invention, 35% in another embodiment of the present invention, and 30% in another embodiment of the present invention.

In order to keep the viscosity of the liquid crystal composition of the present invention to a low level and the response speed to a high level, the lower limit and the upper limit described above are preferably high. In order to keep Tni of the liquid crystal composition of the present invention to a high level and temperature stability to a satisfactory level, the lower limit and the upper limit described above are preferably medium. In order to increase the dielectric anisotropy to keep the drive voltage low, the lower limit and the upper limit described above are preferably low.

The compound represented by general formula (I) is preferably a compound selected from the group of compounds represented by general formula (I-1).

[Chem. 29]

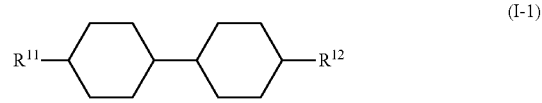

(In the formula, $R^{11}$ and $R^{12}$ each independently represent an alkyl or alkoxy group having 1 to 5 carbon atoms or an alkenyl group having 2 to 5 carbon atoms.)

The number of compounds that can be used in combination is not particularly limited and a suitable combination of compounds is used in accordance with desired properties such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, and five or more in another embodiment of the present invention.

In the liquid crystal composition of the present invention, the content of the compound represented by general formula (I-1) needs to be adjusted according to the desired properties, such as low-temperature solubility, transition temperature, electrical reliability, birefringence, process compatibility, drop marks, ghosting, and dielectric anisotropy.

The lower limit of the preferable content relative to the total amount of the liquid crystal composition of the present invention is, for example, 3% in one embodiment of the present invention, 15% in another embodiment of the present invention, 18% in another embodiment of the present invention, 25% in another embodiment of the present invention, 29% in another embodiment of the present invention, 31% in another embodiment of the present invention, 35% in another embodiment of the present invention, 43% in another embodiment of the present invention, 47% in another embodiment of the present invention, 50% in another embodiment of the present invention, 53% in another embodiment of the present invention, and 56% in another embodiment of the present invention.

The upper limit of the preferable content relative to the total amount of the liquid crystal composition of the present invention is, for example, 70% in one embodiment of the present invention, 60% in another embodiment of the present invention, 50% in another embodiment of the present invention, 45% in another embodiment of the present invention, 40% in another embodiment of the present invention, 35% in another embodiment of the present invention, 30% in another embodiment of the present invention, and 26% in another embodiment of the present invention.

In order to keep the viscosity of the liquid crystal composition of the present invention to a low level and the response speed to a high level, the lower limit and the upper limit described above are preferably high. In order to keep Tni of the liquid crystal composition of the present invention to a high level and temperature stability to a satisfactory level, the lower limit and the upper limit described above are preferably medium. In order to increase the dielectric anisotropy to keep the drive voltage low, the lower limit and the upper limit described above are preferably low.

[Chem. 30]

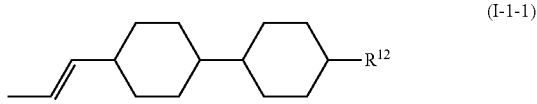

(I-1-1)

(In the formula, $R^{12}$ each independently represents an alkyl group having 1 to 5 carbon atoms or an alkenyl or alkoxy group having 2 to 5 carbon atoms.)

In the liquid crystal composition of the present invention, the content of the compound represented by general formula (I-1-1) needs to be adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 2% in one embodiment of the present invention, 4% in another embodiment of the present invention, 7% in another embodiment of the present invention, 11% in another embodiment of the present invention, 13% in another embodiment of the present invention, 15% in another embodiment of the present invention, 17% in another embodiment of the present invention, 20% in another embodiment of the present invention, 25% in another embodiment of the present invention, 30% in another embodiment of the present invention, 32% in another embodiment of the present invention, and 35% in another embodiment of the present invention.

The upper limit of the preferable content relative to the total amount of the liquid crystal composition of the present invention is, for example, 60% in one embodiment of the present invention, 50% in another embodiment of the present invention, 40% in another embodiment of the present invention, 35% in another embodiment of the present invention, 30% in another embodiment of the present invention, 25% in another embodiment of the present invention, 20% in another embodiment of the present invention, and 15% in another embodiment of the present invention.

The compound represented by general formula (I-1-1) is preferably a compound selected from the group of compounds represented by formula (1.1) to formula (1.3), is preferably a compound represented by formula (1.2) or formula (1.3), and is most preferably a compound represented by formula (1.3).

[Chem. 31]

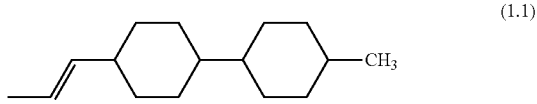

(1.1)

[Chem. 32]

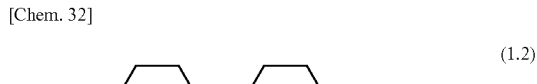

(1.2)

[Chem. 33]

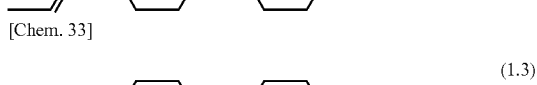

(1.3)

In the case where a compound represented by formula (1.2) or formula (1.3) is used alone, the content of the compound represented by formula (1.2) is preferably relatively high to improve the response speed and the content of the compound represented by formula (1.3) is preferably in the range described below to prepare a liquid crystal composition having high response speed and high electrical and optical reliability.

The content of the compound represented by formula (1.3) relative to the total amount of the liquid crystal composition of the present invention is preferably 7% by mass or more, more preferably 9% by mass or more, more preferably 11% by mass or more, and most preferably 15% by mass or more. The maximum content is preferably 35% by mass or less, more preferably 25% by mass or less, and most preferably 20% by mass or less.

The compound represented by general formula (I-1) is preferably a compound selected from the group of compounds represented by general formula (I-1-2).

[Chem. 34]

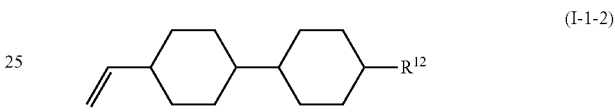

(I-1-2)

(In the formula, $R^{12}$ each independently represents an alkyl or alkoxy group having 1 to 5 carbon atoms or an alkenyl group having 2 to 5 carbon atoms.)

The number of compounds that can be used in combination is not particularly limited and a suitable combination is used in accordance with desired properties such as low-temperature solubility, transition temperature, electrical reliability, and birefringence. The number of compounds used is, for example, one in one embodiment of the present invention, two in another embodiment of the present invention, and three in another embodiment of the present invention.

In the liquid crystal composition of the present invention, the content of the compound represented by general formula (I-1-2) needs to be appropriately adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 7% in one embodiment of the present invention, 15% in another embodiment of the present invention, 18% in another embodiment of the present invention, 21% in another embodiment of the present invention, 24% in another embodiment of the present invention, 27% in another embodiment of the present invention, 30% in another embodiment of the present invention, 34% in another embodiment of the present invention, 37% in another embodiment of the present invention, 41% in another embodiment of the present invention, 47% in another embodiment of the present invention, and 50% in another embodiment of the present invention.

The upper limit of the preferable content relative to the total amount of the liquid crystal composition of the present invention is, for example, 60% in one embodiment of the present invention, 55% in another embodiment of the present invention, 45% in another embodiment of the present invention, 40% in another embodiment of the present invention, 35% in another embodiment of the present invention, 30% in another embodiment of the present invention, 25% in another embodiment of the present invention, and 20% in another embodiment of the present invention.

The compound represented by general formula (I-1-2) is preferably a compound selected from the group of compounds represented by formula (2.1) to formula (2.5) and preferably compounds represented by formula (2.2) to formula (2.5). In particular, a compound represented by formula (2.2) is preferable since the response speed of the liquid crystal composition of the present invention is notably improved. When high Tni is desirable rather than the response speed, a compound represented by formula (2.3) or formula (2.4) is preferably used. The content of the compounds represented by formula (2.4) and formula (2.5) is preferably less than 30% in order to improve the low-temperature solubility.

[Chem. 35]

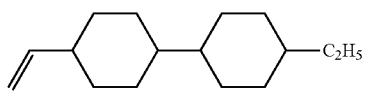
(2.1)

[Chem. 36]

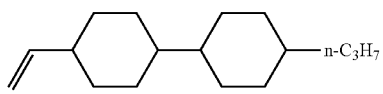
(2.2)

[Chem. 37]

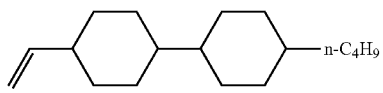
(2.3)

[Chem. 38]

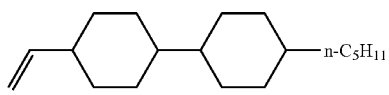
(2.4)

In the liquid crystal composition of the present invention, the content of the compound represented by formula (2.3) relative to the total amount of the liquid crystal composition of the present invention is preferably 5% by mass or more, more preferably 10% by mass, more preferably 14% by mass or more, more preferably 17% by mass or more, more preferably 19% by mass or more, more preferably 22% by mass or more, more preferably 25 mass or more, more preferably 27 mass or more, more preferably 30% by mass or more, more preferably 33% by mass or more, and most preferably 36% by mass or more. The maximum content is preferably 55% by mass or less, more preferably 50% by mass or less, yet more preferably 45% by mass or less, and most preferably 40% by mass or less.

The compound represented by general formula (I) is preferably a compound selected from the group of compounds represented by general formula (I-2).

[Chem. 39]

(I-2)

(In the formula, $R^{13}$ and $R^{14}$ each independently represent an alkyl group having 1 to 5 carbon atoms.)

The number of compounds that can be used in combination is not particularly limited and a suitable combination is used in accordance with desired properties such as low-temperature solubility, transition temperature, electrical reliability, and birefringence. The number of compounds used is, for example, one in one embodiment of the present invention, two in another embodiment of the present invention, and three in another embodiment of the present invention.

In the liquid crystal composition of the present invention, the content of the compound represented by general formula (I-2) needs to be adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 4% in another embodiment of the present invention, 15% in another embodiment of the present invention, 25% in another embodiment of the present invention, 30% in another embodiment of the present invention, 35% in another embodiment of the present invention, 38% in another embodiment of the present invention, 40% in another embodiment of the present invention, 42% in another embodiment of the present invention, 45% in another embodiment of the present invention, 47% in another embodiment of the present invention, and 50% in another embodiment of the present invention.

The upper limit of the preferable content relative to the total amount of the liquid crystal composition of the present invention is, for example, 60% in one embodiment of the present invention, 55% in another embodiment of the present invention, 45% in another embodiment of the present invention, 40% in another embodiment of the present invention, 30% in another embodiment of the present invention, 20% in another embodiment of the present invention, 15% in another embodiment of the present invention, and 5% in another embodiment of the present invention. The compound represented by general formula (I-2) is preferably a compound selected from the group of compounds represented by formula (3.1) to formula (3.4) and preferably a compound represented by formula (3.1), formula (3.3), or formula (3.4). In particular, a compound represented by formula (3.2) is preferable since the response speed of the liquid crystal composition of the present invention is notably improved. When high Tni is desirable rather than the response speed, a compound represented by formula (3.3) or formula (3.4) is preferably used. The content of the compounds represented by formula (3.3) and formula (3.4) is preferably less than 20% in order to improve low-temperature solubility.

The compound represented by general formula (I-2) is preferably a compound selected from the group of compounds represented by formula (3.1) to formula (3.4) and preferably compounds represented by formula (3.1), formula (3.3), and/or formula (3.4).

[Chem. 40]

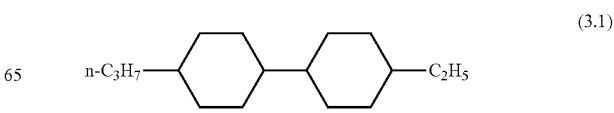
(3.1)

[Chem. 41]

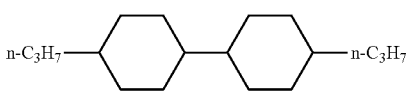

(3.2)

[Chem. 42]

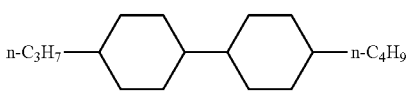

(3.3)

[Chem. 43]

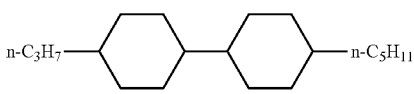

(3.4)

In the liquid crystal composition of the present invention, the content of the compound represented by formula (3.3) relative to the total amount of the liquid crystal composition of the present invention is preferably 2% by mass or more, more preferably 3% by mass, more preferably 4% by mass or more, more preferably 10% by mass or more, more preferably 12% by mass or more, more preferably 14% by mass or more, more preferably 16 mass or more, more preferably 20 mass or more, more preferably 23% by mass or more, more preferably 26% by mass or more, and most preferably 30% by mass or more. The maximum content is preferably 40% by mass or less, more preferably 37% by mass or less, yet more preferably 34% by mass or less, and most preferably 32% by mass or less.

The compound represented by general formula (I) is preferably a compound selected from the group of compounds represented by general formula (I-3).

[Chem. 44]

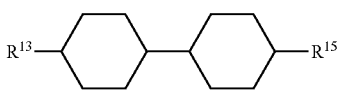

(I-3)

(In the formula, $R^{13}$ represents an alkyl group having 1 to 5 carbon atoms and $R^{15}$ represents an alkoxy group having 1 to 4 carbon atoms.)

The number of compounds that can be used in combination is not particularly limited and a suitable combination of compounds is used in accordance with desired properties such as low-temperature solubility, transition temperature, electrical reliability, and birefringence. The number of compounds used is, for example, one in one embodiment of the present invention, two in another embodiment of the present invention, and three in another embodiment of the present invention.

In the liquid crystal composition of the present invention, the content of the compound represented by general formula (I-3) needs to be adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 4% in another embodiment of the present invention, 15% in another embodiment of the present invention, 25% in another embodiment of the present invention, 30% in another embodiment of the present invention, 35% in another embodiment of the present invention, 38% in another embodiment of the present invention, 40% in another embodiment of the present invention, 42% in another embodiment of the present invention, 45% in another embodiment of the present invention, 47% in another embodiment of the present invention, and 50% in another embodiment of the present invention.

The upper limit of the preferable content relative to the total amount of the liquid crystal composition of the present invention is, for example, 60% in one embodiment of the present invention, 55% in another embodiment of the present invention, 45% in another embodiment of the present invention, 40% in another embodiment of the present invention, 30% in another embodiment of the present invention, 20% in another embodiment of the present invention, 15% in another embodiment of the present invention, and 5% in another embodiment of the present invention.

Setting the content to a relatively high level is highly effective if low-temperature solubility is important and, on the contrary, setting the content to a relatively low level is highly effective if response speed is important. If drop marks and ghosting properties are to be improved, the content range is preferably set medium.

The compound represented by general formula (I-3) is preferably a compound selected from the group of compounds represented by formula (4.1) to formula (4.3) and is preferably a compound represented by formula (4.3).

[Chem. 45]

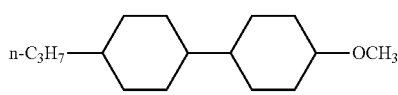

(4.1)

[Chem. 46]

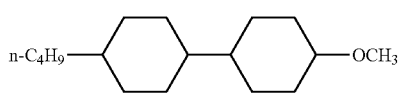

(4.2)

[Chem. 47]

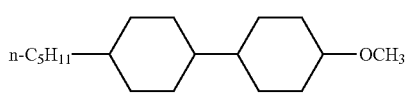

(4.3)

The content of the compound represented by formula (4.3) relative to the total amount of the liquid crystal composition of the present invention is preferably 2% by mass or more, more preferably 4% by mass, more preferably 6% by mass or more, more preferably 8% by mass or more, more preferably 10% by mass or more, more preferably 12% by mass or more, more preferably 14 mass or more, more preferably 16 mass or more, more preferably 18% by mass or more, more preferably 20% by mass or more, and most preferably 22% by mass or more. The maximum content is preferably 30% by mass or less, more preferably 25% by mass or less, more preferably 24% by mass or less, and most preferably 23% by mass or less.

The compound represented by general formula (I) is preferably a compound selected from the group of compounds represented by general formula (I-4).

[Chem. 48]

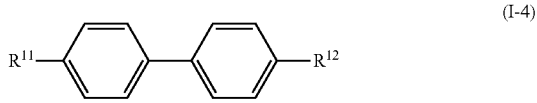

(I-4)

(In the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms.)

The number of compounds that can be used in combination is not particularly limited and a suitable combination of compounds is used in accordance with desired properties such as low-temperature solubility, transition temperature, electrical reliability, and birefringence. The number of compounds used is, for example, one in one embodiment of the present invention and two in another embodiment of the present invention.

In the liquid crystal composition of the present invention, the compound represented by general formula (I-4) needs to be appropriately adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 5% in another embodiment of the present invention, 6% in another embodiment of the present invention, 8% in another embodiment of the present invention, 10% in another embodiment of the present invention, 12% in another embodiment of the present invention, 15% in another embodiment of the present invention, 20% in another embodiment of the present invention, 25% in another embodiment of the present invention, 30% in another embodiment of the present invention, 35% in another embodiment of the present invention, and 40% in another embodiment of the present invention.

The upper limit of the preferable content relative to the total amount of the liquid crystal composition of the present invention is, for example 50% in one embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, and 5% in another embodiment of the present invention.

Setting the content to a relatively high level is highly effective for obtaining high birefringence and, on the contrary, setting the content to a relatively low level is highly effective if high Tni is important. In order to improve drop marks and ghosting properties, the content range is preferably set medium.

The compound represented by general formula (I-4) is preferably a compound selected from the group of compounds represented by formula (5.1) to formula (5.4) and is preferably compounds represented by formula (5.2) to formula (5.4).

[Chem. 49]

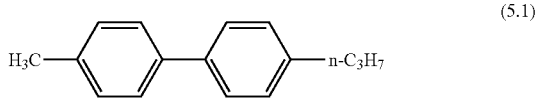

(5.1)

[Chem. 50]

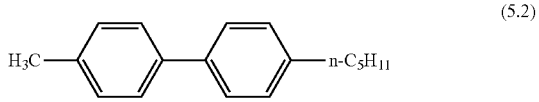

(5.2)

[Chem. 51]

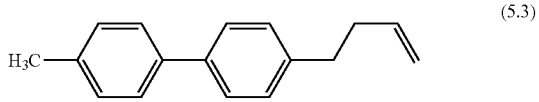

(5.3)

[Chem. 52]

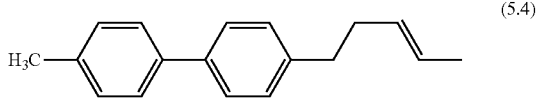

(5.4)

The content of the compound represented by formula (5.4) relative to the total amount of the liquid crystal composition of the present invention is preferably 2% by mass or more, more preferably 4% by mass, more preferably 6% by mass or more, more preferably 8% by mass or more, more preferably 10% by mass or more, more preferably 12% by mass or more, more preferably 14 mass or more, more preferably 16 mass or more, more preferably 18% by mass or more, more preferably 20% by mass or more, and most preferably 22% by mass or more. The maximum content is preferably 30% by mass or less, more preferably 25% by mass or less, more preferably 24% by mass or less, and most preferably 23% by mass or less.

The compound represented by general formula (I) is preferably a compound represented by general formula (I-5).

[Chem. 53]

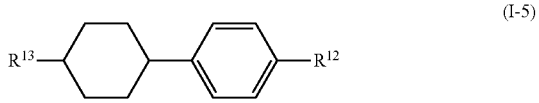

(I-5)

(In the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms.)

The number of compounds that can be used in combination is not particularly limited and a suitable combination of compounds is used in accordance with desired properties such as low-temperature solubility, transition temperature, electrical reliability, and birefringence. The number of compounds used is, for example, one in one embodiment of the present invention and two in another embodiment of the present invention.

In the liquid crystal composition of the present invention, the content of the compound represented by general formula (I-5) needs to be adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 1% in one embodiment of the present invention, 5% in another embodiment of the present invention, 8% in another embodiment of the present invention, 11% in another embodiment of the present invention, 13% in another embodiment of the present invention, 15% in another embodiment of the present invention, 17% in another embodiment of the present invention, 20% in another embodiment of the present invention, 25% in another embodiment of the present invention, 30% in another embodiment of the present invention, 35% in another embodiment of the present invention, and 40% in another embodiment of the present invention.

The upper limit of the preferable content relative to the total amount of the liquid crystal composition of the present invention is, for example 50% in one embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, and 5% in another embodiment of the present invention.

Setting the content to a relatively high level is highly effective if low-temperature solubility is important and, on the contrary, setting the content to a relatively low level is highly effective if response speed is important. In order to improve drop marks and ghosting properties, the content range is preferably set medium.

The compound represented by general formula (I-5) is preferably a compound selected from the group of compounds represented by formula (6.1) to formula (6.6) and preferably compounds represented by formula (6.3), formula (6.4), and formula (6.6).

[Chem. 54]

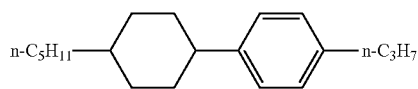

(6.1)

[Chem. 55]

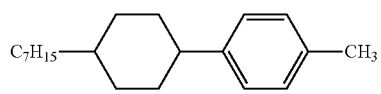

(6.2)

[Chem. 56]

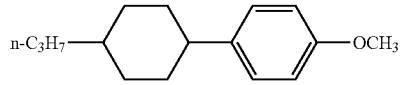

(6.3)

[Chem. 57]

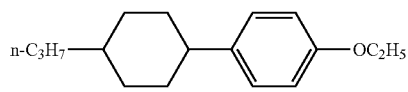

(6.4)

[Chem. 58]

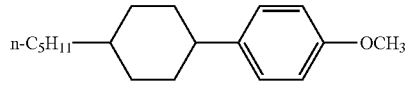

(6.5)

[Chem. 59]

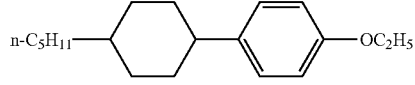

(6.6)

For example, the content of the compound represented by formula (6.6) relative to the total amount of the liquid crystal composition of the present invention is preferably 2% by mass or more, more preferably 4% by mass, more preferably 5% by mass or more, more preferably 6% by mass or more, more preferably 9% by mass or more, more preferably 12% by mass or more, more preferably 14 mass or more, more preferably 16 mass or more, more preferably 18% by mass or more, more preferably 20% by mass or more, and most preferably 22% by mass or more. The maximum content is preferably 30% by mass or less, more preferably 25% by mass or less, yet more preferably 24% by mass or less, and most preferably 23% by mass or less.

The compound represented by general formula (I) is preferably a compound selected from the group of compounds represented by general formula (I-6).

[Chem. 60]

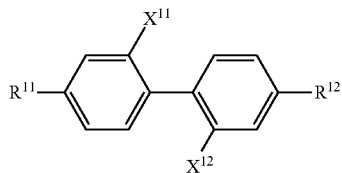

(I-6)

(In the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms, $X^{11}$ and $X^{12}$ each independently represent a fluorine atom or a hydrogen atom, and one of $X^{11}$ and $X^{12}$ represents a fluorine atom.)

The content of the compound represented by general formula (I-6) relative to the total amount of the liquid crystal composition of the present invention is preferably 2% by mass or more, more preferably 4% by mass, more preferably 5% by mass or more, more preferably 6% by mass or more, more preferably 9% by mass or more, more preferably 12% by mass or more, more preferably 14 mass or more, more preferably 16 mass or more, more preferably 18% by mass or more, more preferably 20% by mass or more, and most preferably 22% by mass or more. The maximum content is preferably 30% by mass or less, more preferably 25% by mass or less, yet more preferably 24% by mass or less, and most preferably 23% by mass or less.

The compound represented by general formula (I-6) is preferably a compound represented by formula (7.1).

[Chem. 61]

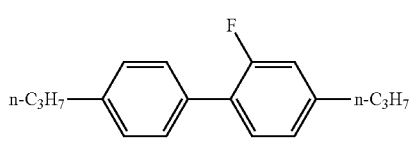

(7.1)

The compound represented by general formula (I) is preferably a compound selected from the group of compounds represented by general formula (I-7).

[Chem. 62]

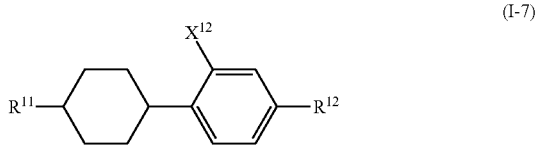
(I-7)

(In the formula, $R^{11}$ and $R^{12}$ each independently represent an alkyl group having 1 to 5 carbon atoms, an alkenyl group having 4 or 5 carbon atoms, or an alkoxy group having 1 to 4 carbon atoms and X11 and X12 each independently represent a fluorine atom or a chlorine atom.)

The content of the compound represented by general formula (I-7) relative to the total amount of the liquid crystal composition of the present invention is preferably 1% by mass or more, more preferably 2% by mass, more preferably 3% by mass or more, more preferably 4% by mass or more, more preferably 6% by mass or more, more preferably 8% by mass or more, more preferably 10 mass or more, more preferably 12 mass or more, more preferably 15% by mass or more, more preferably 18% by mass or more, and most preferably 21% by mass or more. The maximum content is preferably 30% by mass or less, more preferably 25% by mass or less, yet more preferably 24% by mass or less, and most preferably 22% by mass or less.

The compound represented by general formula (I-7) is preferably a compound represented by formula (8.1).

[Chem. 63]

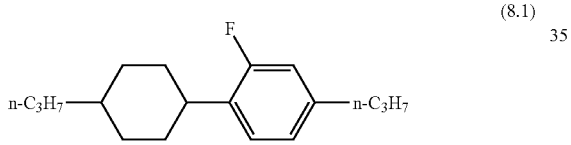
(8.1)

The compound represented by general formula (I) is preferably a compound selected from the group of compounds represented by general formula (I-8).

[Chem. 64]

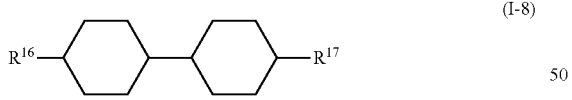
(I-8)

(In the formula, $R^{16}$ and $R^{17}$ each independently represent an alkenyl group having 2 to 5 carbon atoms.)

The number of compounds that can be used in combination is not particularly limited, and one to three compounds are preferably used in combination in accordance with desired properties such as low-temperature solubility, transition temperature, electrical reliability, and birefringence. The content of the compound represented by general formula (I-8) relative to the total amount of the liquid crystal composition of the present invention is preferably 5% by mass or more, more preferably 10% by mass, more preferably 15% by mass or more, more preferably 20% by mass or more, more preferably 25% by mass or more, more preferably 30% by mass or more, more preferably 35 mass or more, more preferably 40 mass or more, more preferably 45% by mass or more, more preferably 50% by mass or more, and most preferably 55% by mass or more according to the desired properties, such as low-temperature solubility, transition temperature, electrical reliability, birefringence, process compatibility, drop marks, ghosting, and dielectric anisotropy. The maximum content is preferably 65% by mass or less, more preferably 60% by mass or less, yet more preferably 58% by mass or less, and most preferably 56% by mass or less.

The compound represented by general formula (I-8) is preferably a compound selected from the group of compounds represented by formula (9.1) to formula (9.10) and is preferably any of compounds represented by formula (9.2), formula (9.4), and formula (9.7).

[Chem. 65]

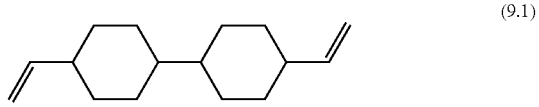
(9.1)

[Chem. 66]

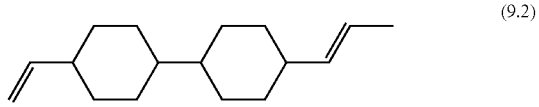
(9.2)

[Chem. 67]

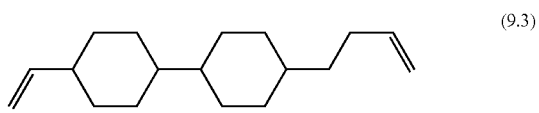
(9.3)

[Chem. 68]

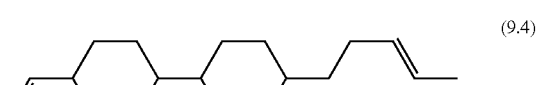
(9.4)

[Chem. 69]

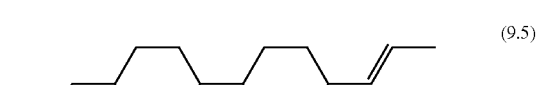
(9.5)

[Chem. 70]

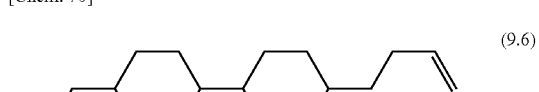
(9.6)

[Chem. 71]

(9.7)

[Chem. 72]

(9.8)

-continued

[Chem. 73]

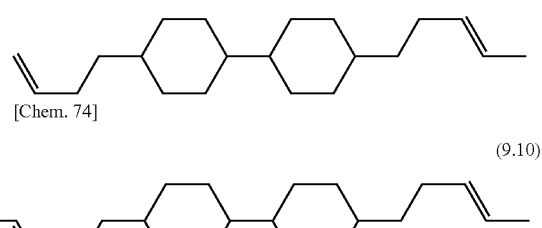

(9.9)

[Chem. 74]

(9.10)

The compound represented by general formula (L) is, for example, preferably a compound selected from compounds represented by general formula (II).

[Chem. 75]

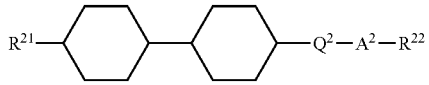

(II)

($R^{21}$ and $R^{22}$ each independently represent an alkenyl group having 2 to 5 carbon atoms, an alkyl group having 1 to 5 carbon atoms, or an alkoxy group having 1 to 4 carbon atoms, $A^2$ represents a 1,4-cyclohexylene group or a 1,4-phenylene group, and $Q^2$ represents a single bond, —COO—, —$CH_2$—$CH_2$—, or —$CF_2O$—.)

The number of compounds that can be used in combination is not particularly limited, and a suitable combination of compounds is used in accordance with desired properties such as low-temperature solubility, transition temperature, electrical reliability, and birefringence. The number of compounds used is, for example, one in one embodiment of the present invention, two in another embodiment of the present invention, three in another embodiment of the present invention, and four or more in another embodiment of the present invention.

In the liquid crystal composition of the present invention, the content of the compound represented by general formula (II) needs to be appropriately adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 5% in another embodiment of the present invention, 7% in another embodiment of the present invention, 10% in another embodiment of the present invention, 14% in another embodiment of the present invention, 16% in another embodiment of the present invention, 20% in another embodiment of the present invention, 23% in another embodiment of the present invention, 26% in another embodiment of the present invention, 30% in another embodiment of the present invention, 35% in another embodiment of the present invention, and 40% in another embodiment of the present invention.

The upper limit of the preferable content relative to the total amount of the liquid crystal composition of the present invention is, for example, 50% in one embodiment of the present invention, 40% in another embodiment of the present invention, 35% in another embodiment of the present invention, 30% in another embodiment of the present invention, 20% in another embodiment of the present invention, 15% in another embodiment of the present invention, 10% in another embodiment of the present invention, and 5% in another embodiment of the present invention.

The compound represented by general formula (II) is, for example, preferably a compound selected from the group of compounds represented by general formula (II-1).

[Chem. 76]

(II-1)

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

The content of the compound represented by general formula (II-1) is preferably adjusted in accordance with desired properties such as low-temperature solubility, transition temperature, electrical reliability, and birefringence. The content is preferably 4% by mass or more, more preferably 8% by mass or more, and most preferably 12% by mass or more. The maximum content is preferably 24% by mass or less, more preferably 18% by mass or less, and most preferably 14% by mass or less.

The compound represented by general formula (II-1) is, for example, preferably a compound represented by formula (10.1).

[Chem. 77]

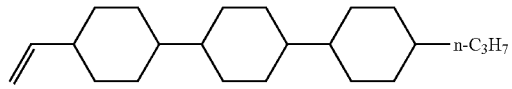

(10.1)

The compound represented by general formula (II) is, for example, preferably a compound selected from the group of compounds represented by general formula (II-2).

[Chem. 78]

(II-2)

($R^{23}$ represents an alkenyl group having 2 to 5 carbon atoms and $R^{24}$ represents an alkyl group having 1 to 5 carbon atoms or an alkoxy group having 1 to 4 carbon atoms.)

The number of compounds that can be used in combination is not particularly limited and compounds are used in combination in accordance with desired properties such as low-temperature solubility, transition temperature, electrical reliability, and birefringence. The number of compounds used is, for example, one in one embodiment of the present invention and two or more in another embodiment of the present invention.

In the liquid crystal composition of the present invention, the content of the compound represented by general formula (II-2) needs to be appropriately adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 3% in one embodiment of the present invention, 5% in another embodiment of the present invention, 7% in another embodiment of the present invention, 10% in another embodiment of the present invention, 14% in another embodiment of the present invention, 16% in another embodiment of the present invention, 20% in another embodiment of the present invention, 23% in another embodiment of the present invention, 26% in another embodiment of the present invention, 30% in another embodiment of the present invention, 35% in another embodiment of the present invention, and 40% in another embodiment of the present invention.

The upper limit of the preferable content relative to the total amount of the liquid crystal composition of the present invention is, for example, 50% in one embodiment to of the present invention, 40% in another embodiment of the present invention 35% in another embodiment of the present invention, 30% in another embodiment of the present invention, 20% in another embodiment of the present invention, 15% in another embodiment of the present invention, 10% in another embodiment of the present invention, and 5% in another embodiment of the present invention.

The compound represented by general formula (II-2) is preferably any of compounds represented by formula (11.1) to formula (11.3), for example.

[Chem. 79]

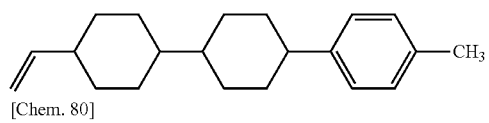

(11.1)

[Chem. 80]

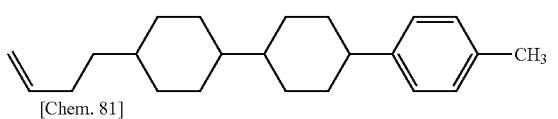

(11.2)

[Chem. 81]

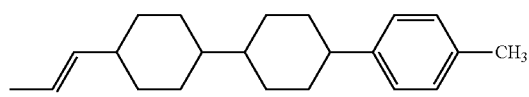

(11.3)

One or both of the compounds represented by formula (11.1) and formula (11.2) may be contained in accordance with desired properties such as low-temperature solubility, transition temperature, electrical reliability, and birefringence, or all of the compounds represented by formula (11.1) to formula (11.3) may be contained. The content of the compound represented by formula (11.1) or formula (11.2) relative to the total amount of the liquid crystal composition of the present invention is preferably 3% by mass, more preferably 5% by mass or more, more preferably 7% by mass or more, more preferably 9% by mass or more, more preferably 11% by mass or more, more preferably 12% by mass or more, more preferably 13% by mass or more, more preferably 18% by mass or more, and most preferably 21% by mass or more. The maximum content is preferably 40% by mass or less, more preferably 30% by mass or less, and most preferably 25% by mass or less. The content of the compound represented by formula (11.2) relative to the total amount of the liquid crystal composition of the present invention is preferably 3% by mass, more preferably 5% by mass or more, more preferably 8% by mass or more, more preferably 10% by mass or more, more preferably 12% by mass or more, more preferably 15% by mass or more, more preferably 17% by mass or more, and most preferably 19% by mass or more. The maximum content is preferably 40% by mass or less, more preferably 30% by mass or less, and most preferably 25% by mass or less. In the case where both the compounds represented by formula (11.1) and formula (11.2) are contained, the total of the two compounds relative to the total amount of the liquid crystal composition of the present invention is preferably 15% by mass or more, more preferably 19% by mass or more, more preferably 24% by mass or more, and most preferably 30% by mass or more. The maximum content is preferably 45% by mass or less, more preferably 40% by mass or less, and most preferably 35% by mass or less.

The compound represented by general formula (II) is, for example, preferably a compound selected from the group of compounds represented by general formula (II-3).

[Chem. 82]

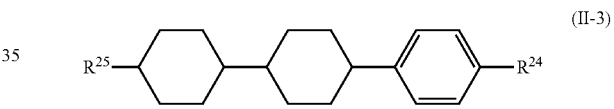

(II-3)

($R^{25}$ represents an alkyl group having 1 to 5 carbon atoms and $R^{24}$ represents an alkyl group having 1 to 5 carbon atoms or an alkoxy group having 1 to 4 carbon atoms.)

The number of compounds that can be used in combination is not particularly limited, and preferably one to three compounds are selected from these and contained in accordance with desired properties such as low-temperature solubility, transition temperature, electrical reliability, and birefringence.

The content of the compound represented by general formula (II-3) needs to be appropriately adjusted according to the desired properties, such as low-temperature solubility, transition temperature, electrical reliability, birefringence, process compatibility, drop marks, ghosting, and dielectric anisotropy. The lower limit of the preferable content relative to the total amount of the liquid crystal composition of the present invention is, for example, 2%, more preferably 5%, more preferably 8%, more preferably 11%, more preferably 14%, more preferably 17%, more preferably 20%, more preferably 23%, more preferably 26%, and most preferably 29%. The upper limit of the preferable content relative to the total amount of the liquid crystal composition of the present invention is, for example, preferably 45%, more preferably 40%, more preferably 35%, more preferably 30%, more preferably 25%, more preferably 20%, more preferably 15%, and most preferably 10%.

The compound represented by general formula (II-3) is, for example, a preferably any of compounds represented by formula (12.1) to formula (12.3).

[Chem. 83]

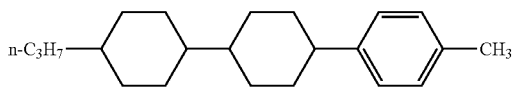
(12.1)

[Chem. 84]

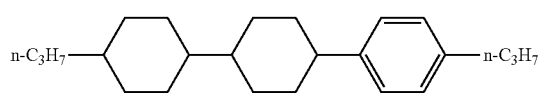
(12.2)

[Chem. 85]

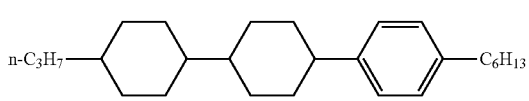
(12.3)

One or both of the compounds represented by formula (12.1) and formula (12.2) may be contained in accordance with the desired properties such as low-temperature solubility, transition temperature, electrical reliability, and birefringence. The content of the compound represented by formula (12.1) or formula (11.2) relative to the total amount of the liquid crystal composition of the present invention is preferably 3% by mass, more preferably 5% by mass or more, more preferably 7% by mass or more, more preferably 9% by mass or more, more preferably 11% by mass or more, more preferably 12% by mass or more, more preferably 13% by mass or more, more preferably 18% by mass or more, and most preferably 21% by mass or more. The maximum content is preferably 40% by mass or less, more preferably 30% by mass or less, and most preferably 25% by mass or less. The content of the compound represented by formula (12.2) relative to the total amount of the liquid crystal composition of the present invention is preferably 3% by mass, more preferably 5% by mass or more, more preferably 8% by mass or more, more preferably 10% by mass or more, more preferably 12% by mass or more, more preferably 15% by mass or more, more preferably 17% by mass or more, and most preferably 19% by mass or more. The maximum content is preferably 40% by mass or less, more preferably 30% by mass or less, and most preferably 25% by mass or less. In the case where both the compounds represented by formula (12.1) and formula (12.2) are contained, the total of the two compounds relative to the total amount of the liquid crystal composition of the present invention is preferably 15% by mass or more, more preferably 19% by mass or more, more preferably 24% by mass or more, and most preferably 30% by mass or more. The maximum content is preferably 45% by mass or less, more preferably 40% by mass or less, and most preferably 35% by mass or less.

The content of the compound represented by formula (12.3) relative to the total amount of the liquid crystal composition of the present invention is preferably 0.05% by mass or more, more preferably 0.1% by mass or more, and most preferably 0.2% by mass or more. The maximum content is preferably 2% by mass or less, more preferably 1% by mass or less, and most preferably 0.5% by mass or less. The compound represented by formula (12.3) may be an optically active compound.

The compound represented by general formula (II-3) is, for example, preferably a compound selected from the group of compounds represented by general formula (II-3-1).

[Chem. 86]

(II-3-1)

($R^{25}$ represents an alkyl group having 1 to 5 carbon atoms and $R^{26}$ represents an alkoxy group having 1 to 4 carbon atoms.)

The number of compounds that can be used in combination is not particularly limited and one to three compounds are preferably selected from these compounds and used in accordance with desired properties such as low-temperature solubility, transition temperature, electrical reliability, and birefringence.

The content of the compound represented by general formula (II-3-1) is preferably adjusted in accordance with desired properties such as low-temperature solubility, transition temperature, electrical reliability, and birefringence, and is preferably 1% by mass or more, more preferably 4% by mass or more, and most preferably 8% by mass or more. The maximum content is preferably 24% by mass or less, more preferably 18% by mass or less, and most preferably 14% by mass or less.

The compound represented by general formula (II-3-1) is preferably any of compounds represented by formula (13.1) to formula (13.4) and is particularly preferably a compound represented by formula (13.3), for example.

[Chem. 87]

(13.1)

[Chem. 88]

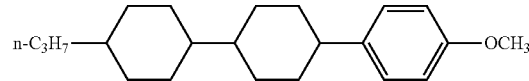
(13.2)

[Chem. 89]

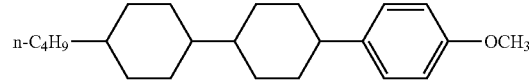
(13.3)

[Chem. 90]

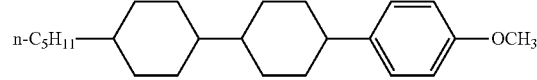
(13.4)

The compound represented by general formula (II) is preferably a compound selected from the group of compounds represented by general formula (II-4), for example.

[Chem. 91]

(II-4)

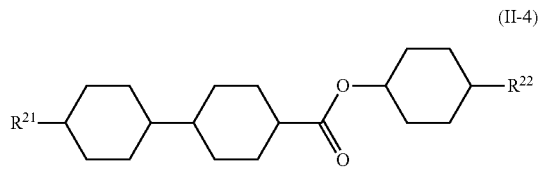

($R^{21}$ and $R^{22}$ each independently represent an alkenyl group having 2 to 5 carbon atoms, an alkyl group having 1 to 5 carbon atoms, or an alkoxy group having 1 to 4 carbon atoms.)

Of these compounds, only one may be contained or two or more compounds may be contained and a suitable combination of compounds is preferably used according to the desired properties. The number of compounds that can be used in combination is not particularly limited; one or two selected from these are preferably used and one to three selected from these are more preferably used in accordance with desired properties such as low-temperature solubility, transition temperature, electrical reliability, and birefringence.

The content of the compound represented by general formula (II-4) relative to the total amount of the liquid crystal composition of the present invention is preferably 1% by mass or more, more preferably 2% by mass or more, more preferably 3% by mass or more, more preferably 4% by mass or more, and most preferably 5% by mass or more. The maximum content is preferably 15% by mass or less, more preferably 12% by mass or less, and most preferably 7% by mass or less.

The compound represented by general formula (II-4) is, for example, preferably any of compounds represented by formula (14.1) to formula (14.5) and is particularly preferably a compound represented by formula (14.2) and/or formula (14.5).

[Chem. 92]

(14.1)

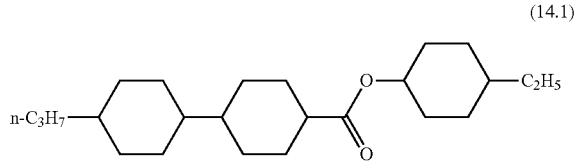

[Chem. 93]

(14.2)

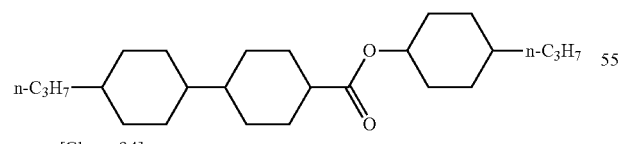

[Chem. 94]

(14.3)

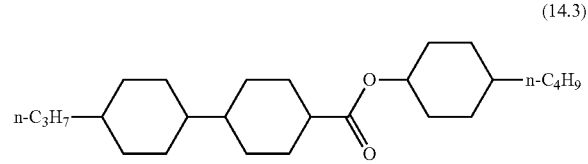

[Chem. 95]

(14.4)

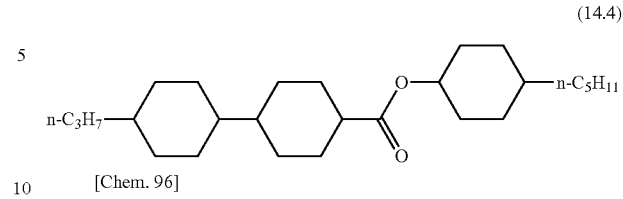

[Chem. 96]

(14.5)

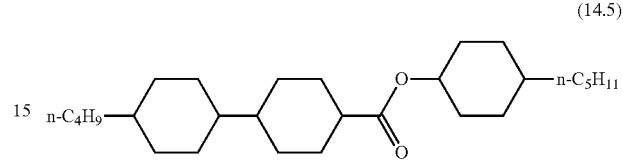

The compound represented by general formula (L) is preferably a compound selected from the group of compounds represented by general formula (III).

[Chem. 97]

(III)

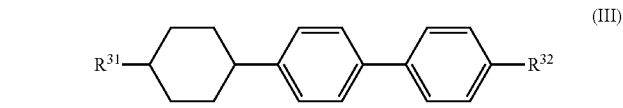

($R^{31}$ and $R^{32}$ each independently represent an alkenyl group having 2 to 5 carbon atoms, an alkyl group having 1 to 5 carbon atoms, or an alkoxy group having 1 to 4 carbon atoms.)

The content of the compound represented by general formula (III) relative to the total amount of the liquid crystal composition of the present invention is preferably 3% by mass or more, more preferably 6% by mass or more, and most preferably 8% by mass or more considering the desired solubility, birefringence, etc. The maximum content is preferably 25% by mass or less, more preferably 20% by mass or less, and most preferably 15% by mass or less.

The compound represented by general formula (III) is, for example, preferably a compound represented by formula (15.1) or formula (15.2) and more preferably a compound represented by formula (15.1).

[Chem. 98]

(15.1)

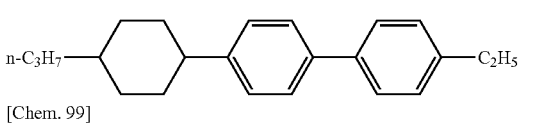

[Chem. 99]

(15.2)

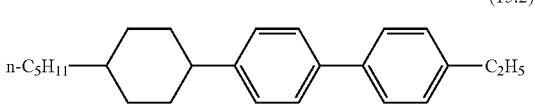

The compound represented by general formula (III) is preferably a compound selected from the group of compounds represented by general formula (III-1).

[Chem. 100]

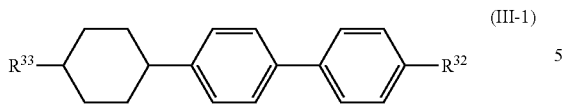
(III-1)

($R^{33}$ represents an alkenyl group having 2 to 5 carbon atoms and $R^{32}$ each independently represents an alkyl group having 1 to 5 carbon atoms or an alkoxy group having 1 to 4 carbon atoms.)

The content is preferably adjusted in accordance with desired properties such as low-temperature solubility, transition temperature, electrical reliability, and birefringence, and is preferably 4% by mass or more, more preferably 6% by mass or more, and most preferably 10% by mass or more. The maximum content is preferably 23% by mass or less, more preferably 18% by mass or less, and most preferably 13% by mass or less.

The compound represented by general formula (III-1) is preferably a compound represented by formula (16.1) or formula (16.2), for example.

[Chem. 101]

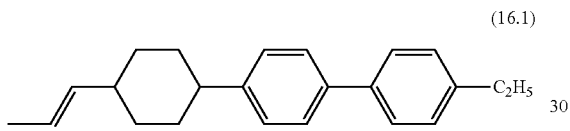
(16.1)

[Chem. 102]

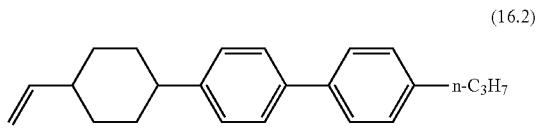
(16.2)

The compound represented by general formula (III) is preferably a compound selected from the group of compounds represented by general formula (III-2).

[Chem. 103]

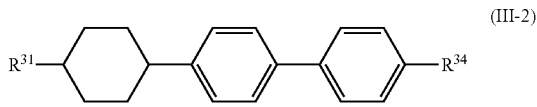
(III-2)

($R^{31}$ represents an alkyl group having 1 to 5 carbon atoms and $R^{34}$ represents an alkoxy group having 1 to 4 carbon atoms.)

The content of the compound represented by general formula (III-2) is preferably adjusted in accordance with desired properties such as low-temperature solubility, transition temperature, electrical reliability, and birefringence, and is preferably 4% by mass or more, more preferably 6% by mass or more, and most preferably 10% by mass or more. The maximum content is preferably 23% by mass or less, more preferably 18% by mass or less, and most preferably 13% by mass or less.

The compound represented by general formula (III-2) is preferably a compound selected from the group of compounds represented by formula (17.1) to formula (17.3) and is more preferably a compound represented by formula (17.3), for example.

[Chem. 104]

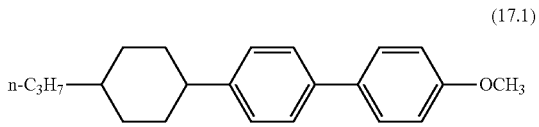
(17.1)

[Chem. 105]

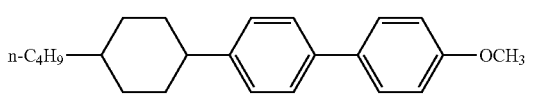
(17.2)

[Chem. 106]

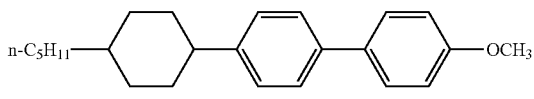
(17.3)

The compound represented by general formula (L) is preferably a compound selected from the group represented by general formula (V).

[Chem. 107]

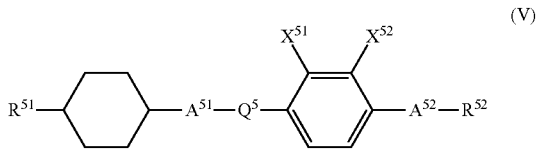
(V)

(In the formula, $R^{51}$ and $R^{52}$ each independently represent an alkyl group having 1 to 5 carbon atoms, $A^{51}$ and $A^{52}$ each independently represent a 1,4-cyclohexylene group or a 1,4-phenylene group, $Q^5$ represents a single bond or —COO—, and $X^{51}$ and $X^{52}$ each independently represent a fluorine atom or a hydrogen atom.)

The number of compounds that can be used in combination is not particularly limited and compounds are used in combination in accordance with desired properties such as low-temperature solubility, transition temperature, electrical reliability, and birefringence. The number of compounds used is, for example, one in one embodiment of the present invention, two in another embodiment of the present invention, three in another embodiment of the present invention, and four in another embodiment of the present invention.

The lower limit of the preferable content relative to the total amount of the liquid crystal composition of the present invention is, for example, 2% in one embodiment, 4% in another embodiment of the present invention, 7% in another embodiment of the present invention, 10% in another embodiment of the present invention, 12% in another embodiment of the present invention, 15% in another embodiment of the present invention, 17% in another embodiment of the present invention, 18% in another embodiment of the present invention, 20% in another embodiment of the present invention, and 22% in another embodiment of the present invention.

The upper limit of the preferable content relative to the total amount of the liquid crystal composition of the present invention is, for example, 40% in one embodiment of the present invention, 30% in another embodiment of the present invention, 25% in another embodiment of the present invention, 20% in another embodiment of the present invention, 15% in another embodiment of the present invention, 10% in another embodiment of the present invention, 5% in another embodiment of the present invention, and 4% in another embodiment of the present invention.

The compound represented by general formula (V) is preferably a compound represented by general formula (V-1).

[Chem. 108]

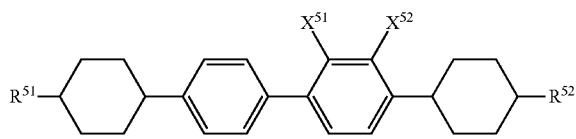

(V-1)

(In the formula, $R^{51}$ and $R^{52}$ each independently represent an alkyl group having 1 to 5 carbon atoms and $X^{51}$ and $X^{52}$ each independently represent a fluorine atom or a hydrogen atom.)

The compound represented by general formula (V-1) is preferably a compound represented by general formula (V-1-1).

[Chem. 109]

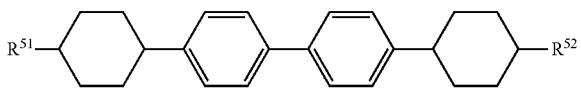

(V-1-1)

(In the formula, $R^{51}$ and $R^{52}$ each independently represent an alkyl group having 1 to 5 carbon atoms.)

The content of the compound represented by general formula (V-1-1) relative to the total amount of the liquid crystal composition of the present invention is preferably 1% by mass or more, more preferably 2% by mass or more, more preferably 3% by mass or more, and most preferably 4% by mass or more. The maximum content is preferably 15% by mass or less, more preferably 10% by mass or less, and most preferably 8% by mass or less.

The compound represented by general formula (V-1-1) is preferably any of compounds represented by formula (20.1) to formula (20.4) and is preferably a compound represented by formula (20.2).

[Chem. 110]

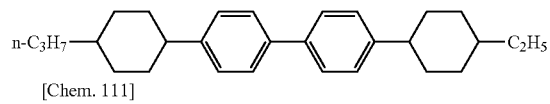

(20.1)

[Chem. 111]

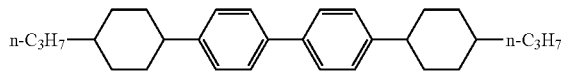

(20.2)

[Chem. 112]

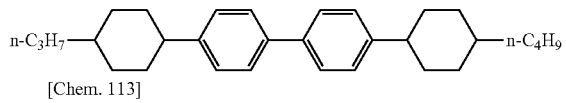

(20.3)

[Chem. 113]

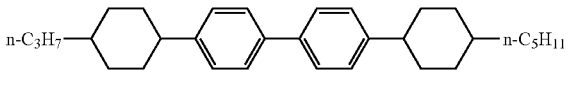

(20.4)

The compound represented by general formula (V-1) is preferably a compound represented by general formula (V-1-2).

[Chem. 114]

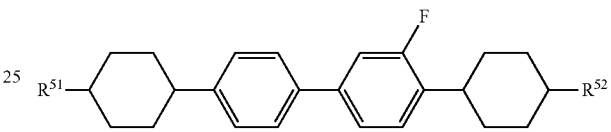

(V-1-2)

(In the formula, $R^{51}$ and $R^{52}$ each independently represent an alkyl group having 1 to 5 carbon atoms.)

The content of the general formula (V-1-2) relative to the total amount of the liquid crystal composition of the present invention is preferably 1% by mass or more, more preferably 2% by mass or more, more preferably 3% by mass or more, and most preferably 4% by mass or more. The maximum content is preferably 15% by mass or less, more preferably 10% by mass or less, and most preferably 8% by mass or less.

The compound represented by general formula (V-1-2) is preferably any of compounds represented by formula (21.1) to formula (21.3) and is preferably a compound represented by formula (21.1).

[Chem. 115]

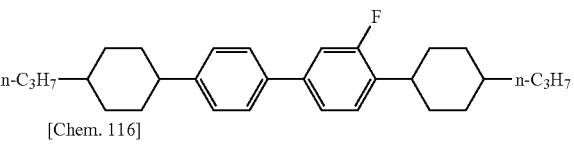

(21.1)

[Chem. 116]

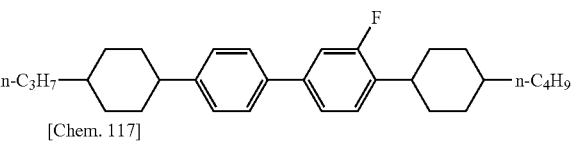

(21.2)

[Chem. 117]

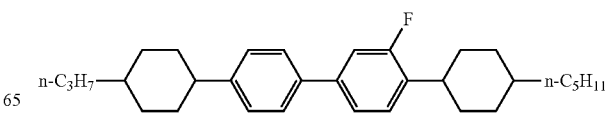

(21.3)

The compound represented by general formula (V-1) is preferably a compound represented by general formula (V-1-3).

[Chem. 118]

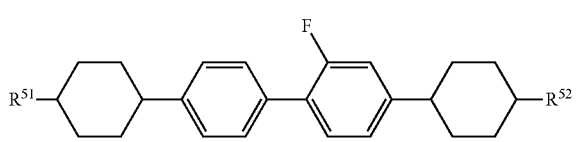

(V-1-3)

(In the formula, $R^{51}$ and $R^{52}$ each independently represent an alkyl group having 1 to 5 carbon atoms.)

The content of the compound represented by general formula (V-1-3) relative to the total amount of the liquid crystal composition of the present invention is preferably 1% by mass or more, more preferably 2% by mass or more, more preferably 3% by mass or more, and most preferably 4% by mass or more. The maximum content is preferably 15% by mass or less, more preferably 10% by mass or less, and most preferably 8% by mass or less.

The compound represented by general formula (V-1-3) is any of compounds represented by formula (22.1) to formula (22.3) and is preferably a compound represented by formula (21.1).

[Chem. 119]

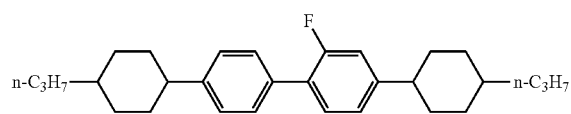

(22.1)

[Chem. 120]

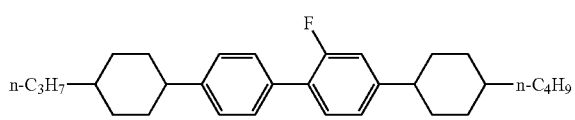

(22.2)

[Chem. 121]

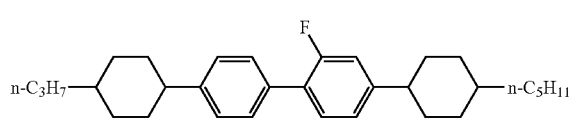

(22.3)

The compound represented by general formula (V) is preferably a compound represented by general formula (V-2).

[Chem. 122]

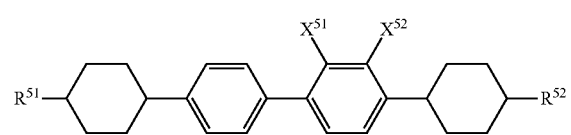

(V-2)

(In the formula, $R^{51}$ and $R^{52}$ each independently represent an alkyl group having 1 to 5 carbon atoms, and $X^{51}$ and $X^{52}$ each independently represent a fluorine atom or a hydrogen atom.)

The number of compounds that can be used in combination is not particularly limited and compounds are used in combination in accordance with desired properties such as low-temperature solubility, transition temperature, electrical reliability, and birefringence. The number of compounds used is, for example, one in one embodiment of the present invention and two or more in another embodiment of the present invention.

The lower limit of the preferable content relative to the total amount of the liquid crystal composition of the present invention is, for example, 2% in one embodiment, 4% in another embodiment of the present invention, 7% in another embodiment of the present invention, 10% in another embodiment of the present invention, 12% in another embodiment of the present invention, 15% in another embodiment of the present invention, 17% in another embodiment of the present invention, 18% in another embodiment of the present invention, 20% in another embodiment of the present invention, and 22% in another embodiment of the present invention.

The upper limit of the preferable content relative to the total amount of the liquid crystal composition of the present invention is, for example, 40% in one embodiment of the present invention, 30% in another embodiment of the present invention, 25% in another embodiment of the present invention, 20% in another embodiment of the present invention, 15% in another embodiment of the present invention, 10% in another embodiment of the present invention, 5% in another embodiment of the present invention, and 4% in another embodiment of the present invention.

If an embodiment of a liquid crystal composition with high Tni is desirable in the present invention, the content of the compound represented by formula (V-2) is preferably relatively high and if an embodiment with a low viscosity is desirable, the content is preferably relatively low.

The compound represented by general formula (V-2) is preferably a compound represented by general formula (V-2-1).

[Chem. 123]

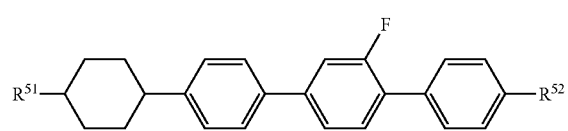

(V-2-1)

(In the formula, $R^{51}$ and $R^{52}$ each independently represent an alkyl group having 1 to 5 carbon atoms.)

The compound represented by general formula (V-2-1) is preferably any of compounds represented by formula (23.1) to formula (23.4) and is preferably a compound represented by formula (23.1) and/or formula (23.2).

[Chem. 124]

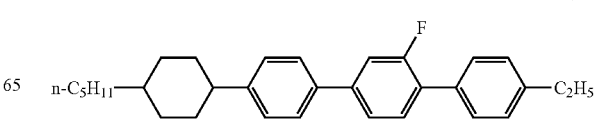

(23.1)

[Chem. 125]

(23.2)

n-C₅H₁₁—⟨cyclohexyl⟩—⟨phenyl⟩—⟨phenyl(F)⟩—⟨phenyl⟩—n-C₃H₇

[Chem. 126]

(23.3)

n-C₄H₉—⟨cyclohexyl⟩—⟨phenyl⟩—⟨phenyl(F)⟩—⟨phenyl⟩—n-C₃H₇

[Chem. 127]

(23.4)

n-C₃H₇—⟨cyclohexyl⟩—⟨phenyl⟩—⟨phenyl(F)⟩—⟨phenyl⟩—n-C₃H₇

The compound represented by general formula (V-2) is preferably a compound represented by general formula (V-2-2).

[Chem. 128]

(V-2-2)

$R^{51}$—⟨cyclohexyl⟩—⟨phenyl⟩—⟨phenyl(F)⟩—⟨phenyl⟩—$R^{52}$ (In the formula, $R^{51}$ and $R^{52}$ each independently represent an alkyl group having 1 to 5 carbon atoms.)

The compound represented by general formula (V-2-2) is preferably any of compounds represented by formula (24.1) to formula (24.4) and is preferably a compound represented by formula (24.1) and/or formula (24.2).

[Chem. 129]

(24.1)

n-C₅H₁₁—⟨cyclohexyl⟩—⟨phenyl⟩—⟨phenyl(F)⟩—⟨phenyl⟩—C₂H₅

[Chem. 130]

(24.2)

n-C₅H₁₁—⟨cyclohexyl⟩—⟨phenyl⟩—⟨phenyl(F)⟩—⟨phenyl⟩—n-C₃H₇

[Chem. 131]

(24.3)

n-C₄H₉—⟨cyclohexyl⟩—⟨phenyl⟩—⟨phenyl(F)⟩—⟨phenyl⟩—n-C₃H₇

[Chem. 132]

(24.4)

n-C₃H₇—⟨cyclohexyl⟩—⟨phenyl⟩—⟨phenyl(F)⟩—⟨phenyl⟩—n-C₃H₇

The compound represented by general formula (V) is preferably a compound represented by general formula (V-3).

[Chem. 133]

(V-3)

$R^{51}$—⟨cyclohexyl⟩—⟨cyclohexyl⟩—C(=O)O—⟨phenyl⟩—⟨cyclohexyl⟩—$R^{52}$ (In the formula, $R^{51}$ and $R^{52}$ each independently represent an alkyl group having 1 to 5 carbon atoms.)

The number of compounds that can be used in combination is not particularly limited, and compounds are used in combination in accordance with desired properties such as low-temperature solubility, transition temperature, electrical reliability, and birefringence. The number of compounds used is, for example, one in one embodiment of the present invention, two in another embodiment of the present invention, and three or more in another embodiment of the present invention.

The content of the compound represented by general formula (V-3) relative to the total amount of the liquid crystal composition of the present invention is preferably 2% by mass or more, more preferably 4% by mass or more, more preferably 7% by mass or more, and most preferably 8% by mass or more. The maximum content is preferably 16% by mass or less, more preferably 13% by mass or less, and most preferably 11% by mass or less.

The compound represented by general formula (V-3) is preferably any of compounds represented by formula (25.1) to formula (25.3).

[Chem. 134]

(25.1)

n-C₃H₇—⟨cyclohexyl⟩—⟨cyclohexyl⟩—C(=O)O—⟨phenyl⟩—⟨cyclohexyl⟩—n-C₃H₇

[Chem. 135]

(25.2)

n-C₃H₇—⟨cyclohexyl⟩—⟨cyclohexyl⟩—C(=O)O—⟨phenyl⟩—⟨cyclohexyl⟩—n-C₄H₉

[Chem. 136]

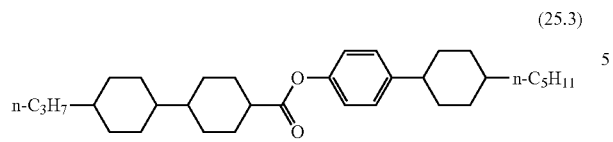

(25.3)

The liquid crystal composition of the present invention may further contain one or more compounds represented by general formula (VI).

[Chem. 137]

(VI)

(In the formula, $R^{11}$ and $R^{12}$ each independently represent a linear alkyl or alkoxy group having 1 to 10 carbon atoms or a linear alkenyl group having 2 to 10 carbon atoms.)

The number of compounds that can be used in combination is not particularly limited and, of these compounds, preferably one to three, more preferably one to four, and most preferably one to five compounds are used in accordance with desired properties such as low-temperature solubility, transition temperature, electrical reliability, and birefringence. The maximum content is preferably 35% by mass or less, more preferably 25% by mass or less, and most preferably 15% by mass or less.

Specific preferable examples of the compound represented by general formula (VI) are as follows:

[Chem. 138]

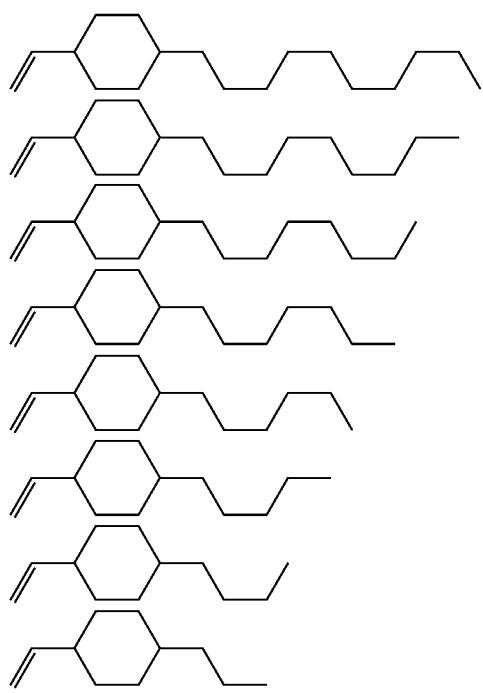

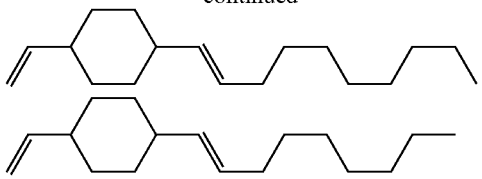
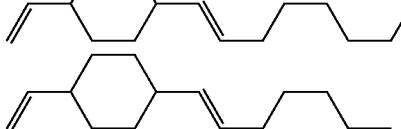
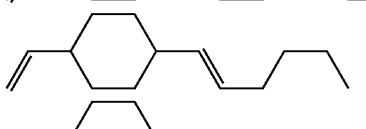
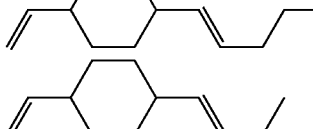
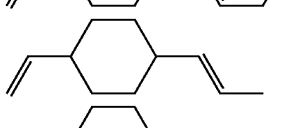
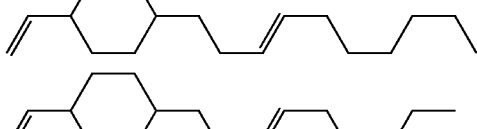
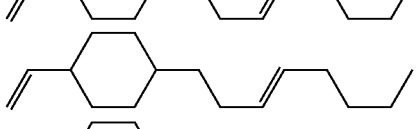
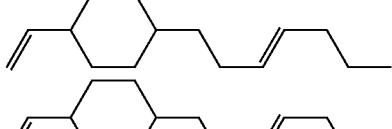
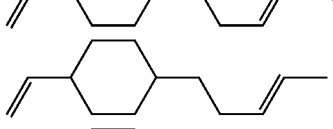
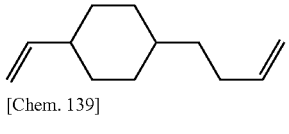

[Chem. 139]

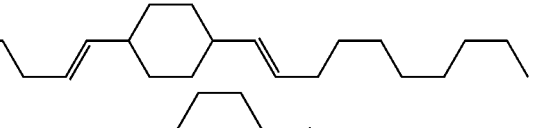
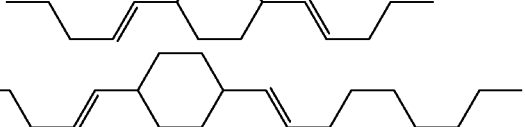
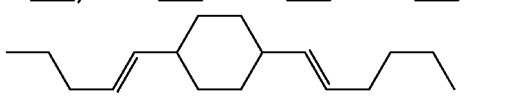

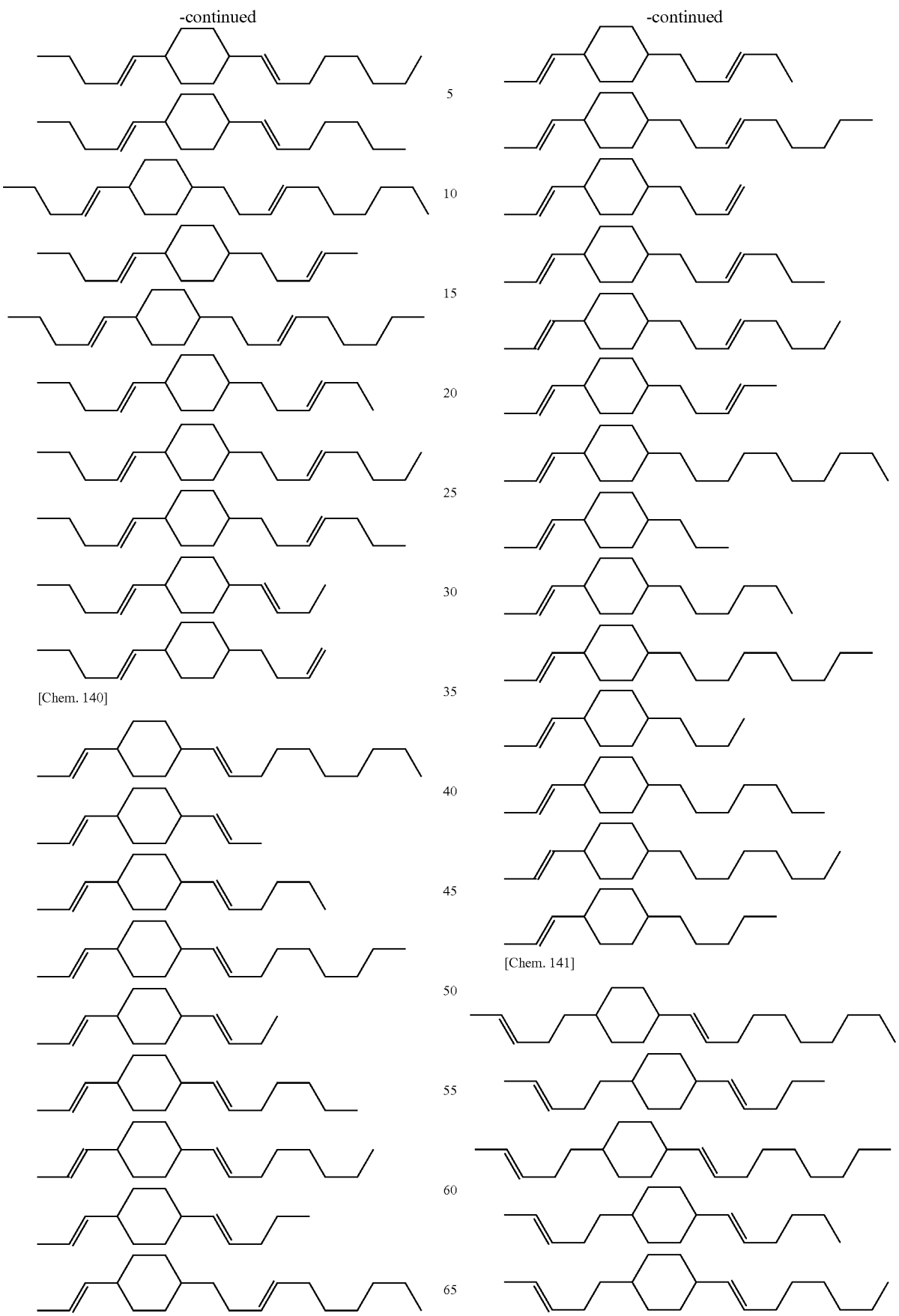

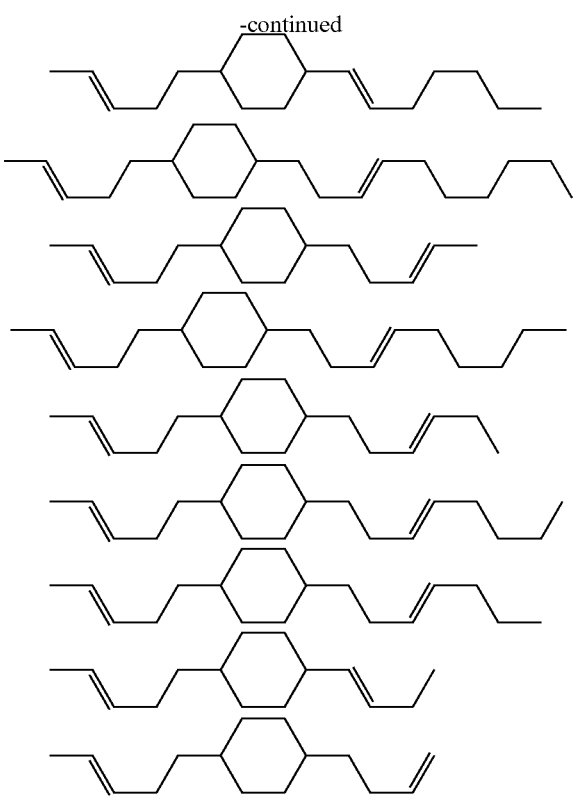

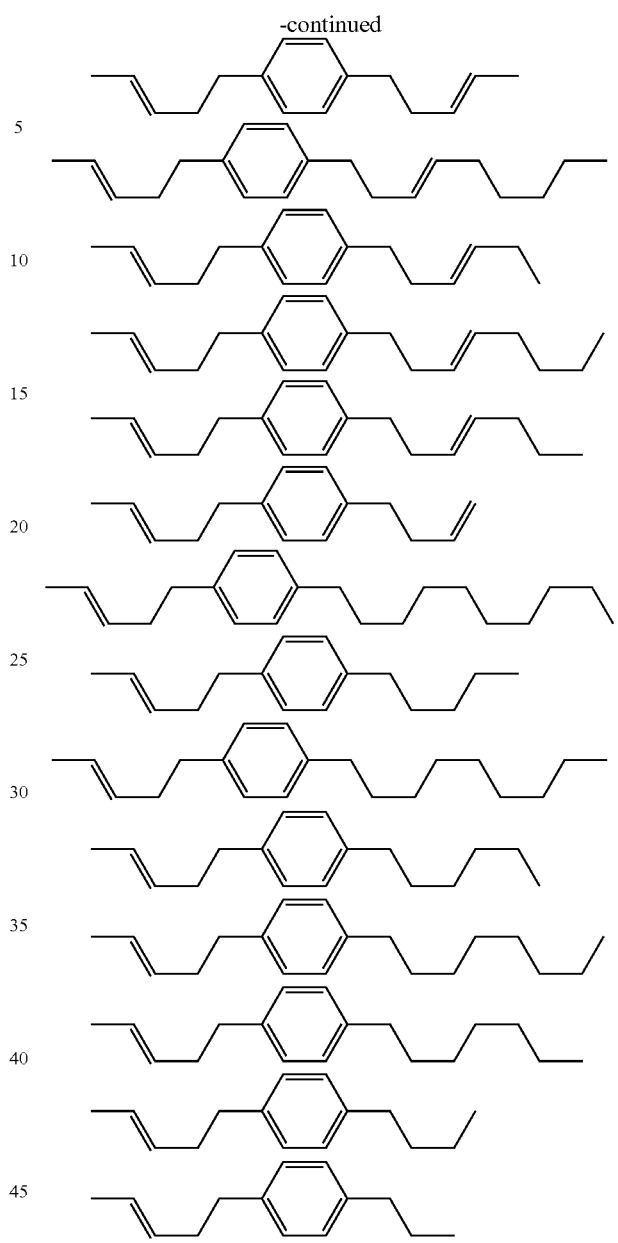

The liquid crystal composition of the invention of the subject application may further contain one or more compounds represented by general formula (VII).

[Chem. 142]

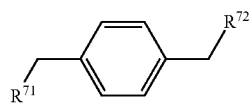
(VII)

(In the formula, $R^{71}$ and $R^{72}$ each independently represent a linear alkyl or alkoxy group having 1 to 10 carbon atoms or a linear alkenyl group having 4 to 10 carbon atoms.)

The number of compounds that can be used in combination is not particularly limited, and, of these compounds, preferably one to three, more preferably one to four, and most preferably one to five compounds are contained in accordance with desired properties such as low-temperature solubility, transition temperature, electrical reliability, and birefringence. The maximum content is preferably 35% by mass or less, more preferably 25% by mass or less, and most preferably 15% by mass or less.

Specific preferable examples of the compound represented by general formula (VII) are as follows:

[Chem. 143]

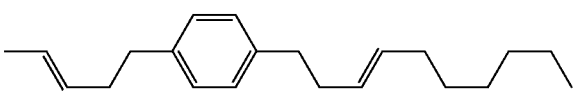

The liquid crystal composition of the present invention may also contain a compound represented by general formula (M).

[Chem. 144]

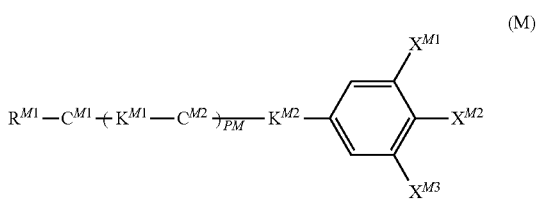

(In the formula, $R^{M1}$ represents an alkyl group having 1 to 8 carbon atoms where one —$CH_2$— or two or more non-adjacent —$CH_2$— in the alkyl group may each independently be substituted with —CH=CH—, —C≡C—, —O—, —CO—, —COO—, or —OCO—, PM represents 0, 1, 2, 3, or 4, $C^{M1}$ and $C^{M2}$ each independently represent a group selected from the group consisting of (d) a 1,4-cyclohexylene group (one —CH$_2$— or two or more non-adjacent —CH$_2$— in this group may each be substituted with —O— or —S—) and (e) a 1,4-phenylene group (one —CH= or two or more non-adjacent —CH= in this group may each be substituted with —N=)

where the group (d) and the group (e) may each independently be substituted with a cyano group, a fluorine atom, or a chlorine atom, $K^{M1}$ and $K^{M2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—, when PM represents 2, 3, or 4 and a plurality of $K^{M1}$ are present, they may be the same or different and when PM represents 2, 3, or 4 and a plurality of $C^{M2}$ are present, they may be the same or different, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; however, the compound represented by formula (26.2) is excluded.)

The number of compounds that can be used in combination is not particularly limited and compounds are used in combination in accordance with desired properties such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, six in another embodiment of the present invention, and seven or more in another embodiment of the present invention.

In the liquid crystal composition of the present invention, the content of the compound represented by general formula (M) needs to be appropriately adjusted according to the desired properties, such as low-temperature solubility, transition temperature, electrical reliability, birefringence, process compatibility, drop marks, ghosting, and dielectric anisotropy.

The lower limit of the preferable content relative to the total amount of the liquid crystal composition of the present invention is, for example, 1% in one embodiment, 10% in another embodiment of the present invention, 20% in another embodiment of the present invention, 30% in another embodiment of the present invention, 40% in another embodiment of the present invention, 45% in another embodiment of the present invention, 50% in another embodiment of the present invention, 55% in another embodiment of the present invention, 60% in another embodiment of the present invention, 65% in another embodiment of the present invention, 70% in another embodiment of the present invention, 75% in another embodiment of the present invention, and 80% in another embodiment of the present invention.

The upper limit of the preferable content relative to the total amount of the liquid crystal composition of the present invention is, for example, 95% in one embodiment of the present invention, 85% in another embodiment of the present invention, 75% in another embodiment of the present invention, 65% in another embodiment of the present invention, 55% in another embodiment of the present invention, 45% in another embodiment of the present invention, 35% in another embodiment of the present invention, and 25% in another embodiment of the present invention.

In order to keep the viscosity of the liquid crystal composition of the present invention to a low level and the response speed to a high level, the lower limit and the upper limit described above are preferably relatively low. In order to keep Tni of the liquid crystal composition of the present invention to a high level and temperature stability to a satisfactory level, the lower limit and the upper limit described above are preferably relatively low. In order to increase the dielectric anisotropy to keep the drive voltage low, the lower limit and the upper limit described above are preferably relatively high.

The compound represented by general formula (M) is preferably a compound selected from the group of compounds represented by general formula (VIII), for example.

[Chem. 145]

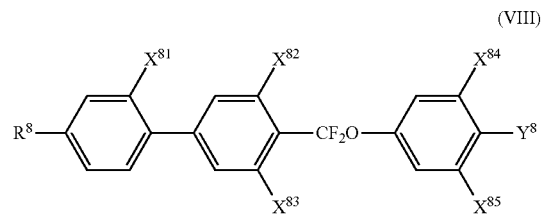

(VIII)

(In the formula, $R^8$ represents an alkyl group having 1 to 5 carbon atoms or an alkenyl group having 4 or 5 carbon atoms, $X^{81}$ to $X^{85}$ each independently represent a hydrogen atom or a fluorine atom, and $Y^8$ represents a fluorine atom or —OCF$_3$. A compound represented by formula (26.2) is excluded.)

The number of compounds that can be used in combination is not particularly limited and compounds are used in combination in accordance with desired properties such as low-temperature solubility, transition temperature, electrical reliability, and birefringence. The number of compounds used is, for example, one in one embodiment of the present invention, two in another embodiment of the present invention, and three or more in another embodiment of the present invention.

In the liquid crystal composition of the present invention, the content of the compound represented by general formula (VIII) needs to be appropriately adjusted according to the desired properties, such as low-temperature solubility, transition temperature, electrical reliability, birefringence, process compatibility, drop marks, ghosting, and dielectric anisotropy.

The lower limit of the preferable content relative to the total amount of the liquid crystal composition of the present invention is, for example, 2% in one embodiment of the present invention, 4% in another embodiment of the present invention, 5% in another embodiment of the present invention, 6% in another embodiment of the present invention, 7% in another embodiment of the present invention, 8% in another embodiment of the present invention, 9% in another embodiment of the present invention, 10% in another embodiment of the present invention, 11% in another embodiment of the present invention, 12% in another embodiment of the present invention, 14% in another embodiment of the present invention, 15% in another embodiment of the present invention, 21% in another embodiment of the present invention, and 23% in another embodiment of the present invention.

The upper limit of the preferable content relative to the total amount of the liquid crystal composition of the present invention is, for example, 40% in one embodiment of the present invention, 30% in another embodiment of the present invention, 25% in another embodiment of the present invention, 21% in another embodiment of the present invention, 16% in another embodiment of the present invention, 12% in another embodiment of the present invention, 8% in another embodiment of the present invention, and 5% in another embodiment of the present invention.

In order to keep the viscosity of the liquid crystal composition of the present invention to a low level and the response speed to a high level, the lower limit and the upper limit described above are preferably relatively low. In order to keep Tni of the liquid crystal composition of the present invention to a high level and temperature stability to a satisfactory level, the lower limit and the upper limit described above are preferably relatively low. In order to increase the dielectric anisotropy to keep the drive voltage low, the lower limit and the upper limit described above are preferably relatively high.

The compound represented by general formula (VIII) is preferably a compound represented by general formula (VIII-1).

[Chem. 146]

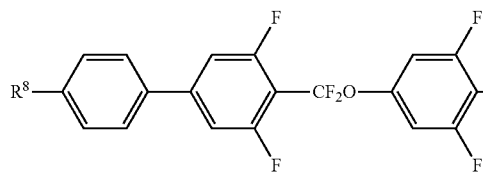

(VIII-1)

(In the formula, $R^8$ represents an alkyl group having 1 to 5 carbon atoms or an alkenyl group having 4 or 5 carbon atoms; however, the compound represented by formula (26.2) is excluded.)

The number of compounds that can be used in combination is not particularly limited and compounds are used in combination in accordance with desired properties such as low-temperature solubility, transition temperature, electrical reliability, and birefringence. The number of compounds used is, for example, one in one embodiment of the present invention and two or more in another embodiment of the present invention.

The compound represented by general formula (VIII-1) is specifically preferably a compound represented by formula (26.1), formula (26.3), or formula (26.4) and more preferably a compound represented by formula (26.1).

[Chem. 147]

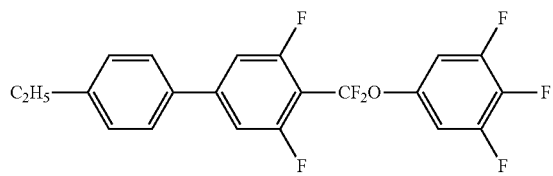

(26.1)

[Chem. 148]

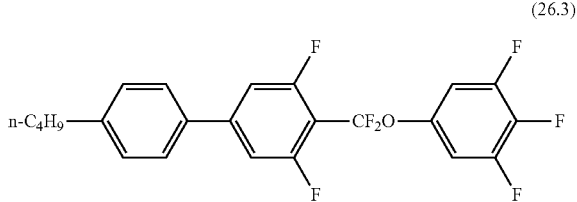

(26.3)

[Chem. 149]

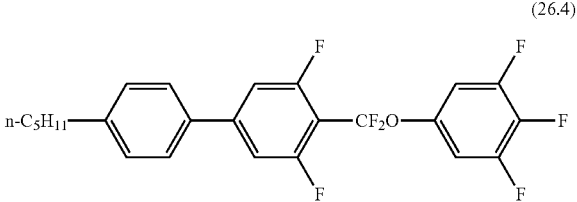

(26.4)

The compound represented by general formula (VIII) is preferably a compound represented by general formula (VIII-2).

[Chem. 150]

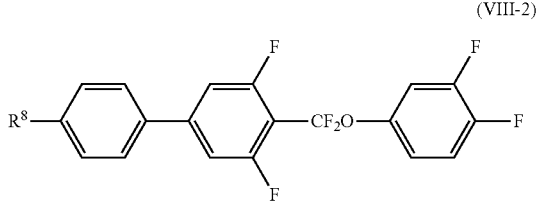

(VIII-2)

(In the formula, $R^8$ represents an alkyl group having 1 to 5 carbon atoms or an alkenyl group having 4 or 5 carbon atoms.)

The number of compounds that can be used in combination is not particularly limited and compounds are used in combination in accordance with desired properties such as low-temperature solubility, transition temperature, electrical reliability, and birefringence. The number of compounds used is, for example, one in one embodiment of the present invention, two in another embodiment of the present invention, and three or more in another embodiment of the present invention.

The content of the compound represented by general formula (VIII-2) is preferably 2.5% by mass or more, more preferably 8% by mass or more, yet more preferably 10% by mass and most preferably 12% by mass or more considering low-temperature solubility, transition temperature, electrical reliability, birefringence, etc. The maximum content is preferably 25% by mass or less, more preferably 20% by mass or less, and most preferably 15% by mass or less.

The compound represented by general formula (VIII-2) is preferably any of compounds represented by formula (27.1) to formula (27.4) and is preferably a compound represented by formula (27.2).

[Chem. 151]

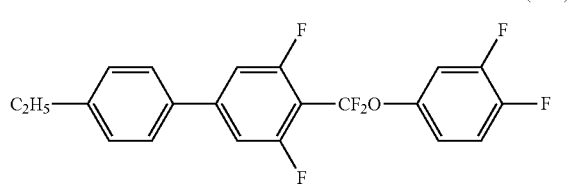

(27.1)

[Chem. 152]

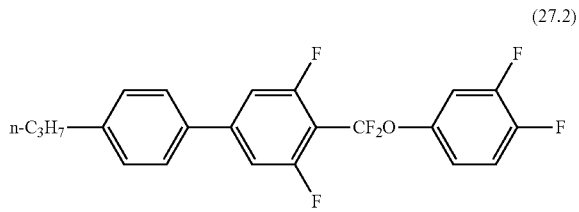

(27.2)

[Chem. 153]

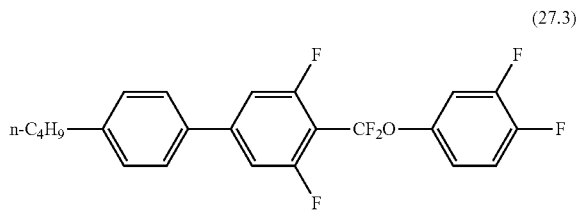

(27.3)

[Chem. 154]

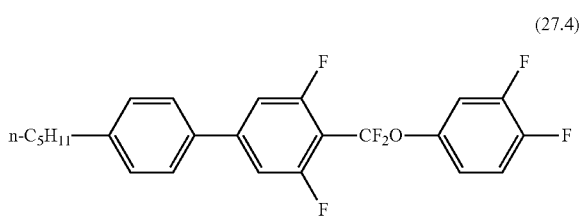

(27.4)

The compound represented by general formula (M) is, for example, preferably a compound selected from the group of compounds represented by general formula (IX).

[Chem. 155]

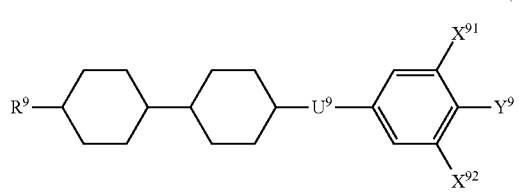

(IX)

(In the formula, $R^9$ represents an alkyl group having 1 to 5 carbon atoms or an alkenyl group having 2 to 5 carbon atoms, $X^{91}$ and $X^{92}$ each independently represent a hydrogen atom or a fluorine atom, $Y^9$ represents a fluorine atom, a chlorine atom, or —$OCF_3$, and $U^9$ represents a single bond, —COO—, or —$CF_2O$—.)

The number of compounds that can be used in combination is not particularly limited, and compounds are used in combination in accordance with desired properties such as low-temperature solubility, transition temperature, electrical reliability, and birefringence. The number of compounds used is, for example, one in one embodiment of the present invention, two in another embodiment of the present invention, three in another embodiment of the present invention, four in another embodiment of the present invention, five in another embodiment of the present invention, and six or more in another embodiment of the present invention.

In the liquid crystal composition of the present invention, the content of the compound represented by general formula (IX) needs to be appropriately adjusted according to the desired properties, such as low-temperature solubility, transition temperature, electrical reliability, birefringence, process compatibility, drop marks, ghosting, and dielectric anisotropy.

The lower limit of the preferable content relative to the total amount of the liquid crystal composition of the present invention is, for example, 3% in one embodiment of the present invention, 5% in another embodiment of the present invention, 8% in another embodiment of the present invention, 10% in another embodiment of the present invention, 12% in another embodiment of the present invention, 15% in another embodiment of the present invention, 17% in another embodiment of the present invention, 20% in another embodiment of the present invention, 24% in another embodiment of the present invention, 28% in another embodiment of the present invention, 30% in another embodiment of the present invention, 34% in another embodiment of the present invention, 39% in another embodiment of the present invention, 40% in another embodiment of the present invention, 42% in another embodiment of the present invention, and 45% in another embodiment of the present invention.

The upper limit of the preferable content relative to the total amount of the liquid crystal composition of the present invention is, for example, 70% in one embodiment of the present invention, 60% in another embodiment of the present invention, 55% in another embodiment of the present invention, 50% in another embodiment of the present invention, 45% in another embodiment of the present invention, 40% in another embodiment of the present invention, 35% in another embodiment of the present invention, 30% in another embodiment of the present invention, 25% in another embodiment of the present invention, 20% In another embodiment of the present invention, 15% in another embodiment of the present invention, and 10% in another embodiment of the present invention.

In order to keep the viscosity of the liquid crystal composition of the present invention to a low level and the response speed to a high level, the lower limit and the upper limit described above are preferably relatively low. In order to keep Tni of the liquid crystal composition of the present invention to a high level and suppress ghosting, the lower limit and the upper limit described above are preferably relatively low. In order to increase the dielectric anisotropy to keep the drive voltage low, the lower limit and the upper limit described above are preferably relatively high.

The compound represented by general formula (IX) is preferably a compound represented by general formula (IX-1).

[Chem. 156]

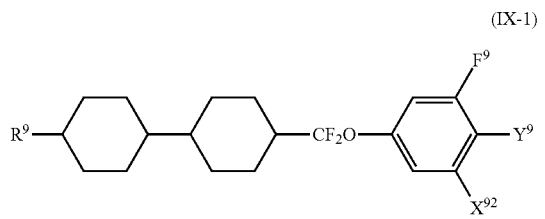
(IX-1)

(In the formula, $R^9$ represents an alkyl group having 1 to 5 carbon atoms or an alkenyl group having 2 to 5 carbon atoms, $X^{92}$ represents a hydrogen atom or a fluorine atom, and $Y^9$ represents a fluorine atom or —$OCF_3$.)

The number of compounds that can be used in combination is not particularly limited, and compounds are used in combination in accordance with desired properties such as low-temperature solubility, transition temperature, electrical reliability, and birefringence. The number of compounds used is, for example, one in one embodiment of the present invention, two in another embodiment of the present invention, three in another embodiment of the present invention, and four or more in another embodiment of the present invention.

The compound represented by general formula (IX-1) is preferably a compound represented by general formula (IX-1-1).

[Chem. 157]

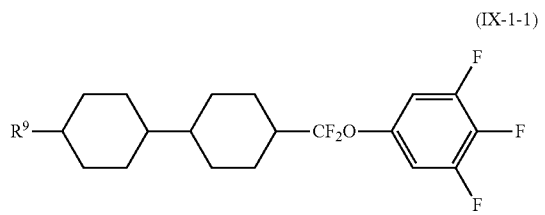
(IX-1-1)

(In the formula, $R^9$ represents an alkyl group having 1 to 5 carbon atoms or an alkenyl group having 2 to 5 carbon atoms.)

The number of compounds that can be used in combination is not particularly limited and compounds are used in combination in accordance with desired properties such as low-temperature solubility, transition temperature, electrical reliability, and birefringence. The number of compound used is, for example, one in one embodiment of the present invention, two in another embodiment of the present invention, and three or more in another embodiment of the present invention.

The content of the compound represented by general formula (IX-1-1) has an upper limit and a lower limit that are preferable for each embodiment considering low-temperature solubility, transition temperature, electrical reliability, birefringence, etc. The lower limit of the content relative to the total amount of the liquid crystal composition of the present invention is, for example, 1% in one embodiment, 2% in another embodiment, 4% in another embodiment, 10% in another embodiment, 14% in another embodiment, 16% in another embodiment, and 21% in another embodiment.

The upper limit of the content is, for example, preferably 40% in one embodiment, 35% in another embodiment, 30% in another embodiment, 25% in another embodiment, 10% in another embodiment, 7% in another embodiment, and 5% in another embodiment.

The compound represented by general formula (IX-1-1) is preferably any of compounds represented by formula (28.1) to formula (28.5) and is preferably a compound represented by formula (28.3) and/or formula (28.5).

[Chem. 158]

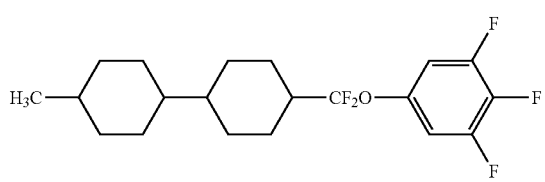
(28.1)

[Chem. 159]

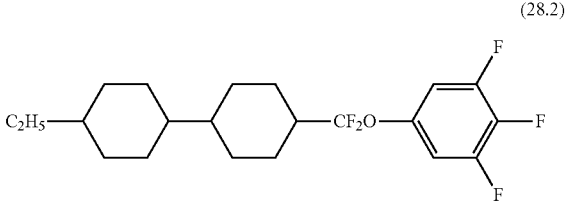
(28.2)

[Chem. 160]

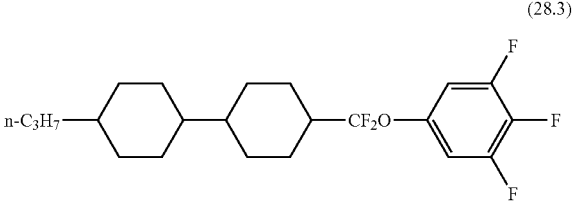
(28.3)

[Chem. 161]

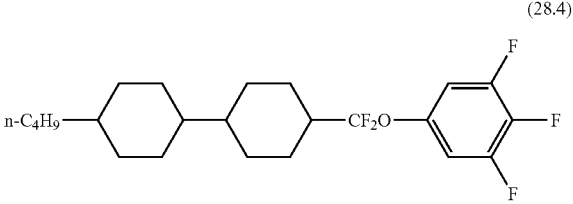
(28.4)

[Chem. 162]

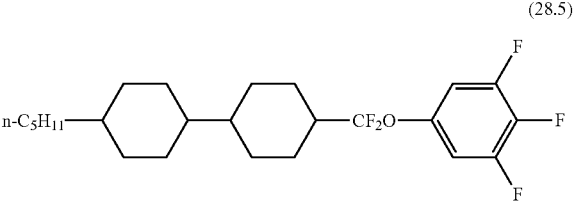
(28.5)

In the liquid crystal composition of the present invention, the content of the compound represented by formula (28.3) relative to the total amount of the liquid crystal composition of the present invention is preferably 1% by mass or more, more preferably 5% by mass or more, more preferably 8% by mass or more, more preferably 10% by mass or more, more preferably 14% by mass or more, and most preferably 16% by mass or more. The maximum content is preferably 30% by mass or less, more preferably 25% by mass or less, more preferably 22% by mass or less, and most preferably less than 20% by mass considering low-temperature solubility, transition temperature, electrical reliability, etc.

In the liquid crystal composition of the present invention, the content of the compound represented by formula (28.5) relative to the total amount of the liquid crystal composition of the present invention is preferably 3% by mass or more, more preferably 7% by mass or more, and most preferably 10% by mass or more. The maximum content is preferably 25% by mass or less, more preferably less than 20% by mass, yet more preferably 15% by mass or less, and most preferably less than 13% by mass considering low-temperature solubility, transition temperature, electrical reliability, etc.

The compound represented by general formula (IX-1) is preferably a compound represented by general formula (IX-1-2).

[Chem. 163]

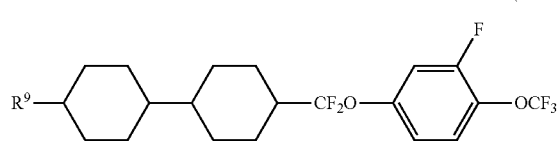

(IX-1-2)

(In the formula, $R^9$ represents an alkyl group having 1 to 5 carbon atoms or an alkenyl group having 2 to 5 carbon atoms.)

The number of compounds that can be used in combination is not particularly limited. Preferably one to three compounds and more preferably one to four compounds are used in combination considering low-temperature solubility, transition temperature, electrical reliability, birefringence, etc.

The content of the compound represented by general formula (IX-1-2) relative to the total amount of the liquid crystal composition of the present invention is preferably 1% by mass or more, more preferably 5% by mass or more, more preferably 8% by mass or more, more preferably 10% by mass or more, more preferably 14% by mass or more, and most preferably 16% by mass or more. The maximum content is preferably 30% by mass or less, more preferably 25% by mass or less, yet more preferably 22% by mass or less, and most preferably less than 20% by mass considering low-temperature solubility, transition temperature, electrical reliability, etc.

The compound represented by general formula (IX-1-2) is preferably any of compounds represented by formula (29.1) to formula (29.4) and is preferably a compound represented by formula (29.2) and/or formula (29.4).

[Chem. 164]

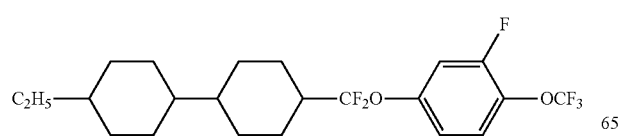

(29.1)

[Chem. 165]

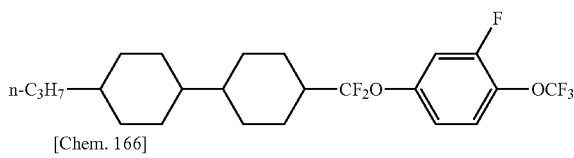

(29.2)

[Chem. 166]

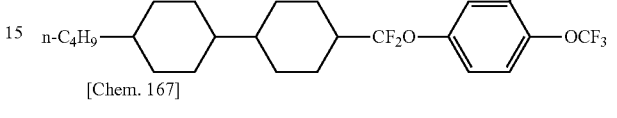

(29.3)

[Chem. 167]

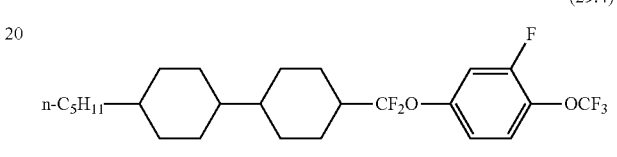

(29.4)

The compound represented by general formula (IX) is preferably a compound represented by general formula (IX-2).

[Chem. 168]

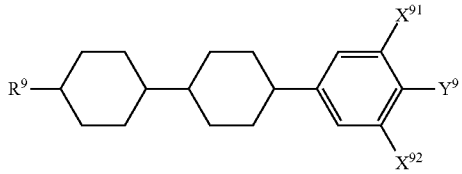

(IX-2)

(In the formula, $R^9$ represents an alkyl group having 1 to 5 carbon atoms or an alkenyl group having 2 to 5 carbon atoms, $X^{91}$ and $X^{92}$ each independently represent a hydrogen atom or a fluorine atom, and $Y^9$ represents a fluorine atom, a chlorine atom, or —$OCF_3$.)

The number of compounds that can be used in combination is not limited and an appropriate combination is used for each embodiment considering low-temperature solubility, transition temperature, electrical reliability, birefringence, etc. For example, the number is one in one embodiment of the present invention, two in another embodiment, three in another embodiment, four in another embodiment, five in another embodiment, and six or more in another embodiment.

The compound represented by general formula (IX-2) is preferably a compound represented by general formula (IX-2-1).

[Chem. 169]

(IX-2-1)

(In the formula, $R^9$ represents an alkyl group having 1 to 5 carbon atoms or an alkenyl group having 2 to 5 carbon atoms.)

The number of compounds that can be used in combination is not limited and one to three compounds are preferably used in combination considering low-temperature solubility, transition temperature, electrical reliability, birefringence, etc.

The content of the compound represented by general formula (IX-2-1) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 1% in one embodiment of the present invention, 2% in another embodiment, 4% in another embodiment, 10% in another embodiment, 14% in another embodiment, 16% in another embodiment, and 21% in another embodiment. The upper limit of the content is, for example, 40% in one embodiment of the present invention, 35% in another embodiment, 30% in another embodiment, 25% in another embodiment, 22% in another embodiment, 20% in another embodiment, 10% in another embodiment, 7% in another embodiment, and 5% in another embodiment.

The compound represented by general formula (IX-2-1) is preferably any of compounds represented by formula (30.1) to formula (30.4) and is preferably a compound represented by formula (30.1) or formula (30.2).

[Chem. 170]

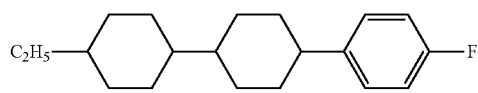

(30.1)

[Chem. 171]

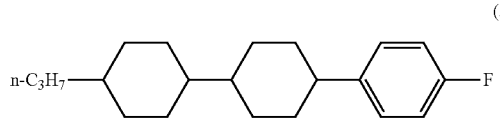

(30.2)

[Chem. 172]

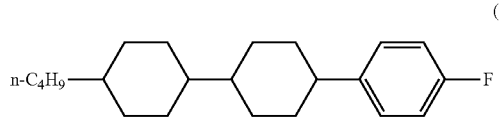

(30.3)

[Chem. 173]

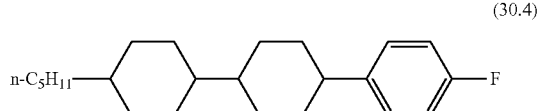

(30.4)

The compound represented by general formula (IX-2) is preferably a compound represented by general formula (IX-2-2).

[Chem. 174]

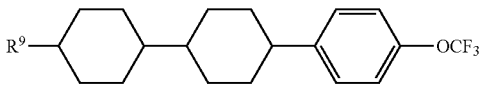

(IX-2-2)

(In the formula, $R^9$ represents an alkyl group having 1 to 5 carbon atoms or an alkenyl group having 2 to 5 carbon atoms.)

The number of compounds that can be used in combination is not limited. Preferably one to three and more preferably one to four compounds are used in combination considering low-temperature solubility, transition temperature, electrical reliability, birefringence, etc.

The content of the compound represented by general formula (IX-2-2) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 1% in one embodiment of the present invention, 2% in another embodiment, 4% in another embodiment, 10% in another embodiment, 14% in another embodiment, 16% in another embodiment, and 21% in another embodiment. The upper limit of the content is, for example, 40% in one embodiment of the present invention, 35% in another embodiment, 30% in another embodiment, 25% in another embodiment, 22% in another embodiment, 15% in another embodiment, 12% in another embodiment, 8% in another embodiment, and 4% in another embodiment.

The compound represented by general formula (IX-2-2) is preferably any of compounds represented by formula (31.1) to formula (31.4) and is preferably any of compounds represented by formula (31.1) to formula (31.4).

[Chem. 175]

(31.1)

[Chem. 176]

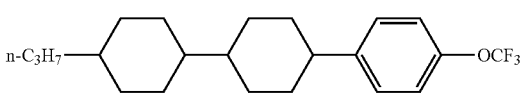

(31.2)

[Chem. 177]

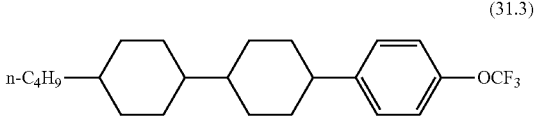

(31.3)

[Chem. 178]

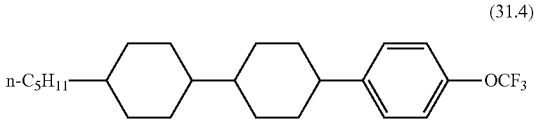

(31.4)

The compound represented by general formula (IX-2) is preferably a compound represented by general formula (IX-2-3).

[Chem. 179]

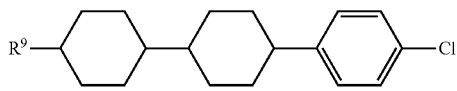

(IX-2-3)

(In the formula, R⁹ represents an alkyl group having 1 to 5 carbon atoms or an alkenyl group having 2 to 5 carbon atoms.)

The number of compounds that can be used in combination is not limited and one or two compounds are preferably bused in combination considering low-temperature solubility, transition temperature, electrical reliability, birefringence, etc.

The content of the compound represented by general formula (IX-2-3) relative to the total amount of the liquid crystal composition of the present invention is preferably 1% by mass or more, more preferably 3% by mass or more, more preferably 6% by mass or more, more preferably 8% by mass or more, and most preferably 15% by mass or more. The maximum content is preferably 30% by mass or less, more preferably less than 20% by mass, more preferably 15% by mass or less, and most preferably less than 10% by mass considering low-temperature solubility, transition temperature, electrical reliability, etc.

The compound represented by general formula (IX-2-3) is preferably any of compounds represented by formula (32.1) to formula (32.4) and is preferably a compound represented by formula (32.2) and/or formula (32.4).

[Chem. 180]

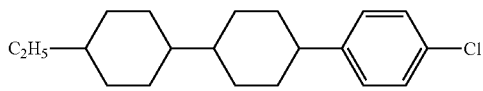

(32.1)

[Chem. 181]

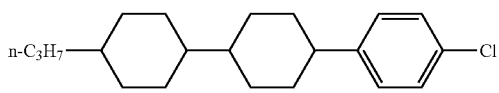

(32.2)

[Chem. 182]

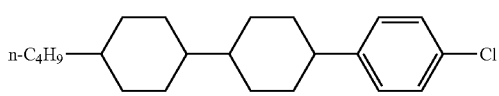

(32.3)

[Chem. 183]

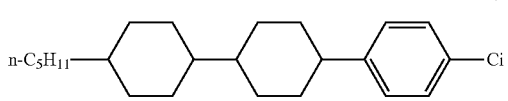

(32.4)

The compound represented by general formula (IX-2) is preferably a compound represented by general formula (IX-2-4).

[Chem. 184]

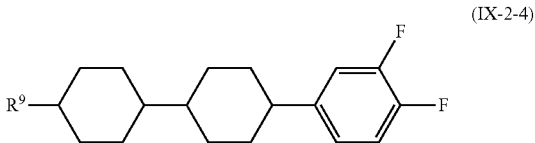

(IX-2-4)

(In the formula, R⁹ represents an alkyl group having 1 to 5 carbon atoms or an alkenyl group having 2 to 5 carbon atoms.)

The content of the compound represented by general formula (IX-2-4) relative to the total amount of the liquid crystal composition of the present invention is preferably 1% by mass or more, more preferably 3% by mass or more, more preferably 6% by mass or more, and most preferably 8% by mass or more. The maximum content is preferably 30% by mass or less, more preferably 20% by mass or less, more preferably 15% by mass or less, and most preferably less than 10% by mass considering low-temperature solubility, transition temperature, electrical reliability, etc.

The compound represented by general formula (IX-2-4) is preferably any of compounds represented by formula (33.1) to formula (33.5) and is preferably a compound represented by formula (33.1) and/or formula (33.3).

[Chem. 185]

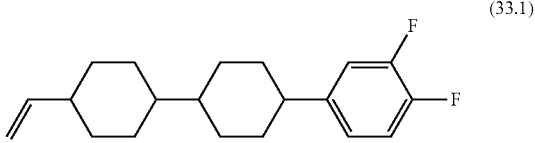

(33.1)

[Chem. 186]

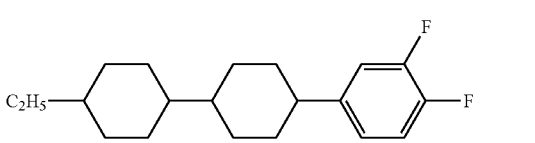

(33.2)

[Chem. 187]

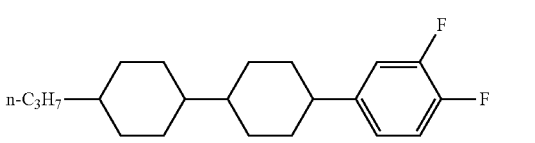

(33.3)

[Chem. 188]

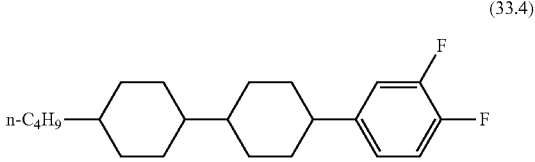

(33.4)

-continued

[Chem. 189]

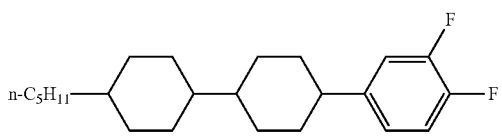
(33.5)

The compound represented by general formula (IX-2) is preferably a compound represented by general formula (IX-2-5).

[Chem. 190]

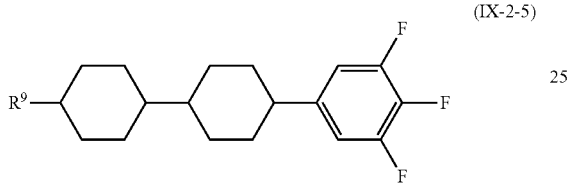
(IX-2-5)

(In the formula, $R^9$ represents an alkyl group having 1 to 5 carbon atoms or an alkenyl group having 2 to 5 carbon atoms.)

The number of compounds that can be used in combination is not limited and an appropriate combination is used for each embodiment considering low-temperature solubility, transition temperature, electrical reliability, birefringence, etc. The number of compounds used is, for example, one in one embodiment of the present invention, two in another embodiment, three in another embodiment, and four or more in another embodiment.

The content of the compound represented by general formula (IX-2-5) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 4% in one embodiment of the present invention, 8% in another embodiment, 12% in another embodiment, 21% in another embodiment, 30% in another embodiment, 31% in another embodiment, and 34% in another embodiment. The upper limit of the content is, for example, 45% in one embodiment of the present invention, 40% in another embodiment, 35% in another embodiment, 32% in another embodiment, 22% in another embodiment, 13% in another embodiment, 9% in another embodiment, 8% in another embodiment, and 5% in another embodiment.

In order to keep the viscosity of the liquid crystal composition of the present invention to a low level and the response speed to a high level, the lower limit and the upper limit described above are preferably relatively low. In order to keep Tni of the liquid crystal composition of the present invention to a high level and suppress ghosting, the lower limit and the upper limit described above are preferably relatively low. In order to increase the dielectric anisotropy to keep the drive voltage low, the lower limit and the upper limit described above are preferably relatively high.

The compound represented by general formula (IX-2-5) is preferably any of compounds represented by formula (34.1) to formula (34.5) and is preferably any of compounds represented by formula (34.1), formula (34.2), formula (34.3), and/or formula (34.5).

[Chem. 191]

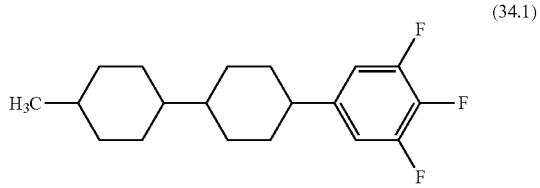
(34.1)

[Chem. 192]

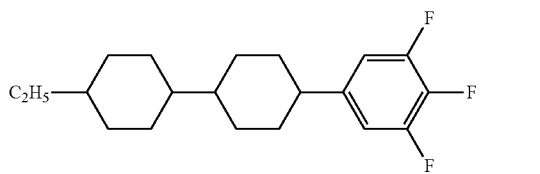
(34.2)

[Chem. 193]

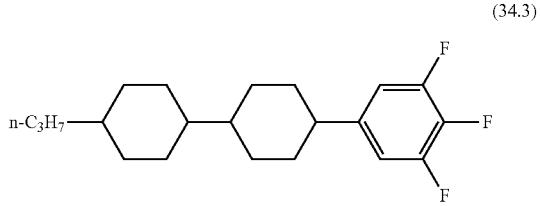
(34.3)

[Chem. 194]

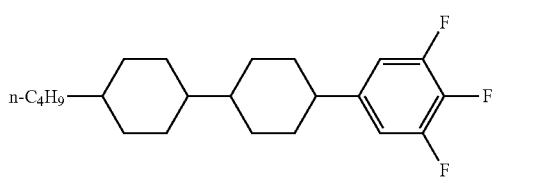
(34.4)

[Chem. 195]

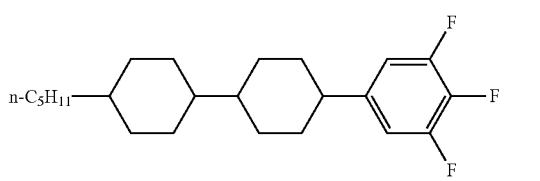
(34.5)

The compound represented by general formula (IX) is preferably a compound represented by general formula (IX-3).

[Chem. 196]

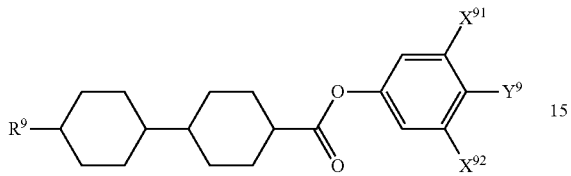

(IX-3)

(In the formula, $R^9$ represents an alkyl group having 1 to 5 carbon atoms or an alkenyl group having 2 to 5 carbon atoms, $X^{91}$ and $X^{92}$ each independently represent a hydrogen atom or a fluorine atom, and $Y^9$ represents a fluorine atom, a chlorine atom, or $-OCF_3$.)

The compound represented by general formula (IX-3) is preferably a compound represented by general formula (IX-3-1).

[Chem. 197]

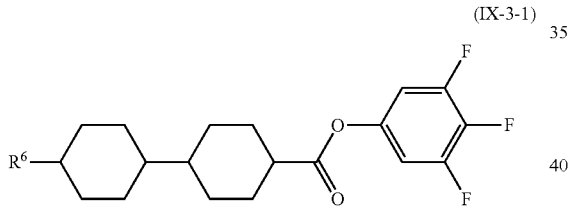

(IX-3-1)

(In the formula, $R^9$ represents an alkyl group having 1 to 5 carbon atoms or an alkenyl group having 2 to 5 carbon atoms.)

The number of compounds that can be used in combination is not limited and one or two compounds are preferably used in combination considering low-temperature solubility, transition temperature, electrical reliability, birefringence, etc.

The content of the compound represented by general formula (IX-3-1) relative to the total amount of the liquid crystal composition of the present invention is preferably 3% by mass or more, more preferably 7% by mass or more, more preferably 13% by mass or more, and most preferably 15% by mass or more. The maximum content is preferably 30% by mass or less, more preferably 20% by mass or less, more preferably 18% or less, and most preferably less than 10% by mass considering low-temperature solubility, transition temperature, electrical reliability, etc.

The compound represented by general formula (IX-3-1) is preferably any of compounds represented by formula (35.1) to formula (35.4) and is preferably a compound represented by formula (35.1) and/or formula (35.2).

[Chem. 198]

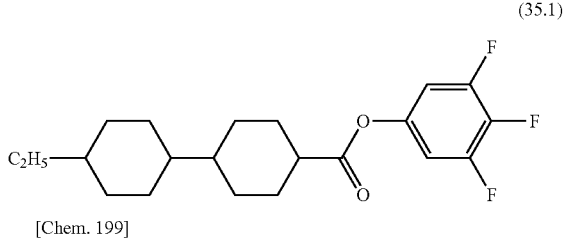

(35.1)

[Chem. 199]

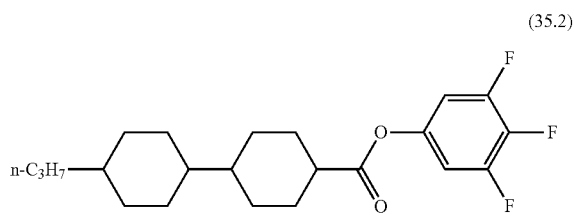

(35.2)

[Chem. 200]

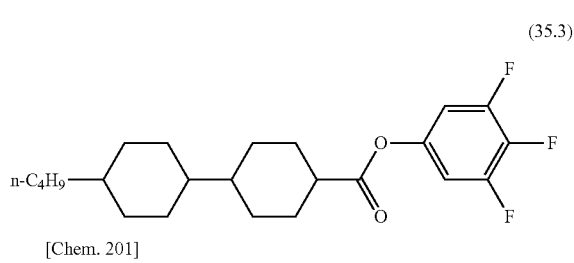

(35.3)

[Chem. 201]

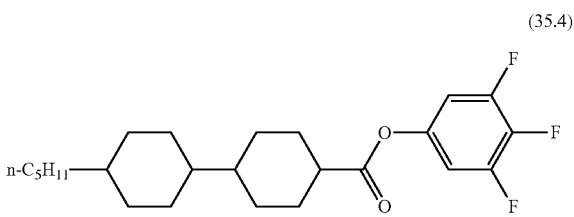

(35.4)

The compound represented by general formula (L) is preferably a compound represented by general formula (X).

[Chem. 202]

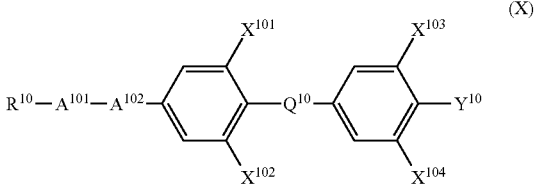

(X)

(In the formula, $X^{101}$ to $X^{104}$ each independently represent a fluorine atom or a hydrogen atom, $Y^{10}$ represents a fluorine atom, a chlorine atom, or $-OCF_3$, $Q^{10}$ represents a single bond or $-CF_2O-$, $R^{10}$ represents an alkyl group having 2 to 5 carbon atoms, and $A^{101}$ and $A^{102}$ each independently represent a 1,4-cyclohexylene group, a 1,4-phenylene group, or

[Chem. 203]

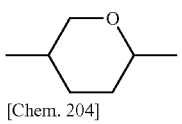

[Chem. 204]

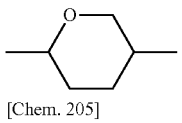

[Chem. 205]

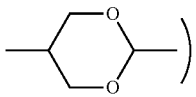

The compounds that can be used in combination are not particularly limited and a suitable combination is used for each embodiment considering low-temperature solubility, transition temperature, electrical reliability, birefringence, etc. For example, one compound is used in one embodiment of the present invention, two in another embodiment of the present invention, three in another embodiment, four in another embodiment, and five or more in another embodiment.

The content of the compound represented by general formula (X) has an upper limit and a lower limit that are preferable for each embodiment considering low-temperature solubility, transition temperature, electrical reliability, birefringence, etc. The lower limit of the content relative to the total amount of the liquid crystal composition of the present invention is, for example, 2% in one embodiment of the present invention, 3% in another embodiment, 6% in another embodiment, 8% in another embodiment, 9% in another embodiment, 11% in another embodiment, 12% in another embodiment, 18% in another embodiment, 19% in another embodiment, 23% in another embodiment, and 25% in another embodiment. The upper limit of the content is, for example, 45% in one embodiment of the present invention, 35% in another embodiment, 30% in another embodiment, 25% in another embodiment, 20% in another embodiment, 13% in another embodiment, 9% in another embodiment, 6% in another embodiment, and 3% in another embodiment.

In order to keep the viscosity of the liquid crystal composition of the present invention to a low level and the response speed to a high level, the lower limit and the upper limit described above are preferably relatively low. In order to obtain a liquid crystal composition with which ghosting is suppressed, the lower limit and the upper limit described above are preferably relatively low. In order to increase the dielectric anisotropy to keep the drive voltage low, the lower limit and the upper limit described above are preferably relatively high.

The compound represented by general formula (X) used in the liquid crystal composition of the present invention is preferably a compound represented by general formula (X-1).

[Chem. 206]

(X-1)

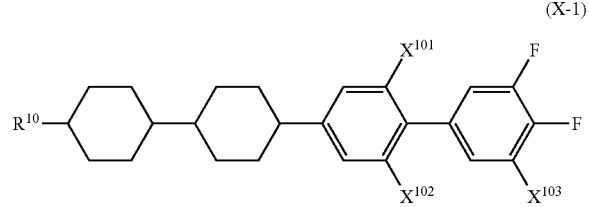

(In the formula, $X^{101}$ to $X^{103}$ each independently represent a fluorine atom or a hydrogen atom and $R^{10}$ represents an alkyl group having 2 to 5 carbon atoms.)

The compounds that can be used in combination are not particularly limited and an appropriate combination is used for each embodiment considering low-temperature solubility, transition temperature, electrical reliability, birefringence, etc. For example, one compound is used in one embodiment of the present invention, two in another embodiment of the present invention, three in another embodiment, four in another embodiment, and five or more in another embodiment.

The content of the compound represented by general formula (X-1) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 2% in one embodiment of the present invention, 3% in another embodiment, 5% in another embodiment, 6% in another embodiment, 7% in another embodiment, 8% in another embodiment, 9% in another embodiment, 13% in another embodiment, 18% in another embodiment, and 23% in another embodiment.

The upper limit of the content is, for example, 40% in one embodiment of the present invention, 30% in another embodiment, 25% in another embodiment, 20% in another embodiment, 15% in another embodiment, 10% in another embodiment, 6% in another embodiment, 4% in another embodiment, and 2% in another embodiment.

The compound represented by general formula (X-1) used in the liquid crystal composition of the present invention is preferably a compound represented by general formula (X-1-1).

[Chem. 207]

(X-1-1)

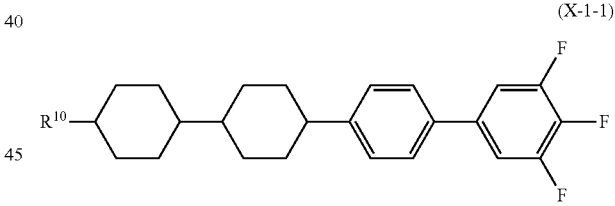

(In the formula, $R^{10}$ represents an alkyl group having 2 to 5 carbon atoms.)

The compounds that can be used in combination are not particularly limited and an appropriate combination is used for each embodiment considering low-temperature solubility, transition temperature, electrical reliability, birefringence, etc. For example, one compound is used in one embodiment of the present invention, two in another embodiment of the present invention, three in another embodiment, and four or more in another embodiment.

The content of the compound represented by general formula (X-1-1) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 3% in one embodiment of the present invention, 4% in another embodiment, 6% in another embodiment, 9% in another embodiment, 12% in another embodiment, 15% in another embodiment, 18% in another embodiment, and 21% in another embodiment.

The upper limit of the content is, for example, 30% in one embodiment of the present invention, 20% in another embodiment, 13% in another embodiment, 10% in another embodiment, 7% in another embodiment, and 3% in another embodiment.

The compound represented by general formula (X-1-1) used in the liquid crystal composition of the present invention is specifically preferably any of compounds represented by formula (36.1) to formula (36.4), and more preferably a compound represented by formula (36.1) and/or a compound represented by formula (36.2) is contained.

[Chem. 208]

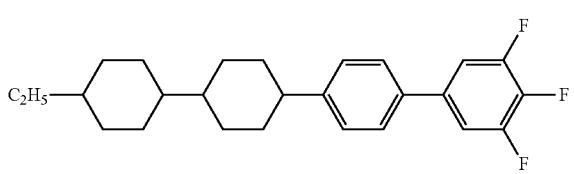

(36.1)

[Chem. 209]

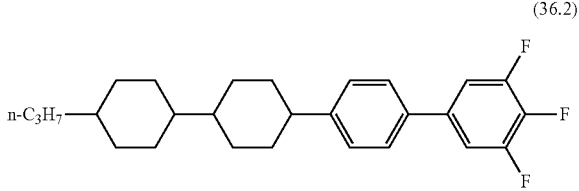

(36.2)

[Chem. 210]

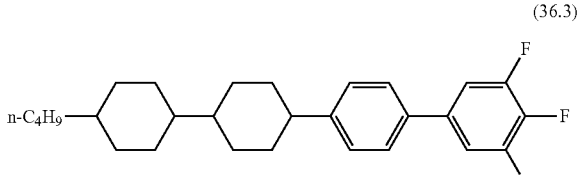

(36.3)

[Chem. 211]

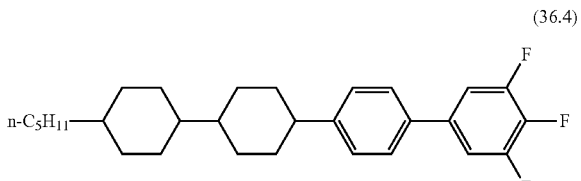

(36.4)

The compound represented by general formula (X-1) used in the liquid crystal composition of the present invention is preferably a compound represented by general formula (X-1-2).

[Chem. 212]

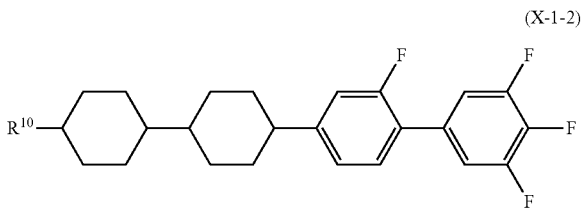

(X-1-2)

(In the formula, $R^{10}$ represents an alkyl group having 2 to 5 carbon atoms.)

The content of the compound represented by general formula (X-1-2) relative to the total amount of the liquid crystal composition of the present invention is preferably 1% by mass or more, more preferably 2% by mass or more, and most preferably 6% by mass or more. The maximum content is preferably 20% by mass or less, more preferably 16% by mass or less, more preferably 12% by mass or less, and most preferably 10% by mass or less considering low-temperature solubility, transition temperature, electrical reliability, etc.

The compound represented by general formula (X-1-2) used in the liquid crystal composition of the present invention is specifically preferably any of compounds represented by formula (37.1) to formula (37.4). Among these, a compound represented by formula (37.2) is preferably contained.

[Chem. 213]

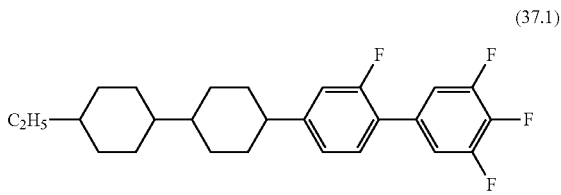

(37.1)

[Chem. 214]

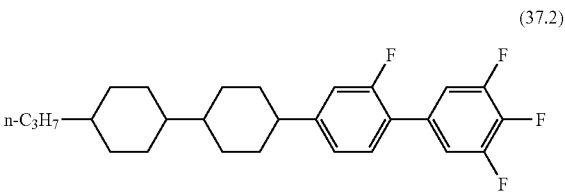

(37.2)

[Chem. 215]

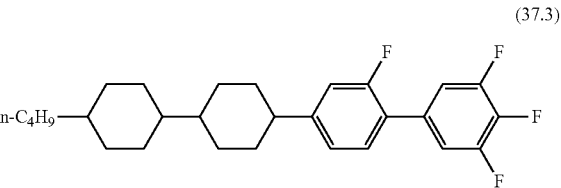

(37.3)

[Chem. 216]

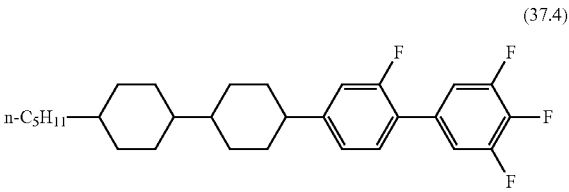

(37.4)

The compound represented by general formula (X-1) used in the liquid crystal composition of the present invention is preferably a compound represented by general formula (X-1-3).

[Chem. 217]

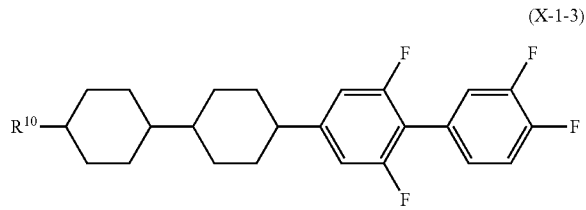

(X-1-3)

(In the formula, $R^{10}$ represents an alkyl group having 2 to 5 carbon atoms.)

The compounds that can be used in combination are not particularly limited and one or more compounds are preferably used in combination considering low-temperature solubility, transition temperature, electrical reliability, birefringence, etc.

The content of the compound represented by general formula (X-1-3) relative to the total amount of the liquid crystal composition of the present invention is preferably 1% by mass or more, more preferably 2% by mass or more, and most preferably 6% by mass or more. The maximum content is preferably 20% by mass or less, more preferably 16% by mass or less, more preferably 12% by mass or less, and most preferably 10% by mass or less considering low-temperature solubility, transition temperature, electrical reliability, etc.

The compound represented by general formula (X-1-3) used in the liquid crystal composition of the present invention is specifically preferably any of compounds represented by formula (38.1) to formula (38.4). Of these, a compound represented by formula (38.2) is preferably contained.

[Chem. 218]

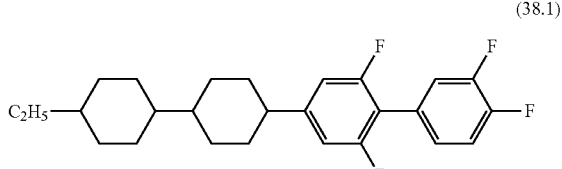

(38.1)

[Chem. 219]

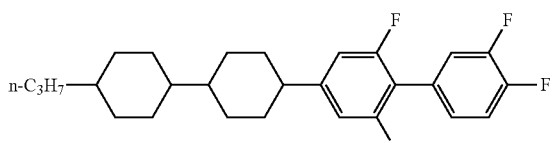

(38.2)

[Chem. 220]

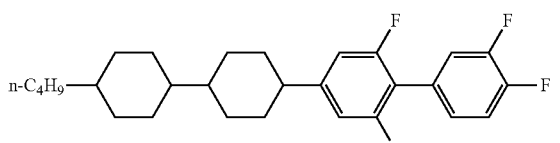

(38.3)

[Chem. 221]

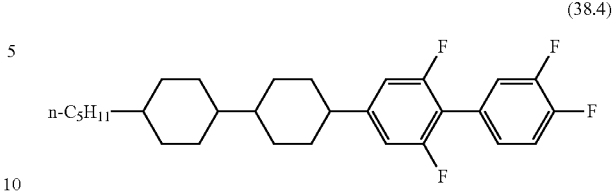

(38.4)

The compound represented by general formula (X) used in the liquid crystal composition of the present invention is preferably a compound represented by general formula (X-2).

[Chem. 222]

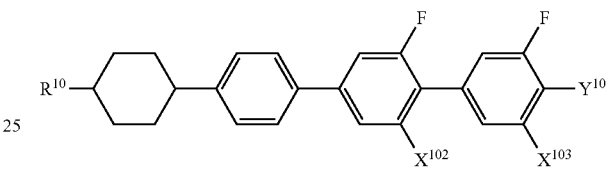

(X-2)

(In the formula, $X^{102}$ and $X^{103}$ each independently represent a fluorine atom or a hydrogen atom, $Y^{10}$ represents a fluorine atom, a chlorine atom, or —$OCF_3$, and $R^{10}$ represents an alkyl group having 2 to 5 carbon atoms.)

The compounds that can be used in combination are not particularly limited and one or more compounds are preferably used in combination considering low-temperature solubility, transition temperature, electrical reliability, birefringence, etc.

The compound represented by general formula (X-2) used in the liquid crystal composition of the present invention is preferably a compound represented by general formula (X-2-1).

[Chem. 223]

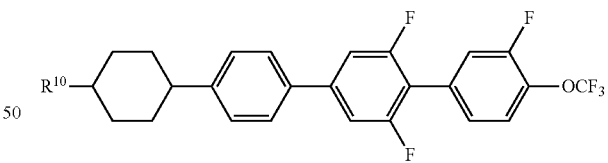

(X-2-1)

(In the formula, $R^{10}$ represents an alkyl group having 2 to 5 carbon atoms.)

The compounds that can be used in combination are not particularly limited, and preferably one or two or more compounds and more preferably one to three or more compounds are used in combination considering low-temperature solubility, transition temperature, electrical reliability, birefringence, etc.

The content of the compound represented by general formula (X-2-1) relative to the total amount of the liquid crystal composition of the present invention is preferably 3% by mass or more, more preferably 6% by mass or more, and most preferably 9% by mass or more. The maximum content is preferably 20% by mass or less, more preferably 16% by mass or less, yet more preferably 12% by mass or less, and most preferably 10% by mass or less considering low-temperature solubility, transition temperature, electrical reliability, etc.

The compound represented by general formula (X-2-1) used in the liquid crystal composition of the present invention is specifically preferably any of compounds represented by formula (39.1) to formula (39.4). Of these, a compound represented by formula (39.2) is preferably contained.

[Chem. 224]

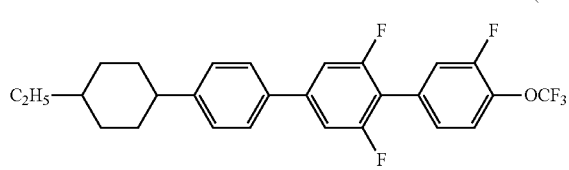

(39.1)

[Chem. 225]

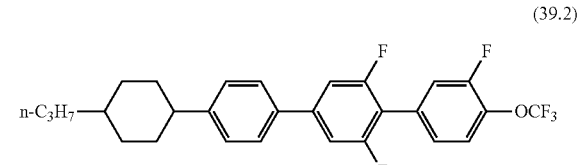

(39.2)

[Chem. 226]

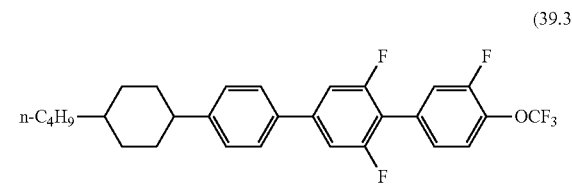

(39.3)

[Chem. 227]

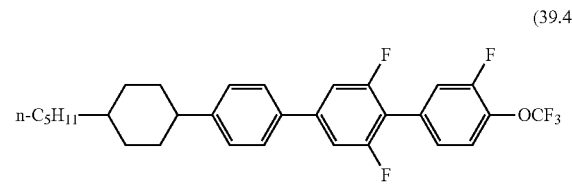

(39.4)

The compound represented by general formula (X-2) used in the liquid crystal composition of the present invention is preferably a compound represented by general formula (X-2-2).

[Chem. 228]

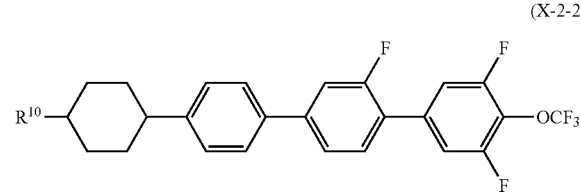

(X-2-2)

(In the formula, $R^{10}$ represents an alkyl group having 2 to 5 carbon atoms.)

The compounds that can be used in combination are not particularly limited, and preferably one or more compounds are used in combination considering low-temperature solubility, transition temperature, electrical reliability, birefringence, etc.

The content of the compound represented by general formula (X-2-2) relative to the total amount of the liquid crystal composition of the present invention is preferably 3% by mass or more, more preferably 6% by mass or more, and most preferably 9% by mass or more. The maximum content is preferably 20% by mass or less, more preferably 16% by mass or less, yet more preferably 12% by mass or less, and most preferably 10% by mass or less considering low-temperature solubility, transition temperature, electrical reliability, etc.

The compound represented by general formula (X-2-2) used in the liquid crystal composition of the present invention is specifically preferably any of compounds represented by formula (40.1) to formula (40.4). Of these, a compound represented by formula (40.2) is preferably contained.

[Chem. 229]

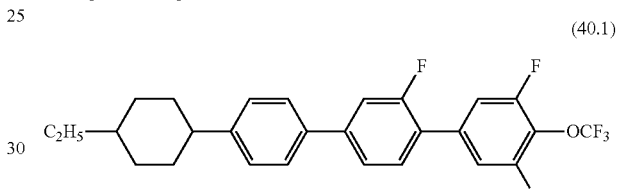

(40.1)

[Chem. 230]

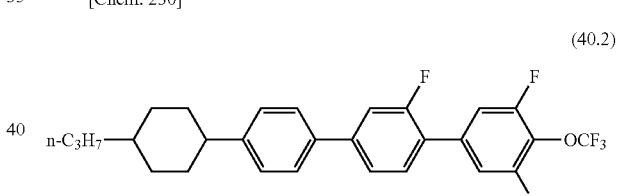

(40.2)

[Chem. 231]

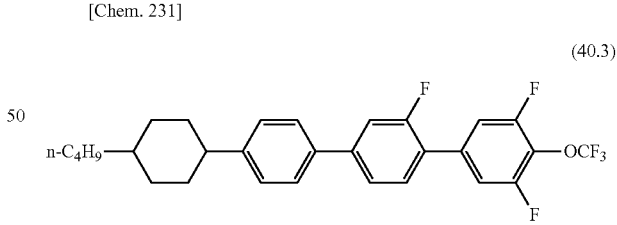

(40.3)

[Chem. 232]

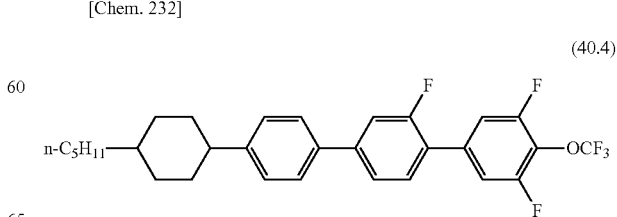

(40.4)

The compound represented by general formula (X) is preferably a compound represented by general formula (X-3).

[Chem. 233]

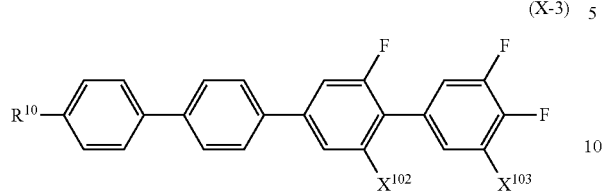
(X-3)

(In the formula, $X^{102}$ and $X^{103}$ each independently represent a fluorine atom or a hydrogen atom and $R^{10}$ represents an alkyl group having 2 to 5 carbon atoms.)

The compounds that can be used in combination are not particularly limited, and preferably one or more compounds are used in combination considering low-temperature solubility, transition temperature, electrical reliability, birefringence, etc.

The compound represented by general formula (X-3) used in the liquid crystal composition of the present invention is preferably a compound represented by general formula (X-3-1).

[Chem. 234]

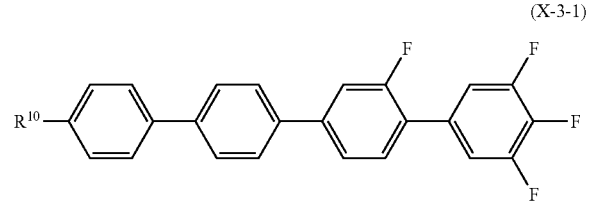
(X-3-1)

(In the formula, $R^{10}$ represents an alkyl group having 2 to 5 carbon atoms.)

The compounds that can be used in combination are not particularly limited, and preferably one or more compounds are used in combination considering low-temperature solubility, transition temperature, electrical reliability, birefringence, etc.

The content of the compound represented by general formula (X-3-1) relative to the total amount of the liquid crystal composition of the present invention is preferably 1% by mass or more, more preferably 2% by mass or more, and most preferably 3% by mass or more. The maximum content is preferably 10% by mass or less, more preferably 8% by mass or less, yet more preferably 6% by mass or less, and most preferably 4% by mass or less considering low-temperature solubility, transition temperature, electrical reliability, etc.

The compound represented by general formula (X-3-1) used in the liquid crystal composition of the present invention is specifically preferably any of compounds represented by formula (41.1) to formula (41.4). Of these, a compound represented by formula (41.2) is preferably contained.

[Chem. 235]

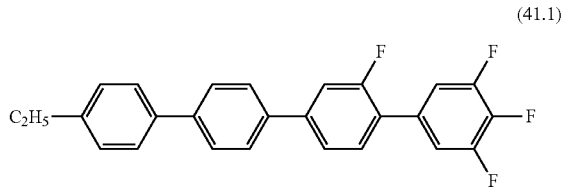
(41.1)

[Chem. 236]

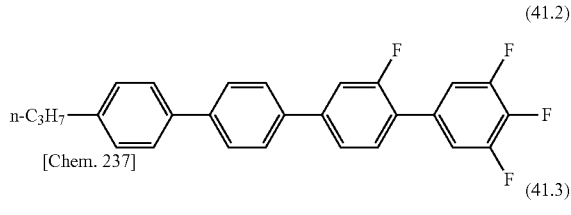
(41.2)

[Chem. 237]

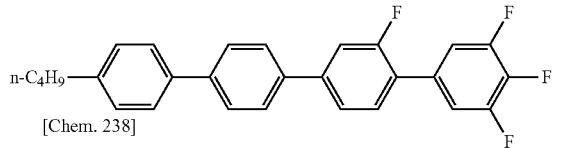
(41.3)

[Chem. 238]

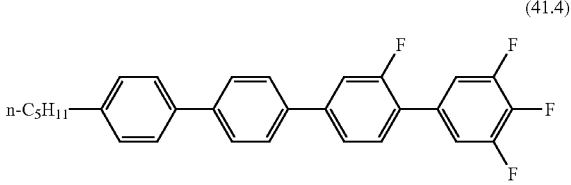
(41.4)

The compound represented by general formula (X) is preferably a compound represented by general formula (X-4).

[Chem. 239]

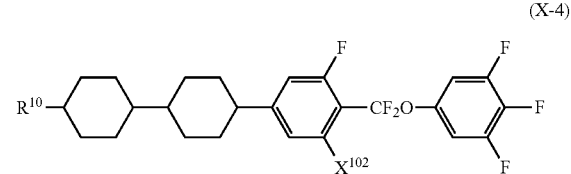
(X-4)

(In the formula, $X^{102}$ represents a fluorine atom or a hydrogen atom and $R^{10}$ represents an alkyl group having 2 to 5 carbon atoms.)

The compounds that can be used in combination are not particularly limited, and preferably one or more compounds and more preferably one to three or more compounds are used in combination considering low-temperature solubility, transition temperature, electrical reliability, birefringence, etc.

The compound represented by general formula (X-4) used in the liquid crystal composition of the present invention is preferably a compound represented by general formula (X-4-1).

[Chem. 240]

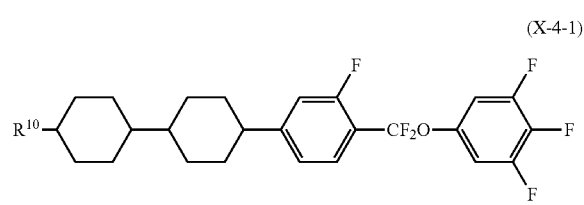
(X-4-1)

(In the formula, $R^{10}$ represents an alkyl group having 2 to 5 carbon atoms.)

The compounds that can be used in combination are not particularly limited, and preferably one or more compounds and more preferably one to three or more compounds are used in combination considering low-temperature solubility, transition temperature, electrical reliability, birefringence, etc.

The content of the compound represented by general formula (X-4-1) relative to the total amount of the liquid crystal composition of the present invention is preferably 2% by mass or more, more preferably 5% by mass or more, and most preferably 10% by mass or more. The maximum content is preferably 20% by mass or less, more preferably 17% by mass or less, yet more preferably 15% by mass or less, and most preferably 13% by mass or less considering low-temperature solubility, transition temperature, electrical reliability, etc.

The compound represented by general formula (X-4-1) used in the liquid crystal composition of the present invention is specifically preferably any of compounds represented by formula (42.1) to formula (42.4). Of these, a compound represented by formula (42.3) is preferably contained.

[Chem. 241]

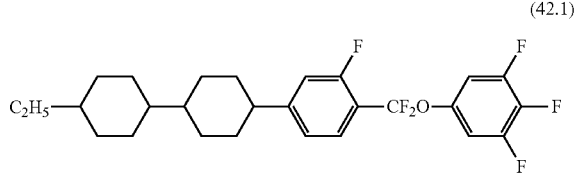

(42.1)

[Chem. 242]

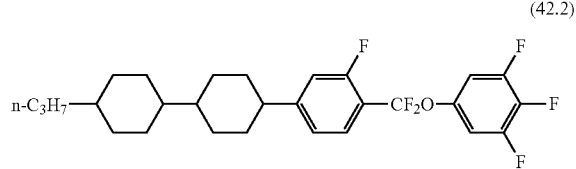

(42.2)

[Chem. 243]

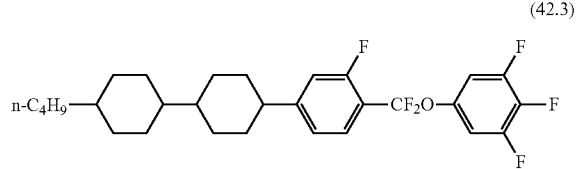

(42.3)

[Chem. 244]

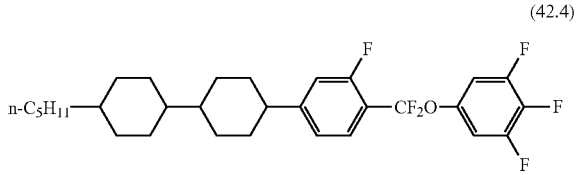

(42.4)

The compound represented by general formula (X) is preferably a compound represented by general formula (X-5).

[Chem. 245]

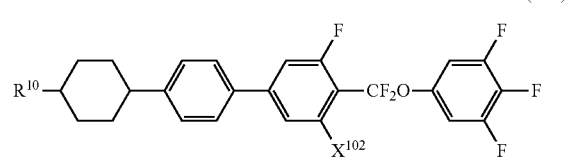

(X-5)

(In the formula, $X^{102}$ represents a fluorine atom or a hydrogen atom and $R^{10}$ represents an alkyl group having 2 to 5 carbon atoms.)

The compounds that can be used in combination are not particularly limited, and preferably one or more compounds and more preferably one to three or more compounds are used in combination considering low-temperature solubility, transition temperature, electrical reliability, birefringence, etc.

The compound represented by general formula (X-5) used in the liquid crystal composition of the present invention is preferably a compound represented by general formula (X-5-1).

[Chem. 246]

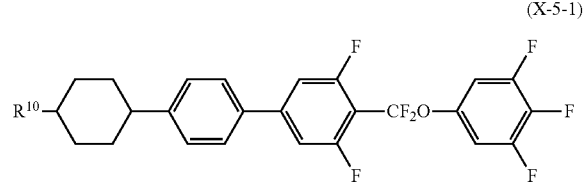

(X-5-1)

(In the formula, $R^{10}$ represents an alkyl group having 2 to 5 carbon atoms.)

The compounds that can be used in combination are not particularly limited, and preferably one or more compounds and more preferably one to three or more compounds are used in combination considering low-temperature solubility, transition temperature, electrical reliability, birefringence, etc.

The compound represented by general formula (X-5-1) used in the liquid crystal composition of the present invention is specifically preferably any of compounds represented by formula (43.1) to formula (43.4). Of these, a compound represented by formula (42.2) is preferably contained.

[Chem. 247]

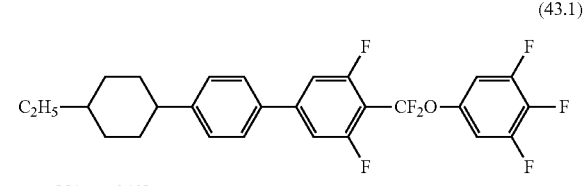

(43.1)

[Chem. 248]

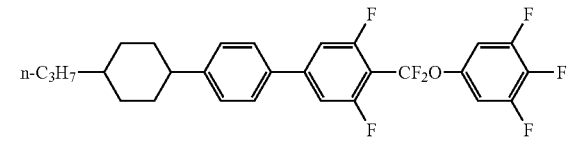

(43.2)

[Chem. 249]

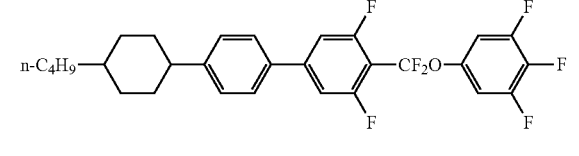

(43.3)

[Chem. 250]

(43.4)

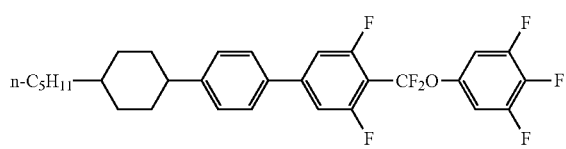

The compound represented by general formula (X) used in the liquid crystal composition of the present invention is preferably a compound represented by general formula (X-6).

[Chem. 251]

(X-6)

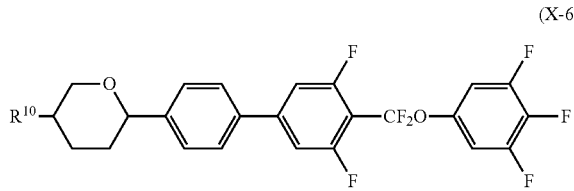

(In the formula, $R^{10}$ represents an alkyl group having 2 to 5 carbon atoms.)

The compounds that can be used in combination are not particularly limited, and preferably one or more compounds are used in combination considering low-temperature solubility, transition temperature, electrical reliability, birefringence, etc.

The content of the compound represented by general formula (X-6) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 4% in one embodiment of the present invention, 5% in another embodiment, 6% in another embodiment, 8% in another embodiment, 9% in another embodiment, 11% in another embodiment, 14% in another embodiment, and 18% in another embodiment.

The upper limit of the content is, for example, 30% in one embodiment of the present invention, 20% in another embodiment, 13% in another embodiment, 10% in another embodiment, 7% in another embodiment, and 3% in another embodiment.

The compound represented by general formula (X-6) used in the liquid crystal composition of the present invention is specifically preferably any of compounds represented by formula (44.1) to formula (44.4). Of these, a compound represented by formula (44.1) and/or a compound represented by formula (44.2) is preferably contained.

[Chem. 252]

(44.1)

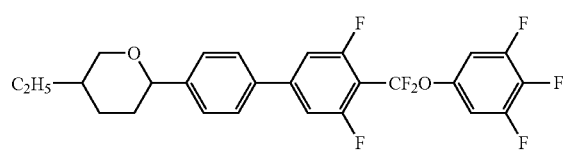

[Chem. 253]

(44.2)

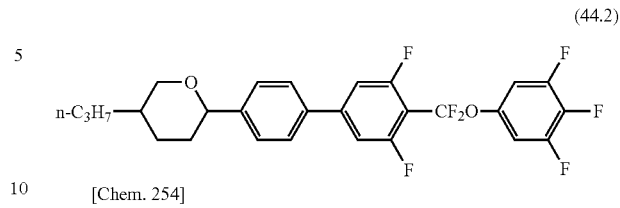

[Chem. 254]

(44.3)

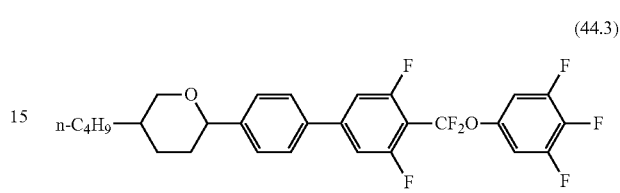

[Chem. 255]

(44.4)

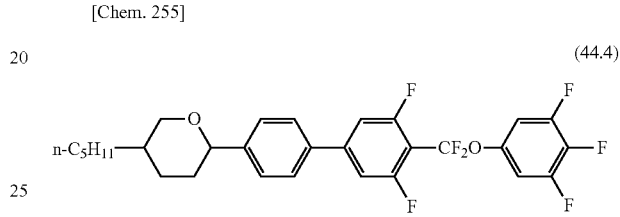

The compound represented by general formula (X) is preferably a compound selected from the group represented by general formula (XI).

[Chem. 256]

(XI)

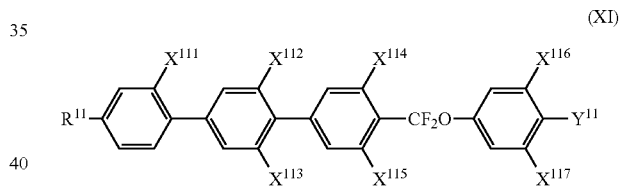

(In the formula, $X^{111}$ to $X^{117}$ each independently represent a fluorine atom or a hydrogen atom, at least one of $X^{111}$ to $X^{117}$ represents a fluorine atom, $R^{11}$ represents an alkyl group having 2 to 5 carbon atoms, and Y11 represents a fluorine atom or —OCF3.)

The compounds that can be used in combination are not particularly limited, and preferably one to three or more compounds are used in combination considering low-temperature solubility, transition temperature, electrical reliability, birefringence, etc.

The content of the compound represented by general formula (XI) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 2% in one embodiment of the present invention, 4% in another embodiment, 5% in another embodiment, 7% in another embodiment, 9% in another embodiment, 10% in another embodiment, 12% in another embodiment, 13% in another embodiment, 15% in another embodiment, and 18% in another embodiment.

The upper limit of the content is, for example, 30% in one embodiment of the present invention, 25% in another embodiment, 20% in another embodiment, 15% in another embodiment, 10% in another embodiment, and 5% in another embodiment.

In the case where the liquid crystal composition of the present invention is to be used in a liquid crystal display device having a small cell gap, the content of the compound represented by general formula (XI) is preferably relatively high. In the case where the liquid crystal composition is to be used in a liquid crystal display device with a low drive voltage, the content of the compound represented by general formula (XI) is preferably relatively high. In the case where the liquid crystal composition is to be used in a liquid crystal display device for use in low-temperature environments, the content of the compound represented by general formula (XI) is preferably relatively low. In the case where the liquid crystal composition is to be used in a liquid crystal display device with high response speed, the content of the compound represented by general formula (XI) is preferably relatively low.

The compound represented by general formula (XI) used in the liquid crystal composition of the present invention is preferably a compound represented by general formula (XI-1).

[Chem. 257]

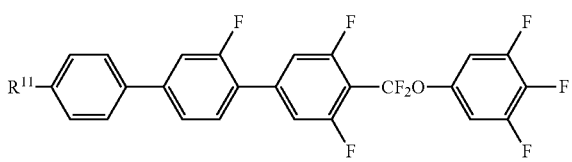

(XI-1)

(In the formula, $R^{11}$ represents an alkyl group having 2 to 5 carbon atoms and Y11 represents a fluorine atom or —OCF$_3$.)

The compounds that can be used in combination are not particularly limited and an appropriate combination is used for each embodiment considering low-temperature solubility, transition temperature, electrical reliability, birefringence, etc. For example, one compound is used in one embodiment of the present invention, two in another embodiment, and three or more in another embodiment.

The content of the compound represented by general formula (XI-1) relative to the total amount of the liquid crystal composition of the present invention is preferably 1% by mass or more, more preferably 3% by mass or more, more preferably 4% by mass or more, yet more preferably 6% by mass or more, and most preferably 9% by mass or more. The maximum content is preferably 20% by mass or less, more preferably 15% by mass or less, yet more preferably 12% by mass or less, and most preferably 8% by mass or less considering low-temperature solubility, transition temperature, electrical reliability, etc.

The compound represented by general formula (XI-1) used in the liquid crystal composition of the present invention is specifically preferably any of compounds represented by formula (45.1) to formula (45.4). Of these, compounds represented by formula (45.2) to formula (45.4) are preferably contained and a compound represented by formula (45.2) is more preferably contained.

[Chem. 258]

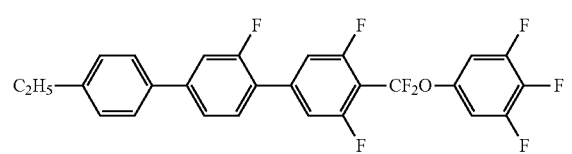

(45.1)

[Chem. 259]

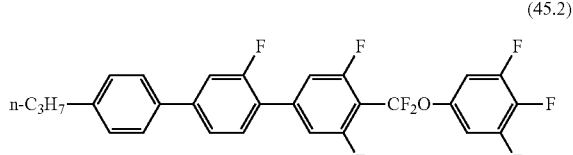

(45.2)

[Chem. 260]

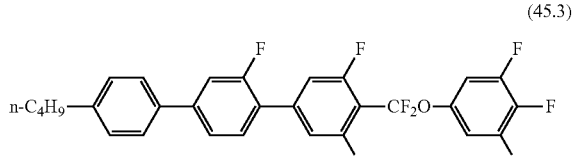

(45.3)

[Chem. 261]

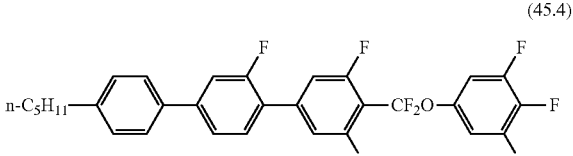

(45.4)

The compound represented by general formula (X) is preferably a compound selected from the group represented by general formula (XII).

[Chem. 262]

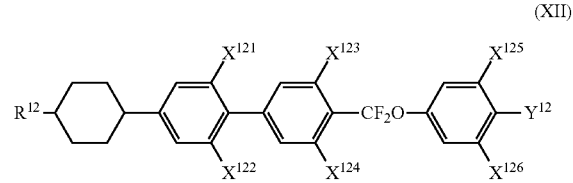

(XII)

(In the formula, $X^{121}$ to $X^{126}$ each independently represent a fluorine atom or a hydrogen atom, $R^{12}$ represents an alkyl group having 2 to 5 carbon atoms, and $Y^{12}$ represents a fluorine atom or —OCF3.)

The compounds that can be used in combination are not particularly limited, and preferably one to three or more and more preferably one to four or more compounds are used in combination considering low-temperature solubility, transition temperature, electrical reliability, birefringence, etc.

The compound represented by general formula (XII) used in the liquid crystal composition of the present invention is preferably a compound represented by general formula (XII-1).

[Chem. 263]

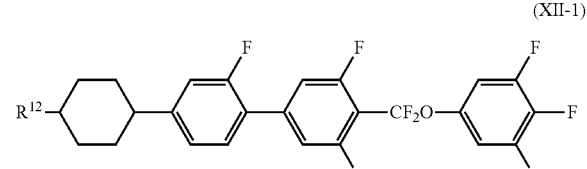

(XII-1)

(In the formula, $R^{12}$ represents an alkyl group having 2 to 5 carbon atoms.)

The compounds that can be used in combination are not particularly limited, and preferably one or more and more preferably one to three or more compounds are used in combination considering low-temperature solubility, transition temperature, electrical reliability, birefringence, etc.

The content of the compound represented by general formula (XII-1) relative to the total amount of the liquid crystal composition of the present invention is preferably 1% by mass or more, more preferably 2% by mass or more, yet more preferably 3% by mass or more, and most preferably 4% by mass or more. The maximum content is preferably 15% by mass or less, more preferably 10% by mass or less, yet more preferably 8% by mass or less, and most preferably 6% by mass or less considering low-temperature solubility, transition temperature, electrical reliability, etc.

The compound represented by general formula (XII-1) used in the liquid crystal composition of the present invention is specifically preferably any of compounds represented by formula (46.1) to formula (46.4). Of these, compounds represented by formula (46.2) to formula (46.4) are preferably contained.

[Chem. 264]

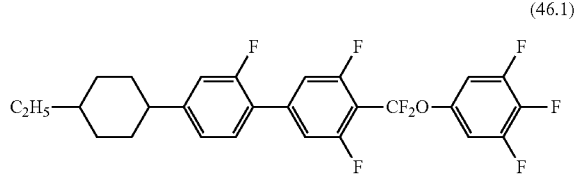
(46.1)

[Chem. 265]

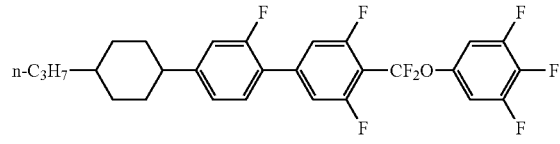
(46.2)

[Chem. 266]

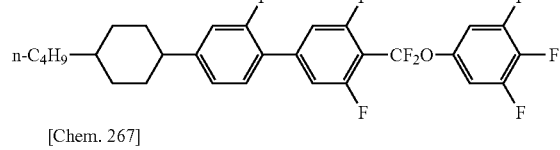
(46.3)

[Chem. 267]

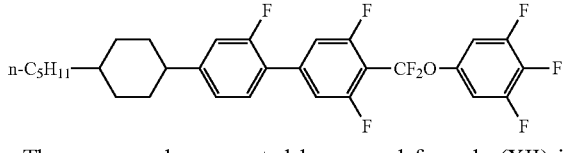
(46.4)

The compound represented by general formula (XII) is preferably a compound represented by general formula (XII-2).

[Chem. 268]

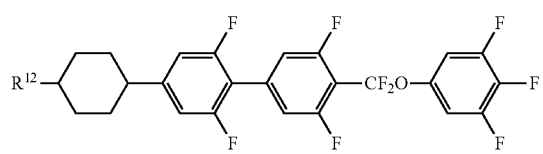
(XII-2)

(In the formula, $R^{12}$ represents an alkyl group having 2 to 5 carbon atoms.)

The compounds that can be used in combination are not particularly limited, and preferably one or more and more preferably one to three or more compounds are used in combination considering low-temperature solubility, transition temperature, electrical reliability, birefringence, etc.

The content of the compound represented by general formula (XII-2) relative to the total amount of the liquid crystal composition of the present invention is preferably 1% by mass or more, more preferably 3% by mass or more, more preferably 4% by mass or more, more preferably 6% by mass or more, and most preferably 9% by mass or more. The maximum content is preferably 20% by mass or less, more preferably 17% by mass or less, yet more preferably 15% by mass or less, and most preferably 13% by mass or less considering low-temperature solubility, transition temperature, electrical reliability, etc.

The compound represented by general formula (XII-2) used in the liquid crystal composition of the present invention is specifically preferably any of compounds represented by formula (47.1) to formula (47.4). Of these, compounds represented by formula (47.2) to formula (47.4) are preferably contained.

[Chem. 269]

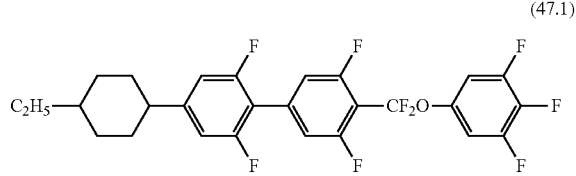
(47.1)

[Chem. 270]

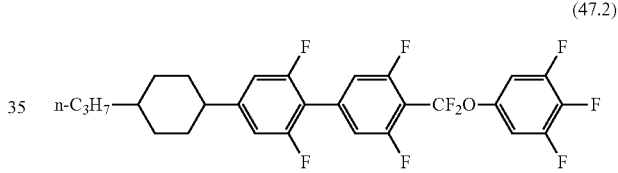
(47.2)

[Chem. 271]

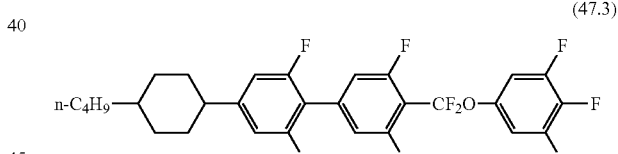
(47.3)

[Chem. 272]

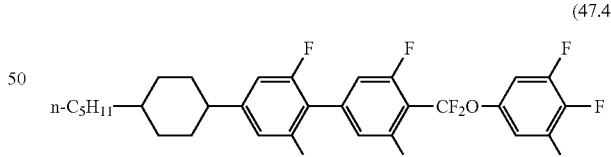
(47.4)

The compound represented by general formula (M) is preferably a compound selected from the group of compounds represented by general formula (XIII).

[Chem. 273]

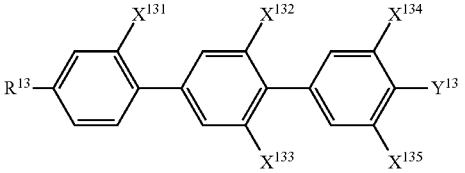
(XIII)

(In the formula, $X^{131}$ to $X^{135}$ each independently represent a fluorine atom or a hydrogen atom, $R^{13}$ represents an alkyl group having 2 to 5 carbon atoms, and Y13 represents a fluorine atom or —OCF$_3$.)

The number of compounds that can be used in combination is not particularly limited. Preferably one or two compounds, more preferably one to three compounds, and most preferably one to four compounds selected from these are contained.

The content of the compound represented by general formula (XIII) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 2% in one embodiment of the present invention, 4% in another embodiment, 5% in another embodiment, 7% in another embodiment, 9% in another embodiment, 11% in another embodiment, 13% in another embodiment, 14% in another embodiment, 16% in another embodiment, and 20% in another embodiment.

The upper limit of the content is, for example, 30% in one embodiment of the present invention, 25% in another embodiment, 20% in another embodiment, 15% in another embodiment, 10% in another embodiment, and 5% in another embodiment.

In the case where the liquid crystal composition of the present invention is to be used in a liquid crystal display device having a small cell gap, the content of the compound represented by general formula (XIII) is preferably relatively high. In the case where the liquid crystal composition is to be used in a liquid crystal display device with a low drive voltage, the content of the compound represented by general formula (XIII) is preferably relatively high. In the case where the liquid crystal composition is to be used in a liquid crystal display device for use in low-temperature environments, the content of the compound represented by general formula (XIII) is preferably relatively low. In the case where the liquid crystal composition is to be used in a liquid crystal display device with high response speed, the content of the compound represented by general formula (XIII) is preferably relatively low.

The compound represented by general formula (XIII) is preferably a compound represented by general formula (XIII-1).

[Chem. 274]

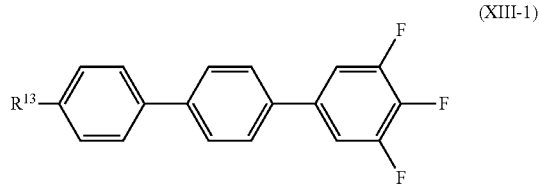

(XIII-1)

(In the formula, $R^{13}$ represents an alkyl group having 2 to 5 carbon atoms.)

The content of the compound represented by general formula (XIII-1) relative to the total amount of the liquid crystal composition of the present invention is preferably 1% by mass or more, more preferably 3% by mass or more, yet more preferably 5% by mass or more, and most preferably 10% by mass or more. The maximum content is preferably 25% by mass or less, more preferably 20% by mass or less, and most preferably 15% by mass or less.

The compound represented by general formula (XIII-1) is preferably any of compounds represented by formula (48.1) to formula (48.4) and is preferably a compound represented by formula (48.2).

[Chem. 275]

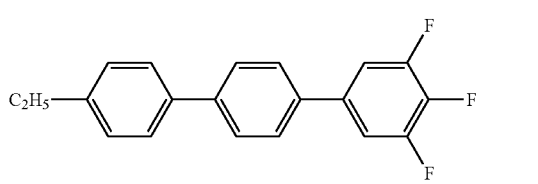

(48.1)

[Chem. 276]

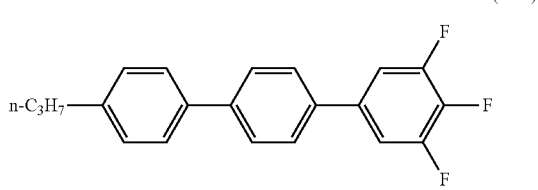

(48.2)

[Chem. 277]

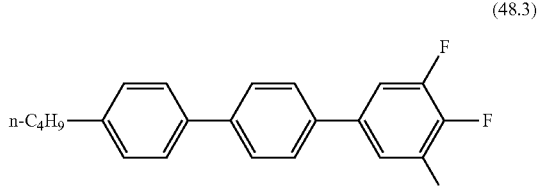

(48.3)

[Chem. 278]

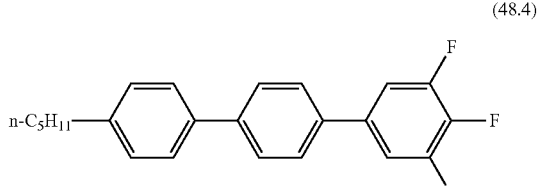

(48.4)

The compound represented by general formula (XIII) is preferably a compound represented by general formula (XIII-2).

[Chem. 279]

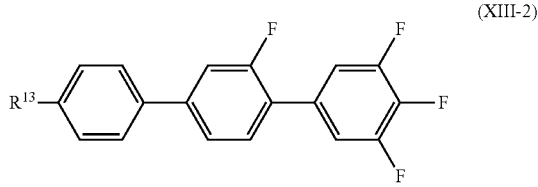

(XIII-2)

(In the formula, $R^{13}$ represents an alkyl group having 2 to 5 carbon atoms.)

The number of compounds that can be used in combination is not particularly limited and one or more compounds selected from these compounds are preferably contained.

The content of the compound represented by general formula (XIII-2) relative to the total amount of the liquid crystal composition of the present invention is preferably 5% by mass or more, more preferably 6% by mass or more, yet more preferably 8% by mass or more, and most preferably 10% by mass or more. The maximum content is preferably 25% by mass or less, more preferably 20% by mass or less, and most preferably 15% by mass or less.

The compound represented by general formula (XIII-2) is preferably any of compounds represented by formula (49.1) to formula (49.4) and preferably a compound represented by formula (49.1) and/or formula (49.2).

[Chem. 280]

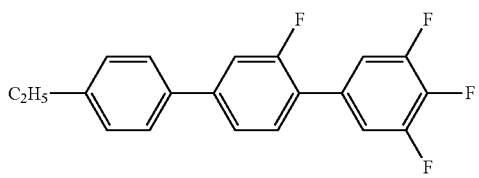

(49.1)

[Chem. 281]

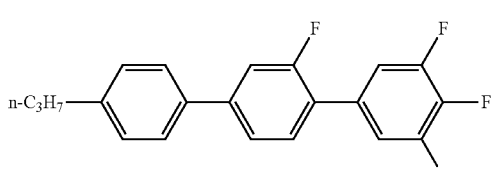

(49.2)

[Chem. 282]

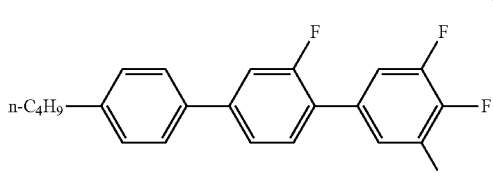

(49.3)

[Chem. 283]

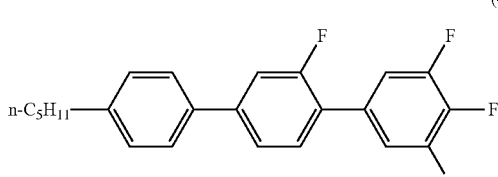

(49.4)

The compound represented by general formula (XIII) is preferably a compound represented by general formula (XIII-3).

[Chem. 284]

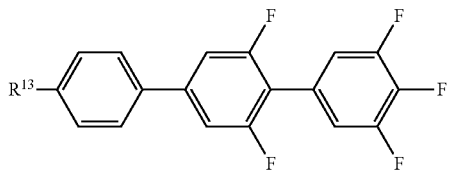

(XIII-3)

(In the formula, $R^{13}$ represents an alkyl group having 2 to 5 carbon atoms.)

The number of compounds that can be used in combination is not particularly limited and one or more compounds selected from these compounds are preferably contained.

The content of the compound represented by general formula (XIII-3) relative to the total amount of the liquid crystal composition of the present invention is preferably 2% by mass or more, more preferably 4% by mass or more, more preferably 9% by mass or more, and most preferably 11% by mass or more. The maximum content is preferably 20% by mass or less, more preferably 17% by mass or less, and most preferably 14% by mass or less.

The compound represented by general formula (XIII-3) is preferably any of compounds represented by formula (50.1) to formula (50.4) and is preferably a compound represented by formula (50.1) and/or formula (50.2).

[Chem. 285]

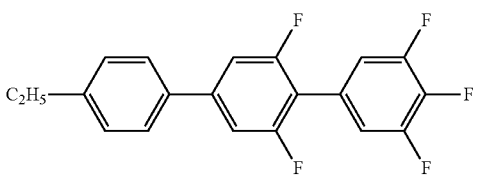

(50.1)

[Chem. 286]

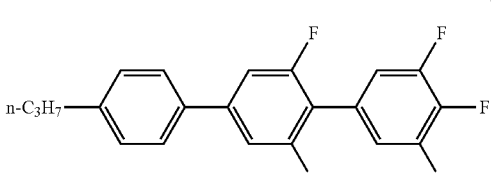

(50.2)

[Chem. 287]

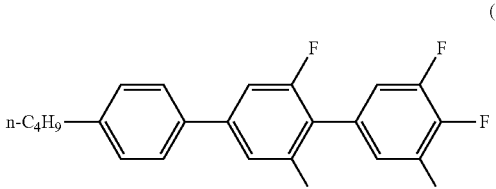

(50.3)

[Chem. 288]

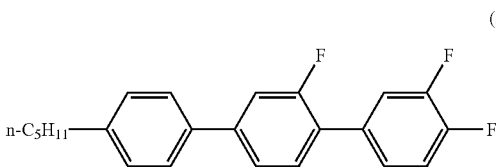

(50.4)

The compound represented by general formula (M) is preferably a compound selected from the group of compounds represented by general formula (XIV).

[Chem. 289]

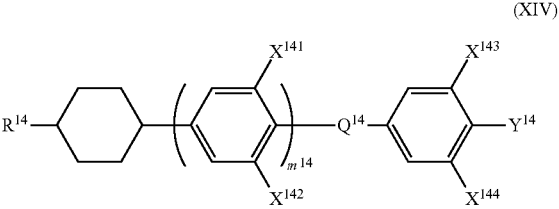

(XIV)

(In the formula, $R^{14}$ represents an alkyl group having 2 to 7 carbon atoms, $X^{141}$ to $X^{1''}$ each independently represent a fluorine atom or a hydrogen atom, $Y^{14}$ represents a fluorine atom, a chlorine atom, or —OCF$_3$, Q$^{14}$ represents a single bond, —COO—, or —CF$_2$O—, and m$^{14}$ represents 0 or 1.)

The number of compounds that can be used in combination is not limited and a suitable combination is used for each embodiment considering low-temperature solubility, transition temperature, electrical reliability, birefringence, etc. For example, one compound is used in one embodiment of the present invention, two in another embodiment of the present invention, three in another embodiment of the present invention, four in another embodiment of the present invention, five in another embodiment of the present invention, and six or more in another embodiment of the present invention.

The content of the compound represented by general formula (XIV) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 3% in one embodiment of the present invention, 7% in another embodiment, 8% in another embodiment, 11% in another embodiment, 12% in another embodiment, 16% in another embodiment, 18% in another embodiment, 19% in another embodiment, 22% in another embodiment, and 25% in another embodiment.

The upper limit of the content is, for example, 40% in one embodiment of the present invention, 35% in another embodiment, 30% in another embodiment, 25% in another embodiment, 20% in another embodiment, and 15% in another embodiment.

In the case where the liquid crystal composition of the present invention is to be used in a liquid crystal display device with a low drive voltage, the content of the compound represented by general formula (XIV) is preferably relatively high. In the case where the liquid crystal composition is to be used in a liquid crystal display device having a high response speed, the content of the compound represented by general formula (XIV) is preferably relatively low.

The compound represented by general formula (XIV) is preferably a compound represented by general formula (XIV-1).

[Chem. 290]

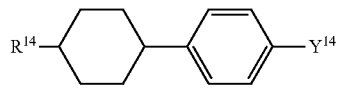

(XIV-1)

(In the formula, R$^{14}$ represents an alkyl group having 2 to 7 carbon atoms, and Y$^{14}$ represents a fluorine atom, a chlorine atom, or —OCF$_3$.)

The number of compounds that can be used in combination is not limited and one to three compounds are preferably used in combination considering low-temperature solubility, transition temperature, electrical reliability, birefringence, etc.

The compound represented by general formula (XIV-1) is preferably a compound represented by general formula (XIV-1-1).

[Chem. 291]

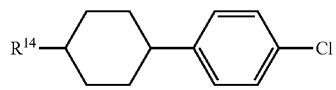

(XIV-1-1)

(In the formula, R$^{14}$ represents an alkyl group having 2 to 7 carbon atoms.)

The content of the compound represented by general formula (XIV-1) relative to the total amount of the liquid crystal composition of the present invention is preferably 2% by mass or more, more preferably 4% by mass or more, more preferably 7% by mass or more, more preferably 10% by mass or more, and most preferably 18% by mass or more. The maximum content is preferably 30% by mass or less, more preferably 27% by mass or less, yet more preferably 24% by mass or less, and most preferably less than 21% by mass considering low-temperature solubility, transition temperature, electrical reliability, etc.

The compound represented by general formula (XIV-1-1) is specifically preferably any of compounds represented by formula (51.1) to formula (51.4), and a compound represented by formula (51.1) is more preferably contained.

[Chem. 292]

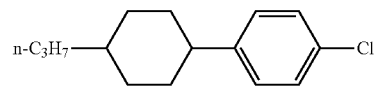

(51.1)

[Chem. 293]

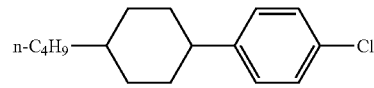

(51.2)

[Chem. 294]

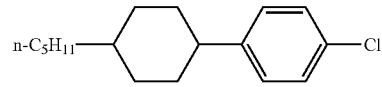

(51.3)

[Chem. 295]

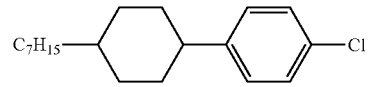

(51.4)

The compound represented by general formula (XIV-1) is preferably a compound represented by general formula (XIV-1-2).

[Chem. 296]

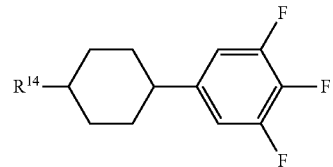

(XIV-1-2)

(In the formula, R$^{14}$ represents an alkyl group having 2 to 7 carbon atoms.)

The content of the compound represented by general formula (XIV-1-2) relative to the total amount of the liquid crystal composition of the present invention is preferably 1% by mass or more, more preferably 3% by mass or more, more preferably 5% by mass or more, and most preferably 7% by mass or more. The maximum content is preferably 15% by mass or less, more preferably 13% by mass or less, yet more preferably 11% by mass or less, and most preferably less than 9% by mass considering low-temperature solubility, transition temperature, electrical reliability, etc.

The compound represented by general formula (XIV-1-2) is specifically preferably any of compounds represented by formula (52.1) to formula (52.4), and, of these, a compound represented by formula (52.4) is preferably contained.

[Chem. 297]

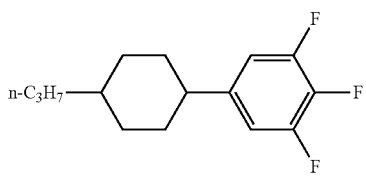
(52.1)

[Chem. 298]

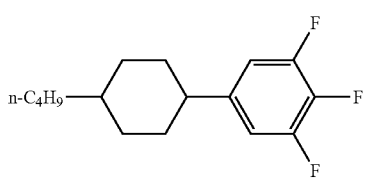
(52.2)

[Chem. 299]

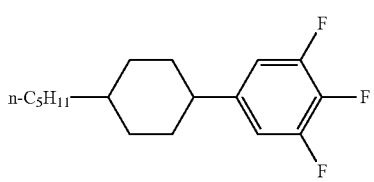
(52.3)

[Chem. 300]

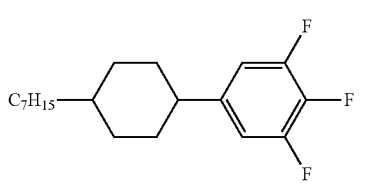
(52.4)

The compound represented by general formula (XIV) is preferably a compound represented by general formula (XIV-2).

[Chem. 301]

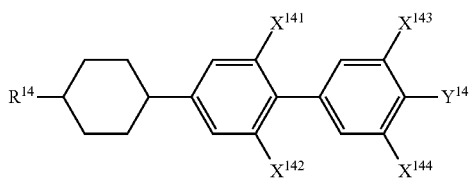
(XIV-2)

(In the formula, $R^{14}$ represents an alkyl group having 2 to 7 carbon atoms, $X^{141}$ to $X^{144}$ each independently represent a fluorine atom or a hydrogen atom, and $Y^{14}$ represents a fluorine atom, a chlorine atom, or —$OCF_3$.)

The number of compounds that can be used in combination is not limited and a suitable combination is used for each embodiment considering low-temperature solubility, transition temperature, electrical reliability, birefringence, etc. For example, one compound is used in one embodiment of the present invention, two in another embodiment of the present invention, three in another embodiment of the present invention, four in another embodiment of the present invention, and five or more in another embodiment of the present invention.

The content of the compound represented by general formula (XIV-2) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 3% in one embodiment of the present invention, 7% in another embodiment, 8% in another embodiment, 10% in another embodiment, 11% in another embodiment, 12% in another embodiment, 18% in another embodiment, 19% in another embodiment, 21% in another embodiment, and 22% in another embodiment.

The upper limit of the content is, for example, 40% in one embodiment of the present invention, 35% in another embodiment, 25% in another embodiment, 20% in another embodiment, 15% in another embodiment, and 10% in another embodiment.

In the case where the liquid crystal composition of the present invention is to be used in a liquid crystal display device with a low drive voltage, the content of the compound represented by general formula (XIV-2) is preferably relatively high. In the case where the liquid crystal composition is to be used in a liquid crystal display device having a high response speed, the content of the compound represented by general formula (XIV-2) is preferably relatively low.

The compound represented by general formula (XIV-2) is preferably a compound represented by general formula (XIV-2-1).

[Chem. 302]

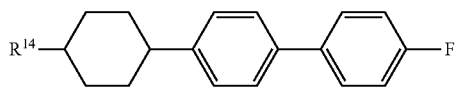
(XIV-2-1)

(In the formula, $R^{14}$ represents an alkyl group having 2 to 7 carbon atoms.)

The content of the compound represented by general formula (XIV-2-1) relative to the total amount of the liquid crystal composition of the present invention is preferably 1% by mass or more, more preferably 3% by mass or more, more preferably 5% by mass or more, and most preferably 7% by mass or more. The maximum content is preferably 15% by mass or less, more preferably 13% by mass or less, yet more preferably 11% by mass or less, and most preferably less than 9% by mass considering low-temperature solubility, transition temperature, electrical reliability, etc.

The compound represented by general formula (XIV-2-1) is specifically preferably any of compounds represented by formula (53.1) to formula (53.4), and, of these, a compound represented by formula (53.4) is preferably contained.

[Chem. 303]

(53.1)
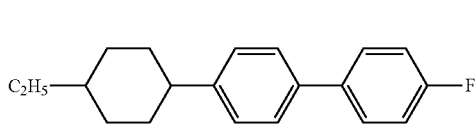

[Chem. 304]

(53.2)
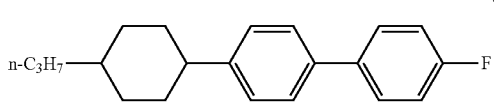

[Chem. 305]

(53.3)
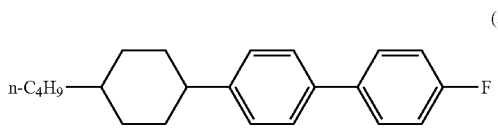

[Chem. 306]

(53.4)
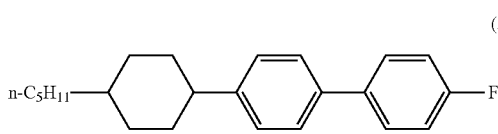

The compound represented by general formula (XIV-2) is preferably a compound represented by general formula (XIV-2-2).

[Chem. 307]

(XIV-2-2)
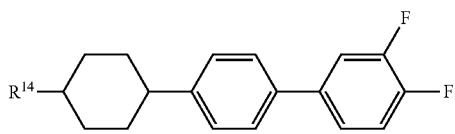

(In the formula, $R^{14}$ represents an alkyl group having 2 to 7 carbon atoms.)

The content of the compound represented by general formula (XIV-2-2) relative to the total amount of the liquid crystal composition of the present invention is preferably 3% by mass or more, more preferably 6% by mass or more, more preferably 9% by mass or more, and most preferably 12% by mass or more. The maximum content is preferably 20% by mass or less, more preferably 17% by mass or less, yet more preferably 15% by mass or less, and most preferably 14% by mass or less considering low-temperature solubility, transition temperature, electrical reliability, etc.

The compound represented by general formula (XIV-2-2) is specifically preferably any of compounds represented by formula (54.1) to formula (54.4), and, of these, a compound represented by formula (53.2) and/or a compound represented by formula (53.4) is preferably contained.

[Chem. 308]

(54.1)

[Chem. 309]

(54.2)

[Chem. 310]

(54.3)

[Chem. 311]

(54.4)

The compound represented by general formula (XIV-2) is preferably a compound represented by general formula (XIV-2-3).

[Chem. 312]

(XIV-2-3)
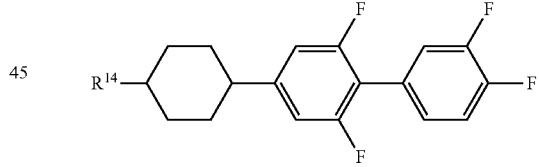

(In the formula, $R^{14}$ represents an alkyl group having 2 to 7 carbon atoms.)

The content of the compound represented by general formula (XIV-2-3) relative to the total amount of the liquid crystal composition of the present invention is preferably 5% by mass or more, more preferably 9% by mass or more, and most preferably 12% by mass or more. The maximum content is preferably 30% by mass or less, more preferably less than 27% by mass, yet more preferably 24% by mass or less, and most preferably less than 20% by mass considering low-temperature solubility, transition temperature, electrical reliability, etc.

The compound represented by general formula (XIV-2-3) is specifically preferably any of compounds represented by formula (55.1) to formula (55.4). Of these, a compound represented by formula (55.2) and/or a compound represented by formula (55.4) is preferably contained.

[Chem. 313]

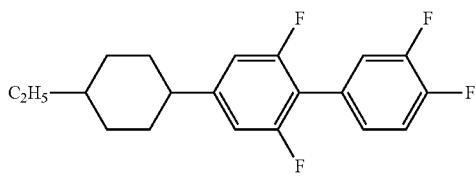
(55.1)

[Chem. 314]

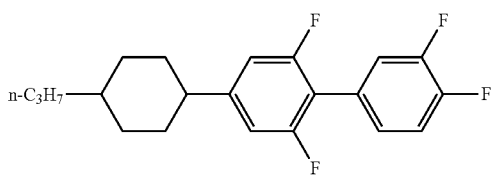
(55.2)

[Chem. 315]

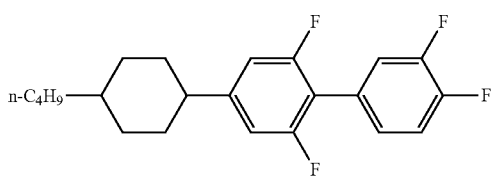
(55.3)

[Chem. 316]

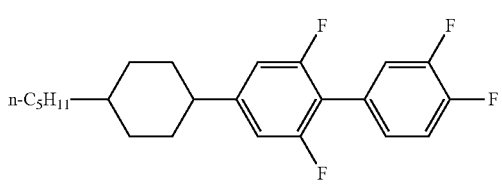
(55.4)

The compound represented by general formula (XIV-2) is preferably a compound represented by general formula (XIV-2-4).

[Chem. 317]

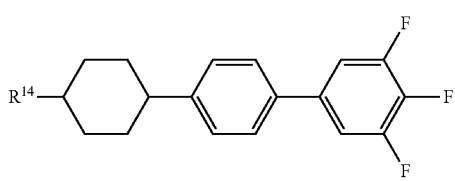
(XIV-2-4)

(In the formula, $R^{14}$ represents an alkyl group having 2 to 7 carbon atoms.)

The number of compounds that can be used in combination is not limited and a suitable combination is used for each embodiment considering low-temperature solubility, transition temperature, electrical reliability, birefringence, etc. For example, one compound is used in one embodiment of the present invention, two in another embodiment of the present invention, and three or more in another embodiment of the present invention.

The content of the compound represented by general formula (XIV-2-4) has an upper limit and a lower limit that are preferable for each embodiment considering such properties as low-temperature solubility, transition temperature, electrical reliability, and birefringence. The lower limit of the content relative to the total amount of the liquid crystal composition of the present invention is, for example, 2% in one embodiment of the present invention, 5% in another embodiment, 8% in another embodiment, 9% in another embodiment, 10% in another embodiment, 18% in another embodiment, 21% in another embodiment, 22% in another embodiment, and 24% in another embodiment.

The upper limit of the content is, for example, 35% in one embodiment of the present invention, 30% in another embodiment, 25% in another embodiment, 20% in another embodiment, 15% in another embodiment, and 10% in another embodiment.

In the case where the liquid crystal composition of the present invention is to be used in a liquid crystal display device with a low drive voltage, the content of the compound represented by general formula (XIV-2-4) is preferably relatively high. In the case where the liquid crystal composition is to be used in a liquid crystal display device having a high response speed, the content of the compound represented by general formula (XIV-2-4) is preferably relatively low.

The compound represented by general formula (XIV-2-4) is specifically preferably any of compounds represented by formula (56.1) to formula (56.4). Of these, compounds represented by formula (56.1), formula (56.2), and formula (56.4) are preferably contained.

[Chem. 318]

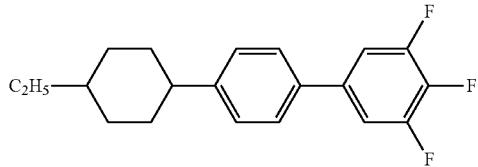
(56.1)

[Chem. 319]

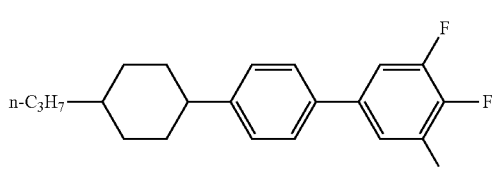
(56.2)

[Chem. 320]

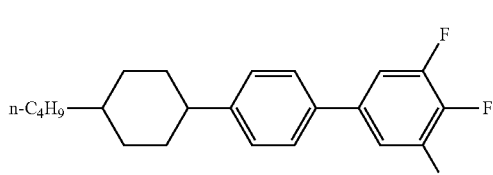
(56.3)

[Chem. 321]

(56.4)

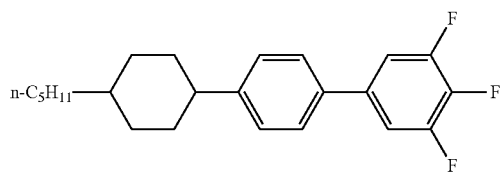

The compound represented by general formula (XIV-2) is preferably a compound represented by general formula (XIV-2-5).

[Chem. 322]

(XIV-2-5)

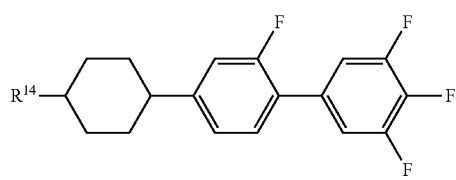

(In the formula, $R^{14}$ represents an alkyl group having 2 to 7 carbon atoms.)

The content of the compound represented by general formula (XIV-2-5) relative to the total amount of the liquid crystal composition of the present invention is preferably 5% by mass or more, more preferably 10% by mass or more, and most preferably 13% by mass or more. The maximum content is preferably 25% by mass or less, more preferably less than 22% by mass, yet more preferably 18% by mass or less, and most preferably less than 15% by mass considering low-temperature solubility, transition temperature, electrical reliability, etc.

The compound represented by general formula (XIV-2-5) is specifically preferably any of compounds represented by formula (57.1) to formula (57.4). Of these, a compound represented by formula (57.1) is preferably contained.

[Chem. 323]

(57.1)

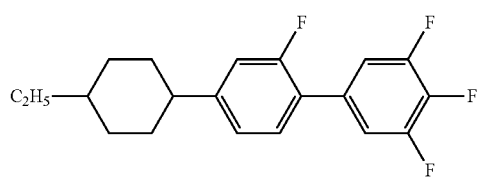

[Chem. 324]

(57.2)

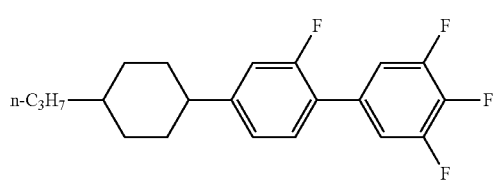

[Chem. 325]

(57.3)

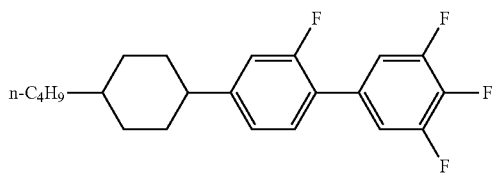

[Chem. 326]

(57.4)

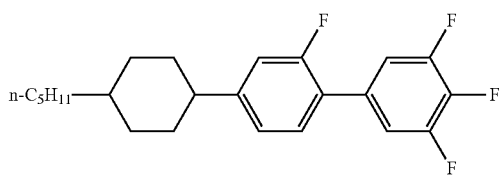

The compound represented by general formula (XIV-2) is a compound represented by general formula (XIV-2-6).

[Chem. 327]

(XIV-2-6)

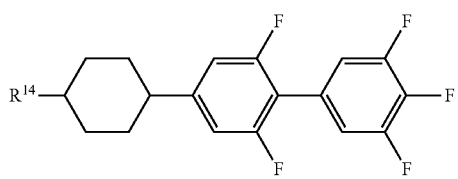

(In the formula, $R^{14}$ represents an alkyl group having 2 to 7 carbon atoms.)

The content of the compound represented by general formula (XIV-2-6) relative to the total amount of the liquid crystal composition of the present invention is preferably 5% by mass or more, more preferably 10% by mass or more, and most preferably 15% by mass or more. The maximum content is preferably 25% by mass or less, more preferably 22% by mass or less, yet more preferably 20% by mass or less, and most preferably less than 17% by mass considering low-temperature solubility, transition temperature, electrical reliability, etc.

The compound represented by general formula (XIV-2-6) is specifically preferably any of compounds represented by formula (58.1) to formula (58.4). Of these, a compound represented by formula (58.2) is preferably contained.

[Chem. 328]

(58.1)

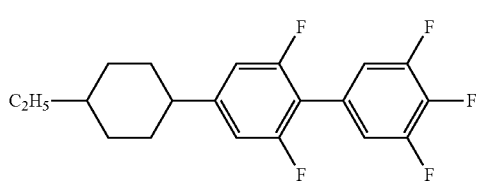

[Chem. 329]

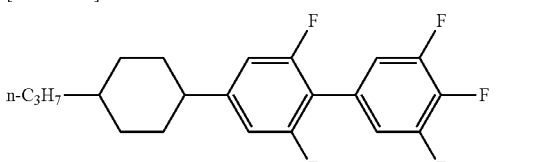

(58.2)

[Chem. 330]

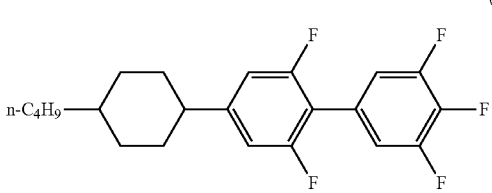

(58.3)

[Chem. 331]

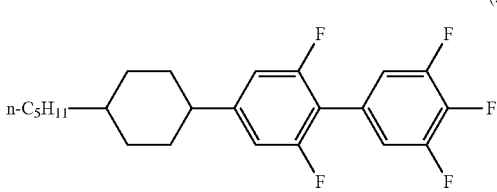

(58.4)

The lower limit of the total content of the compound represented by formula (26.2), the compound represented by formula (2.5), the compound represented by general formula (IV), the compound represented by general formula (L), and the compound represented by general formula (M) is preferably 70%, preferably 75%, preferably 80%, preferably 85%, preferably 87%, preferably 90%, preferably 92%, preferably 94%, preferably 96%, and preferably 98%. Preferably, substantially no compounds other than those described above are contained as non-polymerizable low-molecular-weight liquid crystal compounds. "Substantially no" means that those compounds that are unintentionally mixed as impurities that unavoidably occur during production process are excluded.

The liquid crystal composition of the invention of the subject application is preferably free of a compound that intramolecularly has a structure, such as a peroxide (—CO—OO—) structure, in which oxygen atoms are bonded to each other.

If reliability and long-term stability of the liquid crystal composition are important, the content of the carbonyl-group-containing compounds relative to the total mass of the composition is preferably 5% by mass or less, more preferably 3% by mass or less, yet more preferably 1% by mass or less, and most preferably substantially zero.

If stability under UV irradiation is important, the content of chlorine-substituted compounds relative to the total mass of the composition is preferably 15% by mass or less, more preferably 10% by mass or less, yet more preferably 5% by mass or less, and most preferably substantially zero.

The content of the compounds in which all ring structures in the molecule are six-membered rings is preferably high. The content of the compounds in which all ring structures in the molecule are six-membered rings is preferably 80% by mass or more, more preferably 90% by mass or more, and more preferably 95% by mass or more relative to the total mass of the composition. Most preferably, the liquid crystal composition is substantially composed of only compounds each in which all ring structures in the molecule are six-membered rings.

In order to suppress oxidation of the liquid crystal composition, the content of compounds having cyclohexenylene groups as ring structures is preferably low. The content of cyclohexenylene-group-containing compounds relative to the total mass of the composition is preferably 10% by mass or less, more preferably 5% by mass or less, and most preferably substantially zero.

If improving viscosity and Tni is important, the content of the compound that intramolecularly has a 2-methylbenzene-1,4-diyl group in which hydrogen atoms may be substituted with halogen is preferably decreased. The content of the compound intramolecularly having the 2-methylbenzene-1,4-diyl group relative to the total mass of the composition is preferably 10% by mass or less, more preferably 5% by mass or less, and most preferably substantially zero.

If a compound contained in the composition of the first embodiment of the present invention has an alkenyl group as a side chain and the alkenyl group is bonded to cyclohexane, the number of carbon atoms in the alkenyl group is preferably 2 to 5. If the alkenyl group is bonded to benzene, the number of carbon atoms in the alkenyl group is preferably 4 or 5. The unsaturated bond of the alkenyl group and benzene are preferably not directly bonded to each other.

The total content of formula (2.5) and formula (26.2) is preferably 25% to 50% and more preferably 30 to 40%.

The total content of formula (2.5), formula (26.2), and general formula (IV) is preferably 50% to 70% and more preferably 55 to 65%.

The total content of formula (2.5), formula (26.2), general formula (IV), and general formula (V-2) is preferably 55% to 75% and more preferably 60 to 70%.

The total content of formula (2.5), formula (26.2), general formula (IV), general formula (V-2), and general formula (IX) is preferably 60% to 80% and more preferably 65 to 75%.

The total content of formula (2.5), formula (26.2), general formula (IV), general formula (V-2), general formula (IX), and general formula (II-2) is preferably 75% to 90% and more preferably 80 to 85%.

The total content of formula (2.5), formula (26.2), general formula (IV), general formula (V-2), general formula (IX), general formula (II-2), and general formula (I-1-2) is preferably 90% to 100%, more preferably 95 to 100%, and most preferably 98 to 100%.

The liquid crystal composition of the present invention may contain a polymerizable compound in order to prepare a liquid crystal display device, such as a PS-mode, horizontal field-type PSA-mode, or horizontal field-type PSVA mode display device. Examples of the polymerizable compound that can be used include photopolymerizable monomers whose polymerization proceeds under an energy ray such as light. In terms of structure, examples of the polymerizable compound include those having a liquid crystal skeleton in which plural six-membered rings are linked to one another, such as biphenyl derivatives and terphenyl derivatives. More specifically, a difunctional monomer represented by general formula (XX) is preferred:

[Chem. 332]

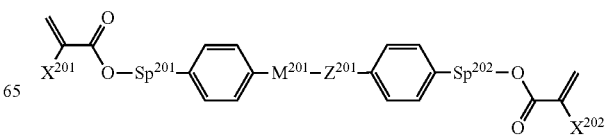

(XX)

(In the formula, $X^{201}$ and $X^{202}$ each independently represent a hydrogen atom or a methyl group, $Sp^{201}$ and $Sp^{202}$ each independently represent a single bond, an alkylene group having 1 to 8 carbon atoms, or —O—$(CH_2)_s$— (in the formula, s represents an integer of 2 to 7 and the oxygen atom is to bond to an aromatic ring), $Z^{201}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$—

(In the formula, $Y^1$ and $Y^2$ each independently represent a fluorine atom or a hydrogen atom), —C≡C—, or a single bond, and $M^{201}$ represents a 1,4-phenylene group, a trans-1,4-cyclohexylene group, or a single bond where all 1,4-phenylene groups in the formula may have any hydrogen atom substituted with a fluorine atom.)

A diacrylate derivative in which $X^{201}$ and $X^{202}$ each represent a hydrogen atom and a dimethacrylate derivative in which $X^{201}$ and $X^{202}$ each represent a methyl group are both preferable. A compound in which one of $X^{201}$ and $X^{202}$ represents a hydrogen atom and the other a methyl group is also preferable. As for the polymerization rate of these compounds, the diacrylate derivative is the fastest, the dimethacrylate derivative is the slowest, and the asymmetric compound is at the middle. One preferable for usage is used. The dimethacrylate derivative is particularly preferable for a PSA display device.

$Sp^{201}$ and $Sp^{202}$ each independently represent a single bond, an alkylene group having 1 to 8 carbon atoms, or —O—$(CH_2)_s$—. For a PSA display device, at least one of them is preferably a single bond. A compound in which $Sp^{201}$ and $Sp^{202}$ each represent a single bond or a compound in which one of $Sp^{201}$ and $Sp^{202}$ represents a single bond and the other an alkylene group having 1 to 8 carbon atoms or —O—$(CH_2)_s$— are preferred. In such a case, an alkyl group preferably has 1 to 4 carbon atoms and s is preferably 1 to 4.

$Z^{201}$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, and most preferably a single bond.

$M^{201}$ represents a 1,4-phenylene group in which any hydrogen atom may be substituted with a fluorine atom, a trans-1,4-cyclohexylene group, or a single bond. $M^{201}$ preferably represents a 1,4-phenylene group or a single bond. If C represents a ring structure and not a single bond, $Z^{201}$ may represent a bonding group other than a single bond. If $M^{201}$ represents a single bond, $Z^{201}$ preferably represents a single bond.

Due to these points, the ring structure between $Sp^{201}$ and $Sp^{202}$ in general formula (XX) is specifically preferably any of structures below.

In general formula (XX), when $M^{201}$ represents a single bond and the ring structure is constituted by two rings, the ring structure is preferably represented by formula (XXa-1) to formula (XXa-5), more preferably represented by formula (XXa-1) to formula (XXa-3), and most preferably represented by formula (XXa-1).

[Chem. 333]

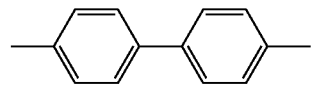

(XXa-1)

[Chem. 334]

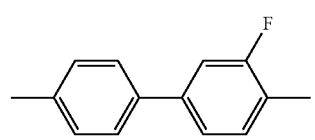

(XXa-2)

[Chem. 335]

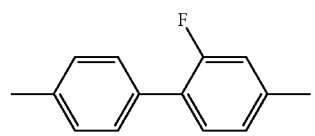

(XXa-3)

[Chem. 336]

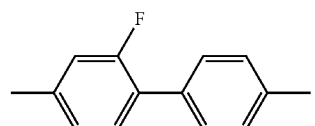

(XXa-4)

[Chem. 337]

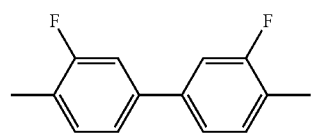

(XXa-5)

(In the formula, each end is to bond with $Sp^{201}$ or $Sp^{202}$.)

Polymerizable compounds that contain these skeletons exhibit anchoring force optimum for PSA-type liquid crystal display devices once polymerized. Since a good alignment state is obtained, display nonuniformity is suppressed or prevented.

In sum, polymerizable monomers represented by general formula (XX-1) to general formula (XX-4) are particularly preferable. Of these, a polymerizable monomer represented by general formula (XX-2) is most preferable.

[Chem. 338]

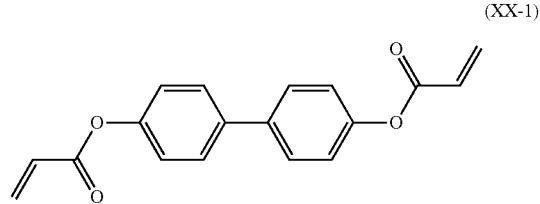

(XX-1)

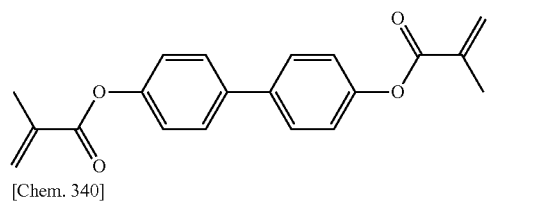

(XX-2)

[Chem. 340]

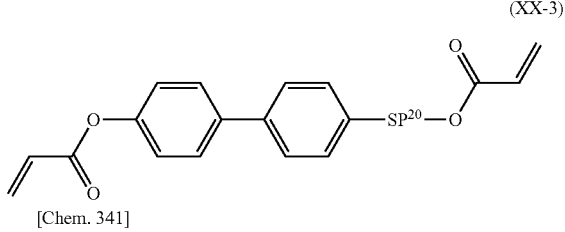

(XX-3)

[Chem. 341]

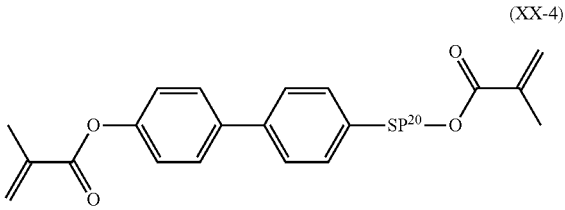

(XX-4)

(In the formula, $Sp^2$ represents an alkylene group having 2 to 5 carbon atoms.)

In the case where monomers are added to a liquid crystal composition of the present invention, polymerization proceeds without using a polymerization initiator; however, a polymerization initiator may be contained to promote polymerization. Examples of the polymerization initiator include benzoin ethers, benzophenones, acetophenones, benzyl ketals, and acylphosphine oxides.

The liquid crystal composition of the present invention may further contain a compound represented by general formula (Q).

[Chem. 342]

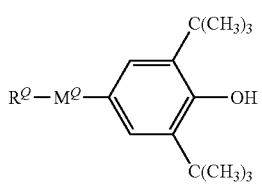

(Q)

(In the formula, $R^Q$ represents a linear or branched alkyl group having 1 to 22 carbon atoms where one or more $CH_2$ groups in the alkyl group may each be substituted with —O—, —CH=CH—, —CO—, —OCO—, —COO—, —C≡C—, —CF$_2$O—, or —OCF$_2$— so long as oxygen atoms are not directly adjacent to each other, and $M^Q$ represents a trans-1,4-cyclohexylene group, a 1,4-phenylene group, or a single bond.)

$R^Q$ represents a linear or branched alkyl group having 1 to 22 carbon atoms where one or more $CH_2$ groups in the alkyl group may each be substituted with —O—, —CH=CH—, —CO—, —OCO—, —COO—, —C≡C—, —CF$_2$O—, or —OCF$_2$— so long as oxygen atoms are not directly adjacent to each other. Preferably, $R^Q$ represents C1-C10 linear alkyl group, linear alkoxy group, linear alkyl group with one $CH_2$ group substituted with —OCO— or —COO—, branched alkyl group, branched alkoxy group, or branched alkyl group with one $CH_2$ group substituted with —OCO— or —COO—. More preferably, $R^Q$ represents C1-C20 linear alkyl group, linear alkyl group with one $CH_2$ group substituted with —OCO— or —COO—, branched alkyl group, branched alkoxy group, or branched alkyl group having one $CH_2$ group substituted with —OCO— or —COO—. $M^Q$ represents a trans-1,4-cyclohexylene group, a 1,4-phenylene group, or a single bond but preferably represents a trans-1,4-cyclohexylene group or a 1,4-phenylene group.

The compound represented by general formula (Q) is specifically preferably any of compounds represented by general formula (Q-a) general formula (Q-d) below:

[Chem. 343]

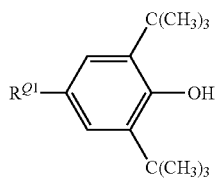

(Q-a)

[Chem. 344]

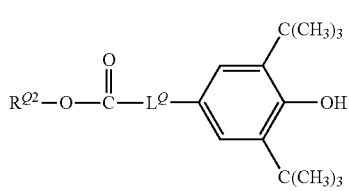

(Q-b)

[Chem. 345]

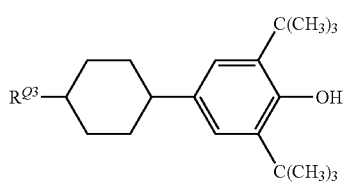

(Q-c)

[Chem. 346]

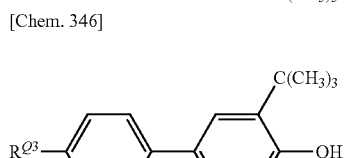

(Q-d)

In the formula, $R^{Q1}$ preferably represents a linear or branched alkyl group having 1 to 10 carbon atoms, $R^{Q2}$ preferably represents a linear or branched alkyl group having 1 to 20 carbon atoms, and $R^{Q3}$ preferably represents a linear alkyl, branched alkyl, linear alkoxy, or branched alkoxy group having 1 to 8 carbon atoms. $L^Q$ preferably represents a linear or branched alkylene group having 1 to 8 carbon atoms. Of the compounds represented by general formula (Q-a) to general formula (Q-d), compounds represented by general formula (Q-c) and general formula (Q-d) are more preferable.

The liquid crystal composition of the invention of the subject application preferably contains one or two, and more preferably one to five compounds represented by general formula (Q). The content thereof is preferably 0.001 to 1% by mass, more preferably 0.001 to 0.1% by mass, and most preferably 0.001 to 0.05% by mass.

The liquid crystal composition of the present invention containing polymerizable compounds gains a liquid crystal aligning ability when the polymerizable compounds are polymerized by ultraviolet irradiation and is used in a liquid crystal display device in which the amount of transmitted light is controlled by utilizing birefringence of the liquid crystal composition. The liquid crystal composition is useful for liquid crystal display devices such as AM-LCD (active matrix liquid crystal display device), TN (nematic liquid crystal display device), STN-LCD (super twisted nematic liquid crystal display device), OCB-LCD, and IPS-LCD (in-plane switching liquid crystal display device), and is particularly useful for AM-LCD. The liquid crystal composition can be used in transmissive or reflective liquid crystal display devices.

The two substrates of a liquid crystal cell used in a liquid crystal display device can be composed of a flexible transparent material such as glass or plastic and one of them can be composed of an opaque material such as silicon. A transparent substrate having a transparent electrode layer can be obtained by, for example, sputter-depositing indium tin oxide (ITO) on a transparent substrate such as a glass plate.

A color filter can be manufactured by, for example, a pigment dispersion method, a printing method, an electrodeposition method, or a dyeing method. Preparation of a color filter by a pigment dispersion method is described here as an example. A curable color composition for a color filter is applied to the transparent substrate, patterning is performed, and the composition is cured by heating or irradiation with light. This process is performed for each of three colors, red, green and blue, and pixel portions of a color filter are formed as a result. Pixel electrodes including active elements such as TFTs, thin film diodes, and metal-insulator-metal resistive elements may be installed on the substrate.

The substrates are arranged to oppose each other with the transparent electrode layer facing inward. During this process, the gap between the substrates may be adjusted by using spacers. In such a case, the gap is preferably adjusted so that the thickness of alight adjusting layer to be obtained is 1 to 100 µm and more preferably 1.5 to 10 µm. In the case where a polarizer is used, the product of the cell thickness d and the refractive index anisotropy Δn of the liquid crystal is preferably adjusted to maximize contrast. In the case where two polarizers are used, the polarization axis of each polarizer can be adjusted to improve viewing angle and contrast. A retardation film for expanding the viewing angle can also be used. Examples of the spacers include glass particles, plastic particles, alumina particles, and columnar spacers composed of photoresist materials and the like. Then a sealing material such as an epoxy-based thermosetting composition is screen-printed onto the substrate while securing a liquid crystal injection port, the substrates are bonded to each other, and heating is performed to thermally cure the sealing material.

For example, a common vacuum injection method or ODF method can be used to place a polymerizable-compound-containing liquid crystal composition in a gap between the two substrates. However, the vacuum injection method has a problem in that, although drop marks do not occur, trace of injection remains. The invention of the subject application is more suitable for use in making a display device by an ODF method. In a liquid crystal display device manufacturing process by an ODF method, a sealing material such as an epoxy-based photothermal dual curing sealing material is applied to one of a backplane substrate or a frontplane substrate by using a dispenser so as to form a closed-loop bank, a particular amount of the liquid crystal composition is placed dropwise in the space defined by the bank while performing evacuation, and the frontplane and the backplane are bonded to each other to manufacture a liquid crystal display device. The liquid crystal composition of the present invention is favorable since dropping of the liquid crystal composition during the ODF step can be performed stably.

In order to a satisfactorily align the liquid crystal, an appropriate polymerization speed is desirable. Thus, the method for polymerizing the polymerizable compounds is preferably involves irradiating the liquid crystal composition with an active energy ray such as an ultraviolet ray or an electron beam or with two or more active energy rays either simultaneously or sequentially. In the case where ultraviolet rays are used, a polarized light source may be used or unpolarized light source may be used. In the case where polymerization is performed while holding the polymerizable-compound-containing liquid crystal composition between the two substrates, at least the substrate on the incident side must have an appropriate degree of transparency for the active energy ray used. Moreover, after only a particular portion is polymerized by using a mask during irradiation, the alignment state of the unpolymerized portion may be changed by changing the conditions such as electric field, magnetic field, or temperature and then an active energy ray may be applied again to perform polymerization. In particular, when the liquid crystal composition is exposed with an UV ray, UV exposure is preferably performed while applying an AC electric field to the polymerizable-compound-containing liquid crystal composition. The AC electric field applied is preferably an AC having a frequency of 10 Hz to 10 kHz and more preferably an AC having a frequency of 60 Hz to 10 kHz, and the voltage is selected depending on the desired pretilt angle of the liquid crystal display device. In other words, the pretilt angle of the liquid crystal display device can be controlled by the applied voltage. For a horizontal electric field-type MVA-mode liquid crystal display device, the pretilt angle is preferably controlled to 80° to 89.9° from the viewpoints of alignment stability and contrast.

The temperature during irradiation is preferably within a temperature range in which the liquid crystal composition of the present invention retains a liquid crystal state. Polymerization is preferably conducted at a temperature near room temperature, that is, typically a temperature in a range of 15 to 35° C. The lamp that generates UV rays may be a metal halide lamp, a high-pressure mercury lamp, an ultra-high-pressure mercury lamp, or the like. The wavelength of the UV ray applied is preferably in the wavelength region outside the absorption wavelength region of the liquid crystal composition and, if needed, some portions of the UV rays may be cut. The intensity of the ultraviolet ray applied is preferably 0.1 mW/cm$^2$ to 100 W/cm$^2$ and more preferably 2 mW/cm$^2$ to 50 W/cm$^2$. The amount of energy of the ultraviolet ray applied can be appropriately adjusted but is preferably 10 mJ/cm$^2$ to 500 J/cm$^2$ and more preferably 100 mJ/cm$^2$ to 200 J/cm$^2$. The intensity may be varied during irradiation with UV rays. The amount of time for which the UV ray is applied is appropriately selected depending on the intensity of the UV ray applied but is preferably 10 to 3600 seconds and more preferably 10 to 600 seconds.

A liquid crystal display device that uses the liquid crystal composition of the present invention is useful since it exhibits high-speed response and suppresses display failures and is particularly useful in active matrix-driving liquid crystal display devices and liquid crystal display devices of VA mode, PSVA mode, PSA mode, IPS mode, and ECB mode.

Preferred embodiments of a liquid crystal display according to the present invention will now be described in detail with reference to the drawings.

FIG. 1 is a cross-sectional view of a liquid crystal display device that includes two substrates opposing each other, a sealing material disposed between the substrates, and a liquid crystal sealed inside the sealed region surrounded by the sealing material.

Specifically, the drawing shows a specific embodiment of a liquid crystal display device that includes a backplane constituted by a TFT layer 102 and a pixel electrode 103 disposed on a substrate a 100 and a passivation film 104 and an alignment film a 105 disposed on the TFT layer 102 and the pixel electrode 103; a frontplane constituted by a black matrix 202, color filters 203, a planarizing film (overcoat layer) 201, and a transparent electrode 204 disposed on a substrate b 200, and an alignment film b 205 disposed on the transparent electrode 204, the frontplane opposing the backplane; a sealing material 301 disposed between the substrates; and a liquid crystal layer 303 sealed inside a sealed region surrounded by the sealing material. Projections 304 are disposed on the substrate surface in contact with the sealing material 301.

The substrate a and the substrate b may be composed of any material that is substantially transparent and glass, ceramics, plastics, etc., can be used. For a plastic substrate, cellulose, cellulose derivatives such as triacetyl cellulose and diacetyl cellulose, polycycloolefin derivatives, polyesters such as polyethylene terephthalate and polyethylene naphthalate, polyolefins such as polypropylene and polyethylene, polycarbonate, polyvinyl alcohols, polyvinyl chloride, polyvinylidene chloride, polyamide, polyimide, polyimide amide, polystyrene, polyacrylate, polymethyl methacrylate, polyether sulfone, polyarylate, and inorganic-organic composite materials such as glass fiber-epoxy resin and glass fiber-acryl resin can be used.

In the case where a plastic substrate is used, a barrier film is preferably provided. The function of the barrier film is to decrease the moisture permeability of the plastic substrate and improve reliability of the electric properties of the liquid crystal display device. The barrier film is not particularly limited as long as the film has high transparency and low water vapor permeability. Typically, a thin film formed by using an inorganic material such as silicon oxide through vapor deposition, sputtering, or chemical vapor deposition (CVD) is used.

In the present invention, the same material or different materials may be used in the substrate a and the substrate b. Glass substrates are preferable since a liquid crystal display device having good heat resistance and dimensional stability can be fabricated. Plastic substrates are also preferable since they are suitable for a roll-to-roll production method, lightweight, and flexible. If flatness and heat resistance are desirable, a plastic substrate and a glass substrate are preferably used in combination since preferable results can be yielded.

In Examples described below, substrates are used as the materials for the substrate a 100 and the substrate b 200.

In the backplane, the TFT layer 102 and the pixel electrode 103 are disposed on the substrate a 100. The TFT layer 102 and the pixel electrode 103 are produced in a typical array process. The passivation film 104 and the alignment film a 105 are formed thereon and a backplane is obtained as a result.

The passivation film 104 (also referred to as an inorganic protective film) is a film for protecting the TFT layer and is typically formed as a nitride film (SiNx), an oxide film (SiOx), or the like by chemical vapor deposition (CVD) technique.

The alignment film a 105 has a function of aligning the liquid crystal and a polymer material such as polyimide is typically frequently used. An alignment agent solution composed of a polymer material and a solvent is used as the coating solution. The alignment film has a possibility of inhibiting adhesive force to the sealing material and is thus patterned and applied in the sealed region. A printing method such as flexo printing or a droplet ejection method such as ink jet is employed for application. After the solvent has evaporated by precuring, the applied alignment agent solution is crosslinked and cured by baking. Subsequently, an aligning process is performed to yield an aligning function.

The aligning process is usually performed by a rubbing technique. The polymer film formed as mentioned above is rubbed in one direction with a rubbing cloth composed of fibers such as rayon so as to yield a liquid crystal aligning ability.

Alternatively, an optical alignment technique is sometimes employed. The optical alignment technique is a technique of generating the aligning property by irradiation of an alignment film containing a photosensitive organic material with polarized light. According to this technique, scratching of the substrate and generation of dust that occur in the rubbing technique do not occur. Examples of the organic material used in the optical alignment technique include materials that contain dichroic dyes. Examples of the dichroic dyes that can be used include those which have groups (hereinafter simply referred to as optical alignment groups) that induce an optical reaction from which the liquid crystal alignment property originates, such as induction of molecular alignment or isomerization reaction (ex. azobenzene group) caused by Weigert's effect caused by dichroism, dimerization reaction (ex. cinnamoyl group), optical cross-linking reaction (ex. benzophenone group), or optical decomposition reaction (ex. polyimide group). The applied aligning agent solution is precured to evaporate the solvent and then irradiated with light (polarized light) having a desired polarization so as to obtain an alignment film having an aligning property in the desired direction.

The frontplane is constituted by the black matrix 202, the color filter 203, the planarizing film 201, the transparent electrode 204, and the alignment film b 205 disposed on the substrate b 200.

The black matrix 202 is, for example, fabricated by a pigment dispersion method. In particular, a color resin solution containing an evenly dispersed black colorant for forming a black matrix is applied to the substrate b 200 having the barrier film 201 formed thereon so as to form a coloring layer. The coloring layer is then cured by baking. A photoresist is applied to the coloring layer and prebaked. The photoresist is exposed through a mask pattern and developed to perform patterning on the coloring layer. Then the photoresist layer is removed and the coloring layer is baked to form a black matrix 202.

Alternatively, a photoresist-type pigment dispersion may be used. In such a case, a photoresist-type pigment dispersion is applied, prebaked, exposed through a mask pattern, and developed to conduct patterning on the coloring layer. Then the photoresist layer is removed and the coloring layer is baked to form a black matrix 202.

The color filter 203 is prepared by a pigment dispersion method, an electrodeposition method, a printing method, or a dyeing method. For example, according to a pigment dispersion method, a color resin solution in which a pigment (for example, a red pigment) is evenly dispersed is applied to the substrate b 200 and cured by baking. Then a photoresist is applied thereto and prebaked. The photoresist is exposed through a mask pattern and then developed to perform patterning. The photoresist layer is then removed and baking is performed again. As a result, a (red) color filter 203 is obtained. The order of color in which the filters are made is not particularly limited. A green color filter 203 and a blue color filter 203 are made in the same manner.

The transparent electrode 204 is formed on the color filter 203 (if needed, an overcoat layer (201) for planarizing the surface is formed on the color filter 203). The transmittance of the transparent electrode 204 is preferably high and the electrical resistance of the transparent electrode 204 is preferably low. The transparent electrode 204 is formed by sputter-deposition or the like of an oxide film such as ITO.

A passivation film is formed on the transparent electrode 204 to protect the transparent electrode 204 in some cases.

The alignment film b 205 is the same as the alignment film a 105.

While specific embodiments of the backplane and the frontplane used in the present invention are described above, the subject application is not limited to these specific embodiments and these embodiments may be freely altered depending on the desired liquid crystal display device.

The shape of the columnar spacers is not particularly limited and its horizontal cross section may have a variety of shapes such as circular, rectangular, and polygonal shapes. Considering the misalignment margin during the process, the horizontal cross section is particularly preferably circular or regular polygonal in shape. The shape of the projections is preferably a truncated cone or truncated pyramid.

The material of the columnar spacers is not particularly limited as long as it is a material that does not dissolve in the sealing material, the organic solvent used in the sealing material, or the liquid crystals. From the viewpoints of processing and weight reduction, a synthetic resin (curable resin) is preferable. The projections can be formed by a photolithographic method or a droplet ejection method on the surface of the first substrate that comes into contact with the sealing material. Due to these reasons, it is preferable to use a photocurable resin suitable for photolithography or a droplet ejection method.

The case in which the columnar spacers are obtained by a photolithographic method is described below as an example.

A resin solution for forming columnar spacers (not containing colorants) is applied to the transparent electrode 204 of the frontplane. Then this resin layer is cured by baking. A photoresist is applied thereto and prebaked. After exposing the photoresist through a mask pattern, development is conducted to conduct patterning of the resin layer. The photoresist layer is then removed and the resin layer is baked so as to complete formation of the columnar spacers.

The positions of forming the columnar spacers can be determined as desired by using a mask pattern. Accordingly, the columnar spacers can be formed inside the sealed region and outside the sealed region (portion where the sealing material is applied) of the liquid crystal display device simultaneously. The columnar spacers are preferably formed to be positioned on the black matrix so as not to degrade quality of the sealed region. The columnar spacers fabricated by a photolithographic method as such are sometimes called column spacers or photo spacers.

A mixture containing a triazole-based initiator, an acrylic acid copolymer, a polyfunctional acryl-based monomer or a negative-type water-soluble resin such as PVA-stilbazo photosensitive resin, etc., is used as the material for the spacers. Alternatively, a method that uses a color resin in which a colorant is dispersed in a polyimide resin is available. In the present invention, the spacers can be obtained without any limitation by using a known material in accordance with the compatibility with the liquid crystals and the sealing material used.

After the columnar spacers are formed as such on the surface of the frontplane where a sealed region is to be formed, a sealing material (301 in FIG. 1) is applied to the surface that will make contact with the sealing material of the backplane.

The material for the sealing material is not particularly limited, and a curable resin composition containing a polymerization initiator and an epoxy-based or acryl-based photocurable, thermally curable, or photothermal dual curing resin is used. In order to control the moisture permeability, elastic modulus, viscosity, and the like, a filler composed of an inorganic material or an organic material is sometimes added. The shape of the filler is not particularly limited and may be spherical, fibrous, or irregular. A spherical gap material that has a monodisperse diameter or a fibrous gap material may be mixed in order to a satisfactorily control the cell gap or a fibrous substance that easily becomes entangled with the projections on the substrate can be added in order to further increase the adhesive force to the substrate. The diameter of the fibrous substance used here is preferably about $1/5$ to $1/10$ of the cell gap or less. The length of the fibrous substance is preferably smaller than the width of the applied seal.

The material of the fibrous substance is not particularly limited as long as a particular shape can be obtained. A synthetic fiber such as cellulose, polyamide, or polyester, or an inorganic material such as glass or carbon can be appropriately selected.

A printing method and a dispensing method are available as the method for applying the sealing material. A dispensing method that uses less sealing material is preferable. The positions where the sealing material is applied are usually on a black matrix in order not to adversely affect the sealed region. In order to form a liquid crystal dropping region in the next step (in order to prevent leakage of the liquid crystals), the shape of the applied sealing material is to be a closed loop shape.

Liquid crystals are dropped in the closed loop (sealed region) of the frontplane to which the sealing material has been applied. Typically, a dispenser is used. The amount of liquid crystals to be dropped is basically equal to the volume obtained by multiplying the area of the applied seal and the height of the columnar spacer in order for the amount of the liquid crystals dropped to be equal to the cell volume. However, to deal with liquid crystal leakage that occurs in the cell bonding step and optimize the display properties, the amount of the liquid crystals to be dropped may be appropriately adjusted or the positions where the liquid crystals are to be dropped may be scattered.

Next, the frontplane onto which the sealing material has been applied and the liquid crystals have been dropped is bonded to the backplane. In particular, the frontplane and the backplane are adsorbed to stages having a substrate adsorbing mechanism such as an electrostatic chuck and are arranged in such a manner that the alignment film b of the frontplane and the alignment film a of the backplane face each other and in such a position (distance) that the sealing material does not contact the other substrate. Under such conditions, the interior of the system is evacuated. Upon completion of evacuation, the positions of the two substrates are adjusted (alignment operation) while monitoring the position where the frontplane and the backplane are to be bonded to each other. After adjustment of the bonding position is finished, the substrates are brought to be close to each other up to a position where the sealing material on the frontplane contacts the backplane. Under these conditions, the interior of the system is filled with inert gas and the pressure is slowly returned to normal while releasing the evacuation. Due to this process, the frontplane and the backplane become bonded to each other due to atmospheric pressure, and a cell gap is formed at a height position of the columnar spacers. Under these conditions, the sealing material is irradiated with an ultraviolet ray to be cured and form a liquid crystal cell. Subsequently, a heating step is performed in some cases so as to accelerate curing of the sealing material. A heating step is frequently added so as to increase the adhesive force of the sealing material and improve the reliability of electrical properties.

EXAMPLES

The present invention will now be described in further detail by using Examples below which do not limit the scope of the present invention. In the compositions of Examples and Comparative Examples below, "%" means "% by mass".

The properties that were measured in examples are as follows.
Phase transition point (Tni): nematic phase-isotropic liquid phase transition temperature (° C.)
Birefringence (Δn): refractive index anisotropy at 295 K
Dielectric anisotropy (Δ∈): dielectric anisotropy at 295 K
Viscosity (η): viscosity (mPa·s) at 295 K
Rotational viscosity (γ1): rotational viscosity (mPa·s) at 295 K
Voltage holding ratio (VHR): voltage holding ratio (%) at a frequency of 60 Hz, and application voltage of 4 V at 323 K
Conditions of heat resistance (VHR): retained in a 400 K thermostat oven for 0.5 hour
Ghosting:
Evaluation of ghosting in liquid crystal display devices was conducted as follows: After a particular fixed pattern had been displayed in a display area for 2160 hours, uniform images were displayed in all parts of the screen and the extent of the afterimage of the fixed pattern was visually evaluated on the four-grade evaluation scale below:
AA: No after image
A: Faint afterimage was observed but the extent of the afterimage was acceptable.
B: Afterimage was observed and the extent of the afterimage was unacceptable.
C: Extensive afterimage was observed.
Volatility/Production Facility Contamination Property:
Evaluation of volatility of the liquid crystal material was performed by visually confirming foaming of the liquid crystal material while monitoring the operation state of a vacuum stirring defoaming mixer with a stroboscope. More specifically, 0.8 kg of a liquid crystal composition was placed in a 2.0 L special container of a vacuum stirring and defoaming mixer and the vacuum stirring defoaming mixer was driven at a revolution velocity of 15 $S^{-1}$ and a rotating velocity of 7.5 $S^{-1}$ under evacuation of 4 kPa. The time taken until foaming started was measured and evaluated on the following four-grade scale:

AA: It took 2 minutes or longer until foaming. Contamination of facility caused by evaporation is unlikely.
A: It took 1 minute or longer but shorter than 2 minutes until foaming. There is a small risk of minor contamination of facility caused by evaporation.
B: It took 30 seconds or longer but shorter than 1 minute until foaming. Contamination of facility by evaporation will occur.
C: It took shorter than 30 seconds until foaming. There is a serious risk of contamination of facility caused by evaporation.
Process Compatibility:
Process compatibility was evaluated through an ODF process as follows. By using a constant-volume pump, 50 pL of liquid crystals was dropped at a time and this operation was performed 100000 times. The change in amount of liquid crystals dropped in every 200 operations (a total in 0 to 200th dropping operations, 201st to 400th dropping operations, 401st to 600th dropping operations, . . . , and 99801st to 100000th dropping operations) was evaluated on the following four-grade scale:
AA: Changes were very little (Liquid crystal display devices can be stably produced)
A: Changes were little and at an acceptable level
B: Changes were at an unacceptable level (Yield decreased due to occurrence of nonuniformity)
C: Significant changes occurred (Leakage of liquid crystals and vacuum bubbles occurred)
Low-Temperature Solubility
Evaluation of low-temperature solubility was conducted as follows. After preparation of a liquid crystal composition, 0.5 g of the liquid crystal composition was weighed and placed in a 1 mL sample jar and exposed to continuous temperature change cycles each consisting of "−20° C. (held for 1 hour)→heating (0.2° C./minute)→0° C. (held for 1 hour)→heating (0.2° C./minute)→20° C. (held for 1 hour)→cooling (−0.2° C./minute)→0° C. (held for 1 hour)→cooling (−0.2° C./minute)→−20° C." in a temperature-controlled testing chamber. Generation of precipitates from the liquid crystal composition was observed visually and the solubility was evaluated based on the following four-grade scale.
AA: No precipitates were observed for 720 hours or longer.
A: No precipitates were observed for 336 hours or longer.
B: Precipitates were observed within 168 hours.
C: Precipitates were observed within 48 hours.
In examples, following abbreviations are used to denote compounds:
(Ring Structure)

[Chem. 347]

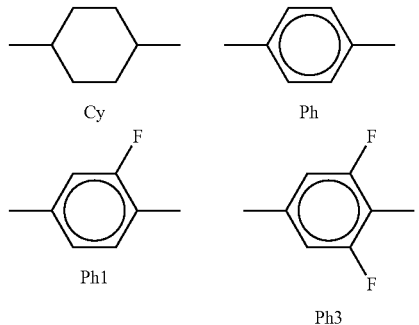

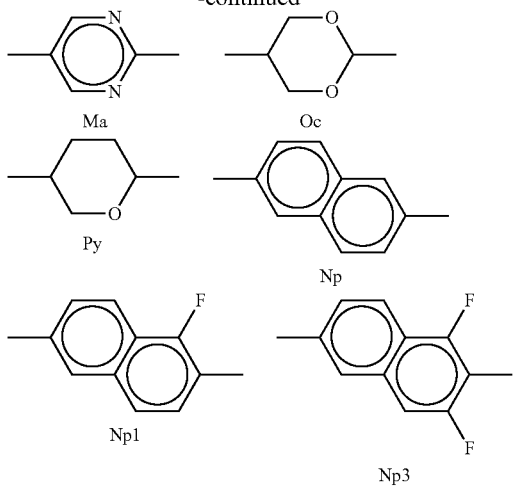

(Side Chain Structure and Bonding Structure)

TABLE 1

| n (numeral) at terminus | $C_nH_{2n+1}$— |
|---|---|
| -ndOFF | —$(CH_2)_{n-1}$—HC=CFF |
| -2- | —$CH_2CH_2$— |
| —1O— | —$CH_2O$— |
| —O1— | —$OCH_2$— |
| —V— | —CO— |
| —VO— | —COO— |
| —CFFO— | —$CF_2O$— |
| —F | —F |
| —Cl | —Cl |
| —OCFFF | —$OCF_3$ |
| —CFFF | —$CF_3$ |
| —On | —$OC_nH_{2n+1}$ |
| ndm- | $C_nH_{2n+1}$—HC=CH—$(CH_2)_{m-1}$— |
| -ndm | —$(CH_2)_{n-1}$—HC=CH—$(CH_2)_{m-1}$O— |
| —Ondm | —O—$(CH_2)_{n-1}$—HC=CH—$C_mH_{2m+1}$ |
| -ndm- | —$(CH_2)_{n-1}$—HC=CH—$(CH_2)_{m-1}$— |
| —CN | —C≡N |
| -T- | —C≡C— |

Examples 1 to 3 and Comparative Example 1

TABLE 2

| | Content (%) | | | |
|---|---|---|---|---|
| Chemical structure | Comparative Example 1 | Example 1 | Example 2 | Example 3 |
| 3-Cy-Cy-CFFO—Ph3—F | 17 | 11 | 11 | 11 |
| 3-Ph—Ph3—CFFO—Ph3—F | 13 | 13 | 13 | 13 |
| 3-Cy-Cy-1d0FF | 25 | 25 | 25 | 25 |
| 3-Cy-Ph—Ph3—F | 14 | 12 | 12 | 12 |
| 2-Cy-Cy-VO—Ph3—F | 3 | 4 | 3 | 3 |
| 3-Cy-Cy-VO—Ph3—F | 3 | 4 | 3 | 3 |
| 4-Cy-Cy-VO—Ph3—F | 3 | 3 | 3 | 3 |
| 5-Cy-Cy-VO—Ph3—F | 3 | 3 | 3 | 3 |
| 2-Cy-Cy-Ph—Ph3—F | 3 | 2 | 3 | 3 |
| 3-Cy-Ph—Ph3—F | 2 | 2 | 2 | 2 |
| 5-Cy-Ph—Ph1—Ph-2 | 4 | 2 | 2 | 2 |
| 5-Cy-Ph—Ph1—Ph-3 | 3 | 2 | 3 | 3 |
| 2-Cy-Ph1-Cy-Cy-5 | 2 | 2 | 2 | 2 |
| 3-Cy-Ph1-Cy-Cy-5 | 3 | 3 | 3 | 3 |
| 3-Cy-Cy-Ph1-Cy-2 | 2 | 2 | 2 | 2 |
| 2-Ph—Ph1—Ph-5 | | 10 | 5 | 5 |
| 2-Ph—Ph1—Ph-3 | | | 5 | |
| 0d3-Ph—Ph1—Ph-2 | | | | 5 |
| $T_{NI}$/° C. | 96.5 | 90.9 | 93.0 | 95.7 |
| Δn | 0.101 | 0.109 | 0.110 | 0.114 |
| Δε | 7.90 | 6.75 | 6.72 | 6.63 |
| η/mPa · s | 18.9 | 19.8 | 19.5 | 21.2 |
| γ₁/mPa · s | 104 | 104 | 109 | 109 |
| Initial voltage holding ratio (%) | 99.5 | 99.4 | 99.4 | 99.5 |
| Voltage holding ratio (%) after heat resistance test | 98.8 | 98.8 | 98.9 | 98.2 |
| Ghosting evaluation | B | AA | AA | A |
| Drop mark evaluation | AA | AA | A | A |
| Production facility contamination evaluation | AA | AA | AA | AA |
| Process compatibility evaluation | B | AA | AA | AA |
| Low-temperature solubility evaluation | B | A | AA | AA |

Examples 4 to 8 and Comparative Examples 2 to 5

TABLE 3

| | Content (%) | | | | |
|---|---|---|---|---|---|
| Chemical structure | Example 4 | Example 5 | Example 6 | Example 7 | Example 8 |
| 3-Ph—Ph3—CFFO—Ph3—F | 12 | 11 | 13 | 14 | 19 |
| 3-Cy-Cy-CFFO—Ph3—F | 1 | 1 | | | |
| 4-Ph—Ph3—CFFO—Ph3—F | | | | | |
| 3-Cy-Cy-1d0 | 17 | 15 | 15 | 10 | 10 |
| 3-Cy-Cy-1d1 | | 2 | | 5 | 5 |
| 3-Cy-Cy-1d0FF | 27 | 28 | 25 | 29 | 24 |
| 4-Cy-Cy-1d0FF | | | | | |
| 0d1-Cy-Cy-Ph-1 | 15 | 5 | 7 | 6 | 6 |
| 0d3-Cy-Cy-Ph-1 | | 10 | 8 | 5 | 5 |
| 2-Ph—Ph1—Ph-5 | 15 | 11 | 13 | 13 | 13 |
| 2-Ph—Ph1—Ph-3 | 11 | 15 | 13 | | |
| 0d3-Ph—Ph1—Ph-2 | | | | 13 | 13 |
| 5-Cy-Ph—Ph1—Ph-2 | 2 | | 3 | 1 | 1 |
| 5-Cy-Ph—Ph1—Ph-3 | | 2 | 3 | 4 | 4 |
| $T_{NI}$/° C. | 74.5 | 77.2 | 83.2 | 85.0 | 81.6 |
| Δn | 0.117 | 0.115 | 0.125 | 0.131 | 0.136 |
| Δε | 4.01 | 4.11 | 4.40 | 4.41 | 5.77 |
| η/mPa · s | 12.0 | 11.4 | 15.1 | 17.6 | 21.8 |
| γ₁/mPa · s | 47 | 49 | 56 | 52 | 54 |
| Initial voltage holding ratio (%) | 99.5 | 99.4 | 99.4 | 99.5 | 99.4 |
| Voltage holding ratio (%) after heat resistance test | 98.8 | 98.8 | 98.9 | 98.2 | 98.8 |
| Ghosting evaluation | AA | AA | AA | AA | A |

TABLE 3-continued

| | Content (%) | | | | |
|---|---|---|---|---|---|
| Chemical structure | Example 4 | Example 5 | Example 6 | Example 7 | Example 8 |
| Drop mark evaluation | AA | AA | A | A | AA |
| Production facility contamination evaluation | AA | AA | AA | AA | AA |
| Process compatibility evaluation | AA | AA | AA | A | AA |
| Low-temperature solubility evaluation | AA | AA | A | AA | A |

TABLE 4

| | Content (%) | | | |
|---|---|---|---|---|
| Chemical structure | Comparative Example 2 | Comparative Example 3 | Comparative Example 4 | Comparative Example 5 |
| 3-Ph—Ph3—CFFO—Ph3—F | 12 | | 12 | |
| 3-Cy-Cy-CFFO—Ph3—F | 1 | 13 | 1 | 1 |
| 4-Ph—Ph3—CFFO—Ph3—F | | 12 | | 12 |
| 3-Cy-Cy-1d0 | 34 | 17 | 17 | 17 |
| 3-Cy-Cy-1d1 | 10 | | | |
| 3-Cy-Cy-1d0FF | | 27 | | 27 |
| 4-Cy-Cy-1d0FF | | | 27 | |
| 0d1-Cy-Cy-Ph-1 | 15 | 15 | 15 | 15 |
| 0d3-Cy-Cy-Ph-1 | | | | |
| 2-Ph—Ph1—Ph-5 | 15 | 15 | 15 | 15 |
| 2-Ph—Ph1—Ph-3 | 11 | 11 | 11 | 11 |
| 0d3-Ph—Ph1—Ph-2 | | | | |
| 5-Cy-Ph—Ph1—Ph-2 | 2 | 2 | 2 | 2 |
| 5-Cy-Ph—Ph1—Ph-3 | | | | |
| $T_{NI}/°C$ | 78.0 | 76.9 | 71.7 | 73.5 |
| $\Delta n$ | 0.119 | 0.111 | 0.115 | 0.115 |
| $\Delta \epsilon$ | 3.88 | 5.18 | 4.01 | 4.01 |
| $\eta$/mPa · s | 12.8 | 13.4 | 12.9 | 12.5 |
| $\gamma_1$/mPa · s | 52 | 56 | 55 | 49 |
| Initial voltage holding ratio (%) | 99.4 | 99.4 | 99.5 | 99.5 |
| Voltage holding ratio (%) after heat resistance test | 98.8 | 98.9 | 98.2 | 98.8 |
| Ghosting evaluation | B | A | AA | C |
| Drop mark evaluation | A | A | B | A |
| Production facility contamination evaluation | C | AA | AA | AA |
| Process compatibility evaluation | AA | AA | AA | B |
| Low-temperature solubility evaluation | A | B | B | B |

Examples 9 to 14

TABLE 5

| | Content (%) | | |
|---|---|---|---|
| Chemical structure | Example 9 | Example 10 | Example 11 |
| 3-Ph—Ph3—CFFO—Ph3—F | 7 | 5 | 9 |
| 2-Ph—Ph3—CFFO—Ph3—F | | | |
| 3-Cy-Cy-CFFO—Ph3—F | 6 | | 4 |
| 5-Cy-Cy-CFFO—Ph3—F | | 6 | |
| 3-Ph—Ph1—Ph3—CFFO—Ph3—F | | 3 | |
| 3-Py—Ph—Ph3—CFFO—Ph3—F | | 2 | |
| 3-Cy-Ph—Ph3—Ph1—OCFFF | | | |
| 3-Ph—Ph—Ph1—Ph3—F | | | |
| 3-Cy-Cy-1d0FF | 28 | 25 | 30 |
| 3-Cy-Cy-2 | | | 11 |
| 3-Cy-Cy-4 | | | |
| 3-Cy-Cy-1d0 | 16 | 10 | |
| 3-Cy-Cy-1d1 | | 6 | 5 |
| 0d1-Cy-Cy-Ph-1 | 15 | 10 | 8 |
| 0d3-Cy-Cy-Ph-1 | | 5 | 7 |
| 5-Cy-Ph—Ph1—Ph-2 | 2 | 4 | |
| 5-Cy-Ph—Ph1—Ph-3 | | 4 | 2 |
| 2-Ph—Ph1—Ph-3 | 11 | 6 | 10 |
| 2-Ph—Ph1—Ph-4 | | 4 | |
| 2-Ph—Ph1—Ph-5 | 15 | 5 | 8 |
| 0d3-Ph—Ph1—Ph-2 | | 5 | 6 |
| $T_{NI}/°C$ | 76.0 | 96.0 | 76.6 |
| $\Delta n$ | 0.117 | 0.130 | 0.117 |
| $\Delta \epsilon$ | 3.90 | 4.40 | 4.16 |
| $\eta$/mPa · s | 11.0 | 17.9 | 11.6 |
| $\gamma_1$/mPa · s | 44 | 65 | 43 |
| Initial voltage holding ratio (%) | 99.5 | 99.4 | 99.4 |
| Voltage holding ratio (%) after heat resistance test | 98.8 | 98.8 | 98.9 |
| Ghosting evaluation | AA | AA | AA |
| Drop mark evaluation | AA | AA | A |

TABLE 5-continued

|  | Content (%) | | |
|---|---|---|---|
| Chemical structure | Example 9 | Example 10 | Example 11 |
| Production facility contamination evaluation | AA | AA | A |
| Process compatibility evaluation | AA | AA | AA |
| Low-temperature solubility evaluation | AA | AA | A |

TABLE 6

|  | Content (%) | | |
|---|---|---|---|
| Chemical structure | Example 12 | Example 13 | Example 14 |
| 3-Ph—Ph3—CFFO—Ph3—F | 6 | 11 | 8 |
| 2-Ph—Ph3—CFFO—Ph3—F | | | |
| 3-Cy-Cy-CFFO—Ph3—F | 7 | 3 | 5 |
| 5-Cy-Cy-CFFO—Ph3—F | | | |
| 3-Ph—Ph1—Ph3—CFFO—Ph3—F | | | |
| 3-Py—Ph—Ph3—CFFO—Ph3—F | 3 | 2 | |
| 3-Cy-Ph—Ph3—Ph1—OCFFF | 3 | 2 | |
| 3-Ph—Ph—Ph1—Ph3—F | 1 | 2 | |
| 3-Cy-Cy-1d0FF | 22 | 29 | 27 |
| 3-Cy-Cy-2 | | | |
| 3-Cy-Cy-4 | 7 | | |
| 3-Cy-Cy-1d0 | 12 | 18 | 17 |
| 3-Cy-Cy-1d1 | 4 | | |
| 0d1-Cy-Cy-Ph-1 | 12 | | 13 |
| 0d3-Cy-Cy-Ph-1 | | 9 | 4 |
| 5-Cy-Ph—Ph1—Ph-2 | 3 | 1 | |
| 5-Cy-Ph—Ph1—Ph-3 | | 3 | |
| 2-Ph—Ph1—Ph-3 | 8 | 10 | 9 |
| 2-Ph—Ph1—Ph-4 | | | |
| 2-Ph—Ph1—Ph-5 | 12 | 10 | 9 |
| 0d3-Ph—Ph1—Ph-2 | | | 8 |
| $T_{NI}$/° C. | 83.6 | 74.6 | 76.5 |
| $\Delta n$ | 0.117 | 0.119 | 0.119 |
| $\Delta\epsilon$ | 4.92 | 6.03 | 4.07 |
| $\eta$/mPa · s | 13.7 | 13.5 | 11.2 |
| $\gamma_1$/mPa · s | 58 | 46 | 41 |
| Initial voltage holding ratio (%) | 99.5 | 99.4 | 99.4 |
| Voltage holding ratio (%) after heat resistance test | 98.2 | 98.8 | 98.8 |
| Ghosting evaluation | AA | A | AA |
| Drop mark evaluation | A | AA | A |
| Production facility contamination evaluation | AA | A | AA |
| Process compatibility evaluation | A | AA | AA |
| Low-temperature solubility evaluation | AA | A | A |

INDUSTRIAL APPLICABILITY

A liquid crystal composition having positive dielectric anisotropy according to the present invention has good low-temperature solubility and undergoes significantly small changes in resistance and voltage holding ratio under heat and/or light. Thus, the product has high utility and a liquid crystal display device that contains the liquid crystal composition can achieve high-speed response. Since dropping of the liquid crystal composition can be continued stably during a liquid crystal display device production process, display failures caused by the process are suppressed and high-yield production is achieved. Thus, the liquid crystal composition is extremely useful.

REFERENCE SIGNS LIST 100 first substrate
102 TFT layer
103 pixel electrode
104 passivation film
105 first alignment film
200 second substrate
201 planarizing film
202 black matrix
203 color filter
204 transparent electrode
205 second alignment film
301 sealing material
302 projections (columnar spacer)
303 liquid crystal layer
304 projections (columnar spacer)
401 mask pattern
402 resin layer

The invention claimed is:

1. A liquid crystal composition having positive dielectric anisotropy, comprising compounds represented by formula (26.2) and formula (2.5):

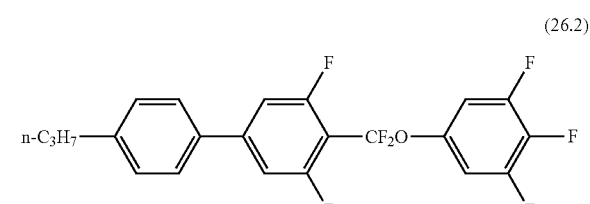

(26.2)

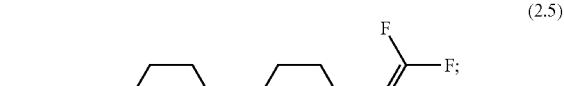

(2.5)

and
one or more compounds represented by general formula (IV):

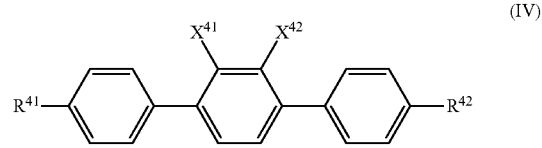

(IV)

(In the formula, $R^{41}$ and $R^{42}$ each independently represent an alkyl group having 1 to 5 carbon atoms or an alkenyl group having 4 or 5 carbon atoms and $X^{41}$ and $X^{42}$ each independently represent a hydrogen atom or a fluorine atom), 13% by mass or more of one or more selected from compounds represented by formula (11.1) and formula (11.2):

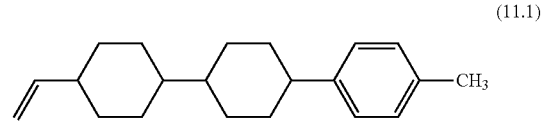

(11.1)

-continued

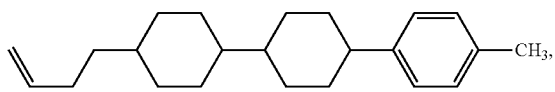
(11.2)

and
a compound represented by general formula (V-2)

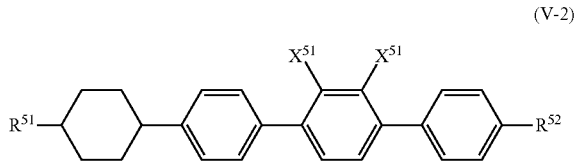
(V-2)

wherein $R^{51}$ and $R^{52}$ each independently represent an alkyl group having 1 to 5 carbon atoms, and $X^{51}$ and $X^{52}$ each independently represent a fluorine atom or a hydrogen atom.

2. The liquid crystal composition according to claim 1, further comprising one or more compounds represented by general formula (L):

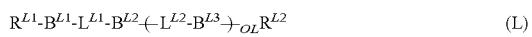
(L)

(In the formula, $R^{L1}$ and $R^{L2}$ each independently represent an alkyl group having 1 to 8 carbon atoms where one —$CH_2$— or two or more non-adjacent —$CH_2$— in the alkyl group may each independently be substituted with —CH=CH—, —C≡C—, —O—, —CO—, —COO—, or —OCO—, OL represents 0, 1, 2, or 3, $B^{L1}$, $B^{L2}$, and $B^{L3}$ each independently represent a group selected from the group consisting of
(a) a 1,4-cyclohexylene group (one —$CH_2$— or two or more non-adjacent —$CH_2$— in this group may each be substituted with —O—) and
(b) a 1,4-phenylene group (one —CH= or two or more non-adjacent —CH= in this group may each be substituted with —N=)
where the group (a) and the group (b) may each independently be substituted with a cyano group, a fluorine atom, or a chlorine atom, $L^{L1}$ and $L^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, and when OL represents 2 or 3 and a plurality of $L^{L2}$ are present, they may be the same or different; when OL represents 2 or 3 and a plurality of $B^{L3}$ are present, they may be the same or different; however, the compounds represented by formula (2.5) and general formula (IV), general formula (V-2), and compounds represented by formula (11.1) and formula (11.2) are excluded).

3. The liquid crystal composition according to claim 1, comprising one or more compounds represented by general formula (M):

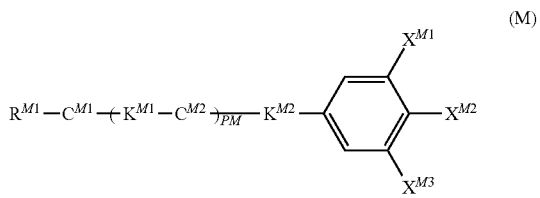
(M)

(In the formula, $R^{M1}$ represents an alkyl group having 1 to 8 carbon atoms where one —$CH_2$— or two or more non-adjacent —$CH_2$— in the alkyl group may each independently be substituted with —CH=CH—, —C≡C—, —O—, —CO—, —COO—, or —OCO—, PM represents 0, 1, 2, 3, or 4, $C^{M1}$ and $C^{M2}$ each independently represent a group selected from the group consisting of
(d) a 1,4-cyclohexylene group (one —$CH_2$— or two or more non-adjacent —$CH_2$— in this group may each be substituted with —O— or —S—) and
(e) a 1,4-phenylene group (one —CH= or two or more non-adjacent —CH= in this group may each be substituted with —N=)
where the group (d) and the group (e) may each independently be substituted with a cyano group, a fluorine atom, or a chlorine atom, $K^{M1}$ and $K^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, when PM represents 2, 3, or 4 and a plurality of $K^{M1}$ are present, they may be the same or different; and when PM represents 2, 3, or 4 and a plurality of $C^{M2}$ are present, they may be the same or different, $X^{M1}$ and $X^{M3}$ each independently represent a hydrogen atom, a chlorine atom, or a fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group; however, the compound represented by formula (26.2) is excluded).

4. An active matrix-driving liquid crystal display device using the liquid crystal composition according to claim 1.

5. A liquid crystal display using the active matrix-driving liquid crystal display device according to claim 4.

* * * * *